(12) United States Patent
Takayama et al.

(10) Patent No.: US 12,503,190 B2
(45) Date of Patent: Dec. 23, 2025

(54) ELECTRICAL DEVICE AND ROTATIONAL DEVICE FOR HUMAN-POWERED VEHICLE

(71) Applicant: SHIMANO INC., Sakai (JP)

(72) Inventors: Hitoshi Takayama, Sakai (JP); Eri Kinoshita, Sakai (JP)

(73) Assignee: SHIMANO INC., Sakai (JP)

( * ) Notice: Subject to any disclaimer, the term of this patent is extended or adjusted under 35 U.S.C. 154(b) by 341 days.

(21) Appl. No.: 18/308,632

(22) Filed: Apr. 27, 2023

(65) Prior Publication Data

US 2024/0174313 A1 May 30, 2024

Related U.S. Application Data

(63) Continuation-in-part of application No. 18/071,623, filed on Nov. 30, 2022, now abandoned.

(51) Int. Cl.
*B62J 45/411* (2020.01)
*B62J 45/413* (2020.01)
*B62J 45/421* (2020.01)

(52) U.S. Cl.
CPC ........... *B62J 45/411* (2020.02); *B62J 45/413* (2020.02); *B62J 45/421* (2020.02)

(58) Field of Classification Search
CPC ........ B62J 45/421; B62J 45/411; B62J 45/41; B62J 45/413; B62M 6/50
See application file for complete search history.

(56) References Cited

U.S. PATENT DOCUMENTS

| | | | |
|---|---|---|---|
| 5,027,303 A | 6/1991 | Witte | |
| 9,010,201 B2 * | 4/2015 | Kodama | ................ B62J 45/413 |
| | | | 73/862.69 |
| 10,458,788 B2 | 10/2019 | Fyfe et al. | |
| 11,029,225 B1 * | 6/2021 | Tachibana | .............. B62J 45/421 |
| 11,214,331 B2 * | 1/2022 | Wakeham | ................ B62M 3/16 |
| 2012/0330572 A1 * | 12/2012 | Longman | ................ B62J 45/41 |
| | | | 702/187 |
| 2020/0180725 A1 * | 6/2020 | Suzuki | ....................... B62L 1/00 |
| 2021/0031872 A1 * | 2/2021 | Shahana | ................ B62M 9/123 |
| 2024/0351657 A1 * | 10/2024 | Takayama | ................ B62M 6/50 |

FOREIGN PATENT DOCUMENTS

| | | | | |
|---|---|---|---|---|
| DE | 102016000498 A1 * | 7/2016 | ............ | B62J 45/412 |
| JP | H10-132678 | 5/1998 | | |
| JP | 2963096 B1 * | 10/1999 | | |
| JP | 3306302 B2 * | 7/2002 | | |
| JP | 2020083042 A * | 6/2020 | .............. | B62M 6/45 |
| JP | 2021062834 A * | 4/2021 | .............. | B62J 45/41 |
| JP | 2021107220 A * | 7/2021 | ................ | B60L 3/12 |

* cited by examiner

*Primary Examiner* — Octavia Hollington
(74) *Attorney, Agent, or Firm* — MORI & WARD, LLP

(57) ABSTRACT

An electrical device for a rotational device of a human-powered vehicle comprises a force sensor, a position detector, and an electronic controller. The force sensor is configured to measure a force applied to the rotational device. The position detector is configured to detect a rotational position of the rotational device. The electronic controller is configured to adjust a measurement value of the force sensor based on the rotational position detected by the position detector.

27 Claims, 36 Drawing Sheets

FIG. 3
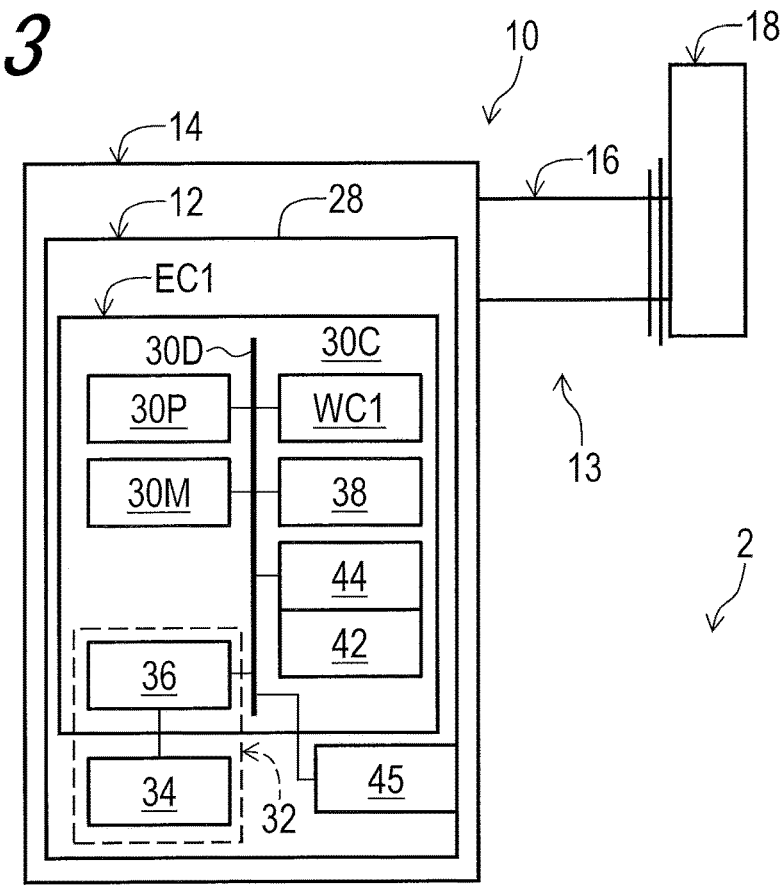
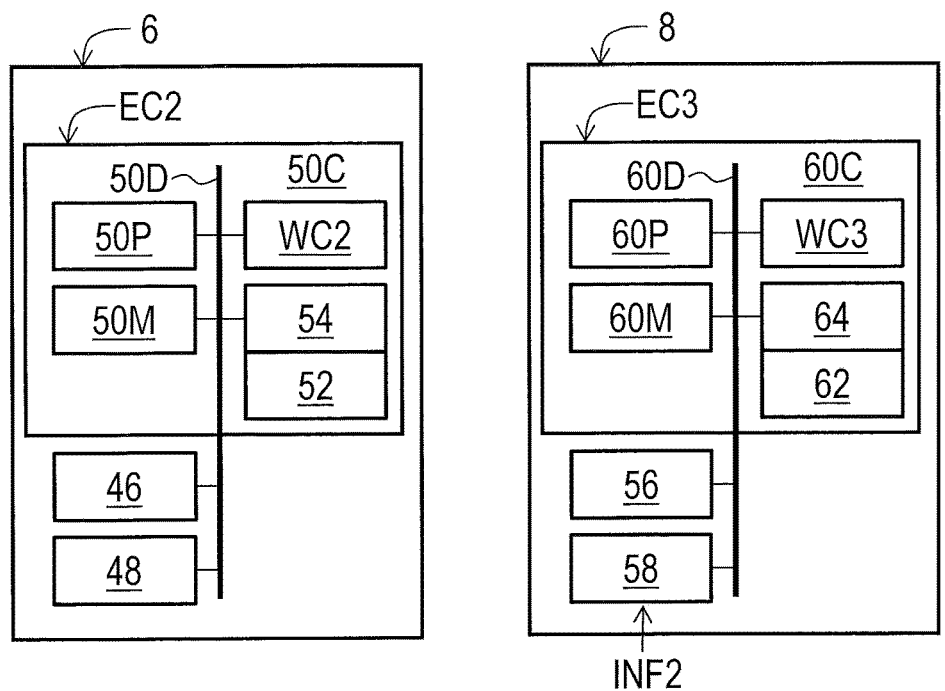

| INF23 (INF21(NR)) | PW |
|---|---|
| NR1 | PW1 |
| NR2 | PW2 |
| NR3 | PW3 |
| NR4 | PW4 |
| NR5 | PW5 |
| NR6 | PW6 |
| NR7 | PW7 |
| NR8 | PW8 |
| NR9 | PW9 |

*FIG. 10*

FIG. 13
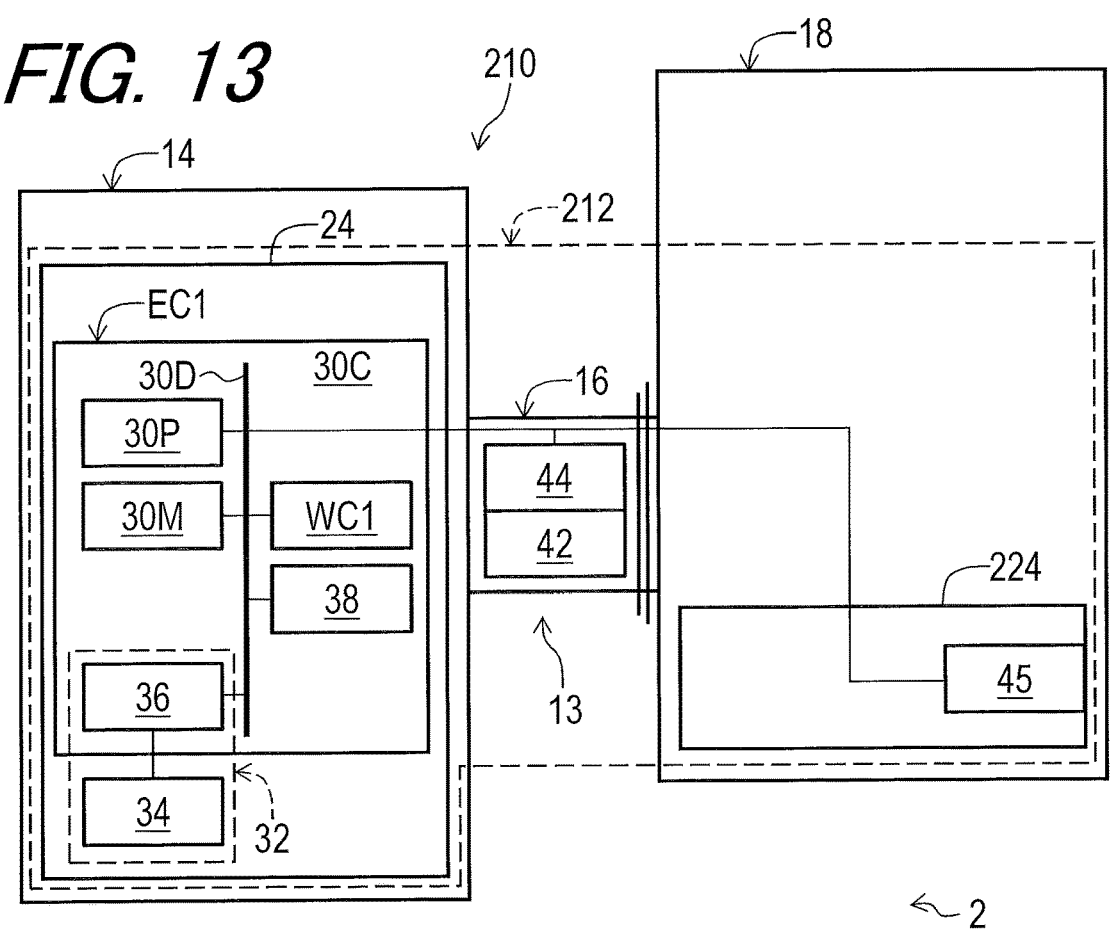
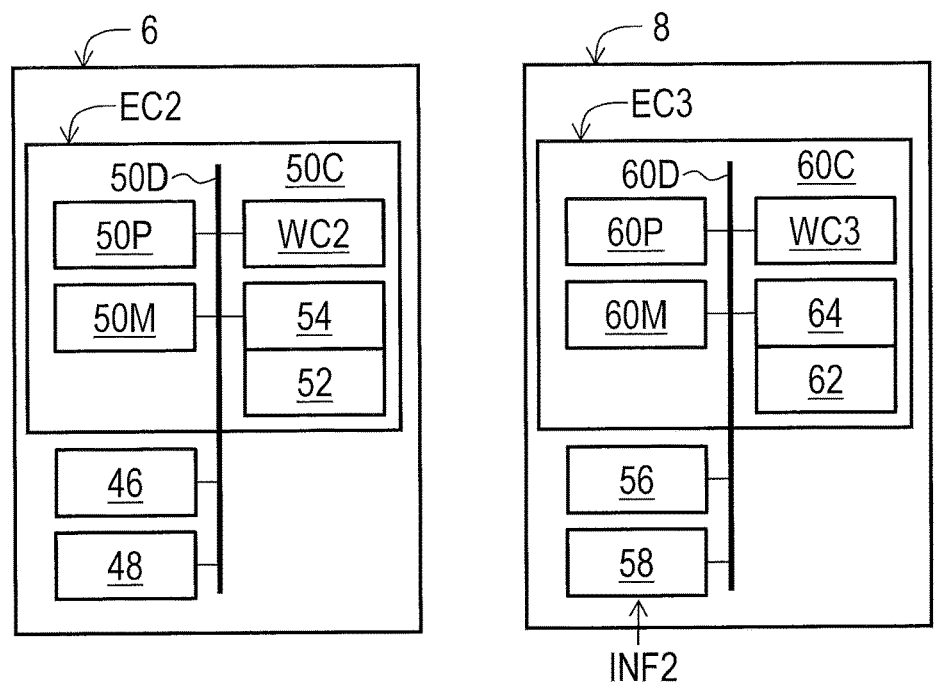

FIG. 16
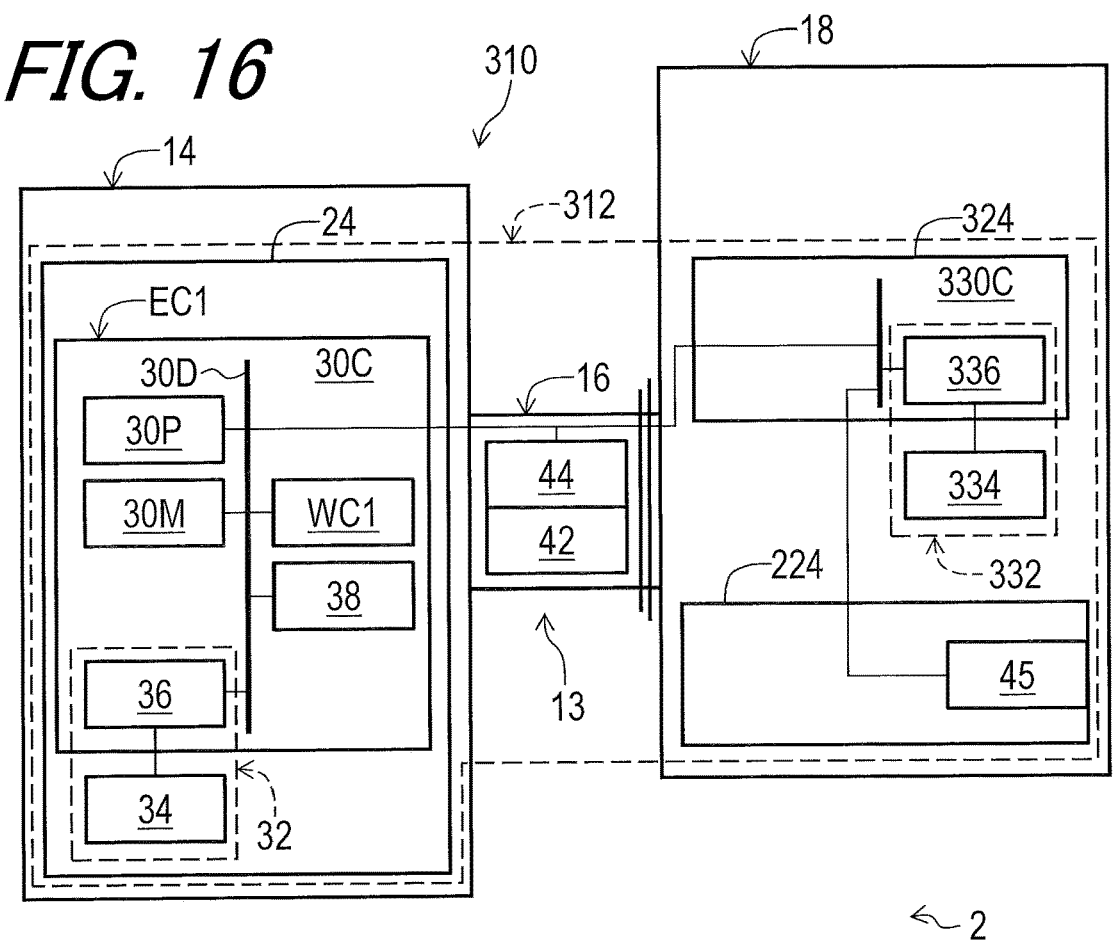
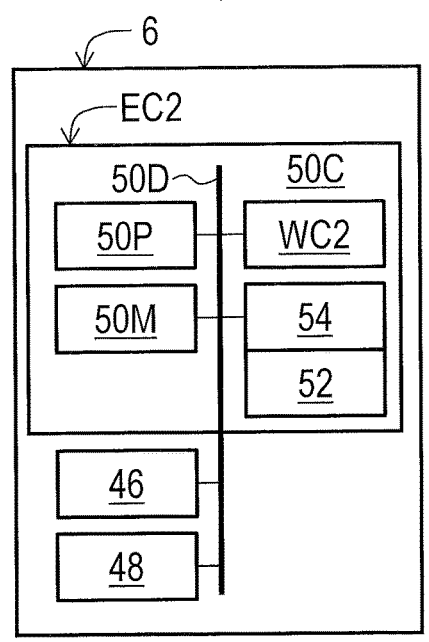
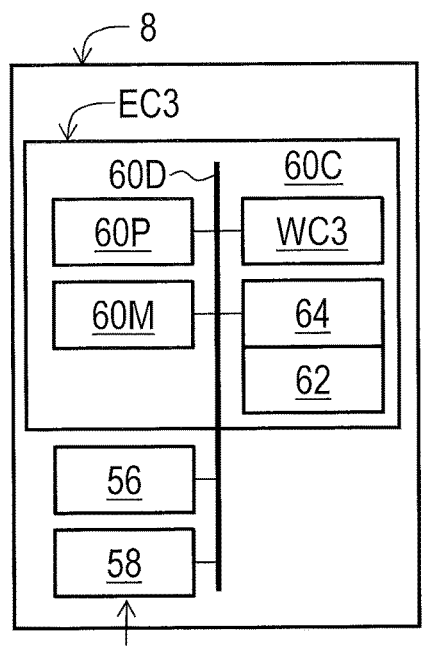

FIG. 26
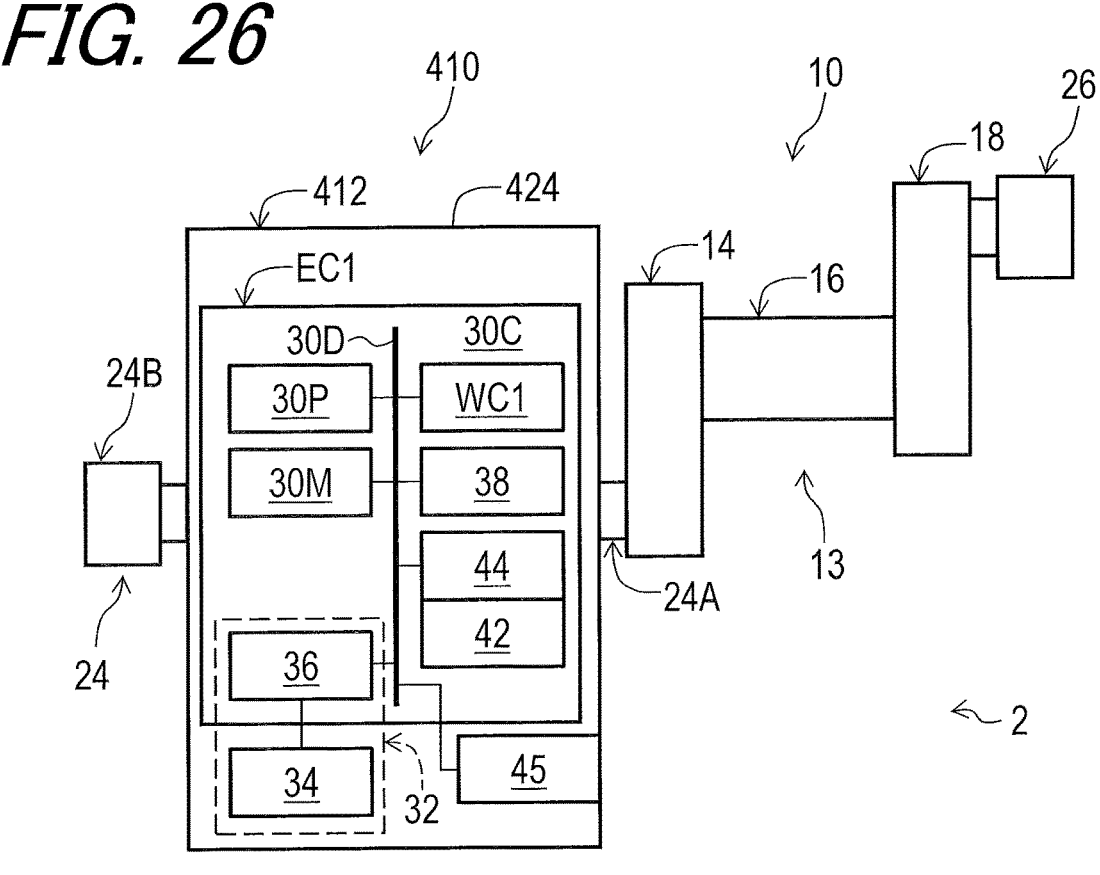
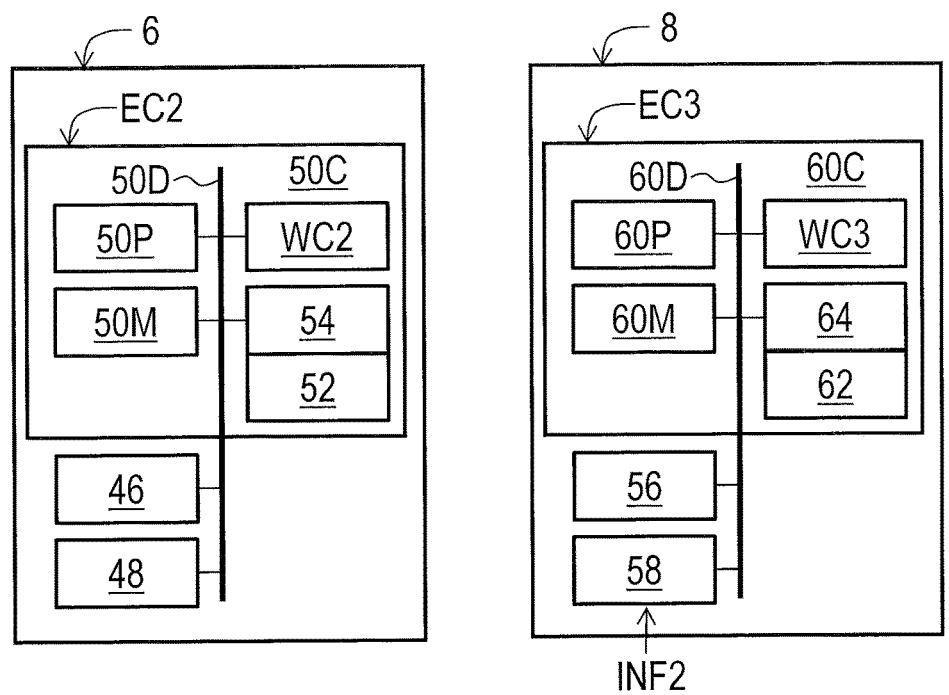

FIG. 28
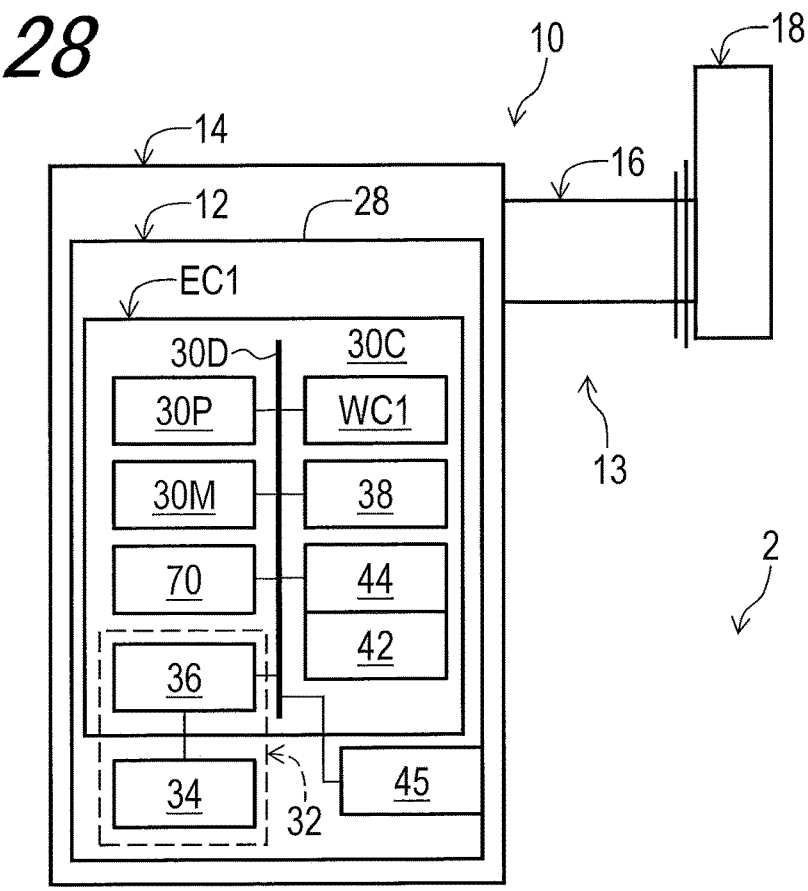
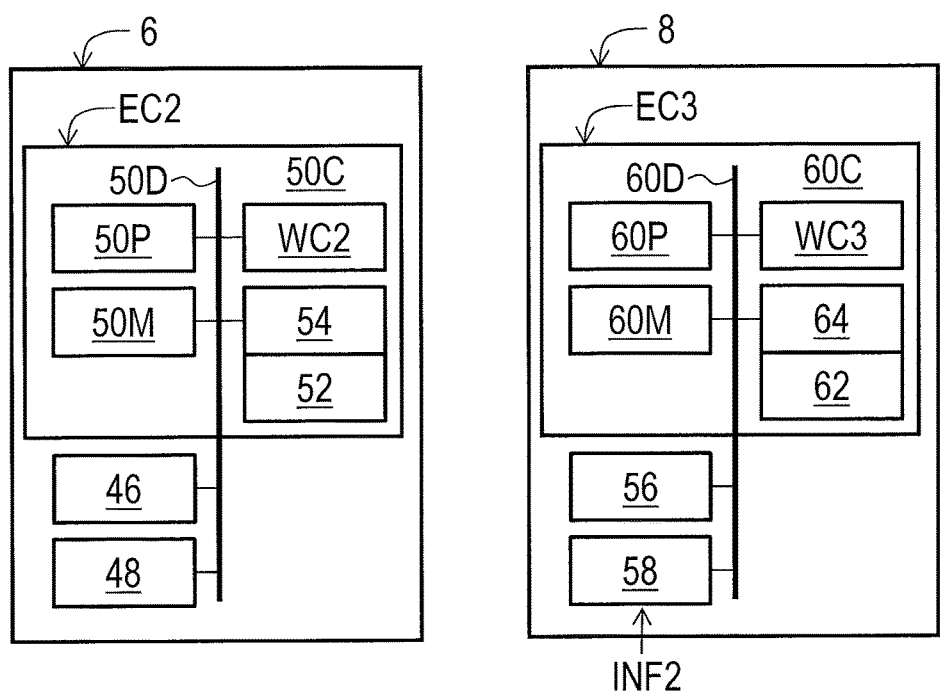

ELECTRICAL DEVICE AND ROTATIONAL DEVICE FOR HUMAN-POWERED VEHICLE

CROSS-REFERENCE TO RELATED APPLICATIONS

The present application is a continuation-in-part application of U.S. patent application Ser. No. 18/071,623 filed Nov. 30, 2022. The contents of this application are incorporated herein by reference in their entirety.

BACKGROUND

Technical Field

The present invention relates to an electrical device and a rotational device for a human-powered vehicle.

Background Information

A human-powered vehicle includes a device configured to rotate relative to a vehicle body. The device includes a sensor configured to sense a force applied to the device. A zero point of the sensor may vary due to use and/or deterioration. It is preferable to easily improve accuracy of a measurement value of the sensor.

SUMMARY

In accordance with a first aspect of the present invention, an electrical device for a rotational device of a human-powered vehicle comprises a force sensor, a position detector, and an electronic controller. The force sensor is configured to measure a force applied to the rotational device. The position detector is configured to detect a rotational position of the rotational device. The electronic controller is configured to adjust a measurement value of the force sensor based on the rotational position detected by the position detector.

With the electrical device according to the first aspect, it is possible to adjust the measurement value of the force sensor in any rotational position of the rotational device. Thus, it is possible to improve accuracy of the measurement value of the force sensor without arranging the rotational device in a specific rotational position.

In accordance with a second aspect of the present invention, the electrical device according to the first aspect is configured so that the electronic controller is configured to adjust the measurement value of the force sensor based on the rotational position detected by the position detector without a user input indicating adjustment of the measurement value of the force sensor.

With the electrical device according to the second aspect, it is possible to automatically start to adjust the measurement value of the force sensor without the user input. Thus, it is possible to improve accuracy of the measurement value of the force sensor while omitting the user input.

In accordance with a third aspect of the present invention, the electrical device according to the first or second aspect is configured so that the electronic controller is configured to adjust the measurement value of the force sensor based on a reference pedal weight of a pedal and the rotational position detected by the position detector.

With the electrical device according to the third aspect, it is possible to accurately adjust the measurement value of the force sensor by setting the reference pedal weight depending on an actual pedal. Thus, it is possible to reliably improve accuracy of the measurement value of the force sensor without arranging the rotational device in a specific rotational position.

In accordance with a fourth aspect of the present invention, the electrical device according to the third aspect is configured so that the electronic controller is configured to store the reference pedal weight.

With the electrical device according to the fourth aspect, it is possible to improve a processing speed of the electrical device when adjusting the measurement value of the force sensor using the reference pedal weight.

In accordance with a fifth aspect of the present invention, the electrical device according to the third or fourth aspect is configured so that the electronic controller is configured to set the reference pedal weight based on input information relating to the pedal.

With the electrical device according to the fifth aspect, it is possible to accurately adjust the measurement value of the force sensor by changing the input information depending on an actual pedal. Thus, it is possible to reliably improve accuracy of the measurement value of the force sensor.

In accordance with a sixth aspect of the present invention, the electrical device according to the fifth aspect is configured so that the electronic controller is configured to receive the input information from an external electrical device.

With the electrical device according to the sixth aspect, it is possible to input the input information using the external electrical device. Thus, it is possible to improve accuracy of the measurement value of the force sensor while maintaining or improving user-friendliness.

In accordance with a seventh aspect of the present invention, the electrical device according to the fifth or sixth aspect is configured so that the electronic controller is configured to store at least two pedal weights. The electronic controller is configured to set, as the reference pedal weight, one of the at least two pedal weights corresponding to the input information.

With the electrical device according to the seventh aspect, it is possible to improve a processing speed of the electrical device when setting the reference pedal weight.

In accordance with an eighth aspect of the present invention, the electrical device according to any one of the third to seventh aspects is configured so that the electronic controller is configured to calculate a reference rotational force directing in a rotational direction of the rotational device based on the reference pedal weight and the rotational position detected by the position detector in a reference state where the force measured by the force sensor is lower than a force threshold and the rotational position detected by the position detector does not change.

With the electrical device according to the eighth aspect, in the reference state, the rotational device is stationary, and the user does not apply a force to the rotational device. Thus, it is possible to obtain the reference rotational force which corresponds to the reference pedal weight and which does not include a force applied by the user.

In accordance with a ninth aspect of the present invention, the electrical device according to the eighth aspect is configured so that the electronic controller is configured to calculate, as a measurement difference, a difference between the reference rotational force and the force measured by the force sensor in the reference state.

With the electrical device according to the ninth aspect, it is possible to obtain the measurement difference which is a difference between the reference rotational force and an actual force applied to the rotational device. Thus, it is possible to reliably improve accuracy of the measurement value of the force sensor.

In accordance with a tenth aspect of the present invention, the electrical device according to the ninth aspect is configured so that the electronic controller is configured to store the measurement difference calculated based on the reference rotational force.

With the electrical device according to the tenth aspect, it is possible to improve a processing speed of the electrical device when using the measurement difference.

In accordance with an eleventh aspect of the present invention, the electrical device according to the ninth or tenth aspect is configured so that the electronic controller is configured to subtract the measurement difference from the force measured by the force sensor to adjust the measurement value in a rotation state where the rotational position detected by the position detector changes.

With the electrical device according to the eleventh aspect, it is possible to more reliably improve accuracy of the measurement value of the force sensor.

In accordance with a twelfth aspect of the present invention, the electrical device according to any one of the ninth to eleventh aspects is configured so that the electronic controller is configured to calculate the measurement difference in a case where the reference state continues for a determination time.

With the electrical device according to the twelfth aspect, it is possible to accurately calculate the measurement difference in the reference state. Thus, it is possible to more reliably improve accuracy of the measurement value of the force sensor.

In accordance with a thirteenth aspect of the present invention, the electrical device according to any one of the ninth to twelfth aspects is configured so that the electronic controller has a first state where the electronic controller operates with first power consumption, and a second state where the electronic controller operates with second power consumption lower than the first power consumption. The electronic controller is configured to change a state of the electronic controller from the first state to the second state in a case where, for a sleep determination time, the force measured by the force sensor is lower than the force threshold and the rotational position detected by the position detector does not change.

With the electrical device according to the thirteenth aspect, the second state can reduce power consumption of the electrical device.

In accordance with a fourteenth aspect of the present invention, the electrical device according to the thirteenth aspect is configured so that the electronic controller is configured to calculate the measurement difference before the electronic controller changes the state of the electronic controller from the first state to the second state.

With the electrical device according to the fourteenth aspect, it is possible to reduce power consumption in the second state to a level at which the electronic controller cannot calculate the measurement difference while obtaining the latest value of the measurement difference of the force sensor. Thus, it is possible to improve accuracy of the measurement value of the force sensor more reliably while reducing the power consumption of the electrical device.

In accordance with a fifteenth aspect of the present invention, the electrical device according to the thirteenth or fourteenth aspect is configured so that the electronic controller is configured to change the state of the electronic controller from the second state to the first state in a case where the force measured by the force sensor is higher than the force threshold in the second state or if the rotational position detected by the position detector changes in the second state. The electronic controller is configured to calculate the measurement difference after the electronic controller changes the state of the electronic controller from the second state to the first state.

With the electrical device according to the fifteenth aspect, it is possible to use the latest value of the measurement value of the force sensor after the electronic controller changes the state from the second state to the first state. Thus, it is possible to improve accuracy of the measurement value of the force sensor more reliably while reducing the power consumption of the electrical device.

In accordance with a sixteenth aspect of the present invention, an electrical device for a rotational device of a human-powered vehicle comprises a force sensor, a temperature sensor, and an electronic controller. The force sensor is configured to measure a force applied to the rotational device. The temperature sensor is configured to measure a temperature. The electronic controller is configured to adjust a measurement value of the force sensor in a case where the temperature measured by the temperature sensor is higher than a temperature threshold.

With the electrical device according to the sixteenth aspect, it is possible to reduce the impact of the temperature on the force measured by the force sensor. Thus, it is possible to improve accuracy of the measurement value of the force sensor.

In accordance with a seventeenth aspect of the present invention, the electrical device according to the sixteenth aspect further comprises a position detector configured to detect a rotational position of the rotational device. The electronic controller has a first state where the electronic controller operates with first power consumption and a second state where the electronic controller operates with second power consumption lower than the first power consumption. The electronic controller is configured to change a state of the electronic controller from the first state to the second state in a case where, for a sleep determination time, the force measured by the force sensor is lower than the force threshold and the rotational position detected by the position detector does not change.

With the electrical device according to the seventeenth aspect, the second state can reduce power consumption of the electrical device.

In accordance with an eighteenth aspect of the present invention, the electrical device according to the seventeenth aspect is configured so that the electronic controller is configured to adjust the measurement value before the electronic controller changes the state of the electronic controller from the first state to the second state in a case where the temperature measured by the temperature sensor is higher than the temperature threshold.

With the electrical device according to the eighteenth aspect, it is possible to reduce power consumption in the second state to a level at which the electronic controller cannot calculate the measurement value while obtaining the latest value of the measurement difference of the force sensor. Thus, it is possible to improve accuracy of the measurement value of the force sensor more reliably while reducing the power consumption of the electrical device.

In accordance with a nineteenth aspect of the present invention, the electrical device according to any one of the sixteenth to eighteenth aspects is configured so that the electronic controller is configured to adjust the measurement value of the force sensor based on the rotational position detected by the position detector without a user input indicating adjustment of the measurement value of the force sensor.

With the electrical device according to the nineteenth aspect, it is possible to automatically start to adjust the measurement value of the force sensor without the user input. Thus, it is possible to improve accuracy of the measurement value of the force sensor while omitting the user input.

In accordance with a twentieth aspect of the present invention, a rotational device for a human-powered vehicle comprises a crank arm and the electrical device according to any one of the first to nineteenth aspects.

With the electrical device according to the twentieth aspect, it is possible to apply the electrical device to the crank arm.

In accordance with a twenty-first aspect of the present invention, the electrical device according to the twentieth aspect is configured so that the electrical device is at least partially provided to the crank arm.

With the electrical device according to the twenty-first aspect, it is possible to utilize the crank arm as a place where the electrical device is provided.

In accordance with an twenty-second aspect of the present invention, the electrical device according to the twentieth or twenty-first aspect further comprises a crank axle and a sprocket. The crank arm is secured to the crank axle.

With the electrical device according to the twenty-second aspect, it is possible to apply the electrical device to a crank assembly.

In accordance with a twenty-third aspect of the present invention, the electrical device according to the twenty-second aspect is configured so that the electrical device is at least partially provided to at least one of the crank axle, the crank arm, and the sprocket.

With the electrical device according to the twenty-third aspect, it is possible to utilize at least one of the crank axle, the crank arm, and the sprocket as a place where the electrical device is provided.

In accordance with a twenty-fourth aspect of the present invention, a rotational device for a human-powered vehicle comprises a pedal axle, a pedal body rotatably coupled to the pedal axle, and the electrical device according to any one of the first to nineteenth aspects.

With the electrical device according to the twenty-fourth aspect, it is possible to apply the electrical device to a pedal.

In accordance with a twenty-fifth aspect of the present invention, the electrical device according to the twenty-fourth aspect is configured so that the electrical device is at least partially provided to at least one of the pedal axle and the pedal body.

With the electrical device according to the twenty-fifth aspect, it is possible to utilize at least one of the pedal axle and the pedal body as a place where the electrical device is provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a schematic block diagram of the rotational device illustrated in FIG. 1.

FIG. 10 shows a list including pedal weights and identification information of rotational devices.

FIG. 13 is a schematic block diagram of the rotational device illustrated in FIG. 12.

FIG. 16 is a schematic block diagram of the rotational device illustrated in FIG. 15.

FIG. 26 is a schematic block diagram of the rotational device illustrated in FIG. 24.

FIG. 28 is a schematic block diagram of a rotational device in accordance with a modification.

DESCRIPTION OF THE EMBODIMENTS

Figure 1:
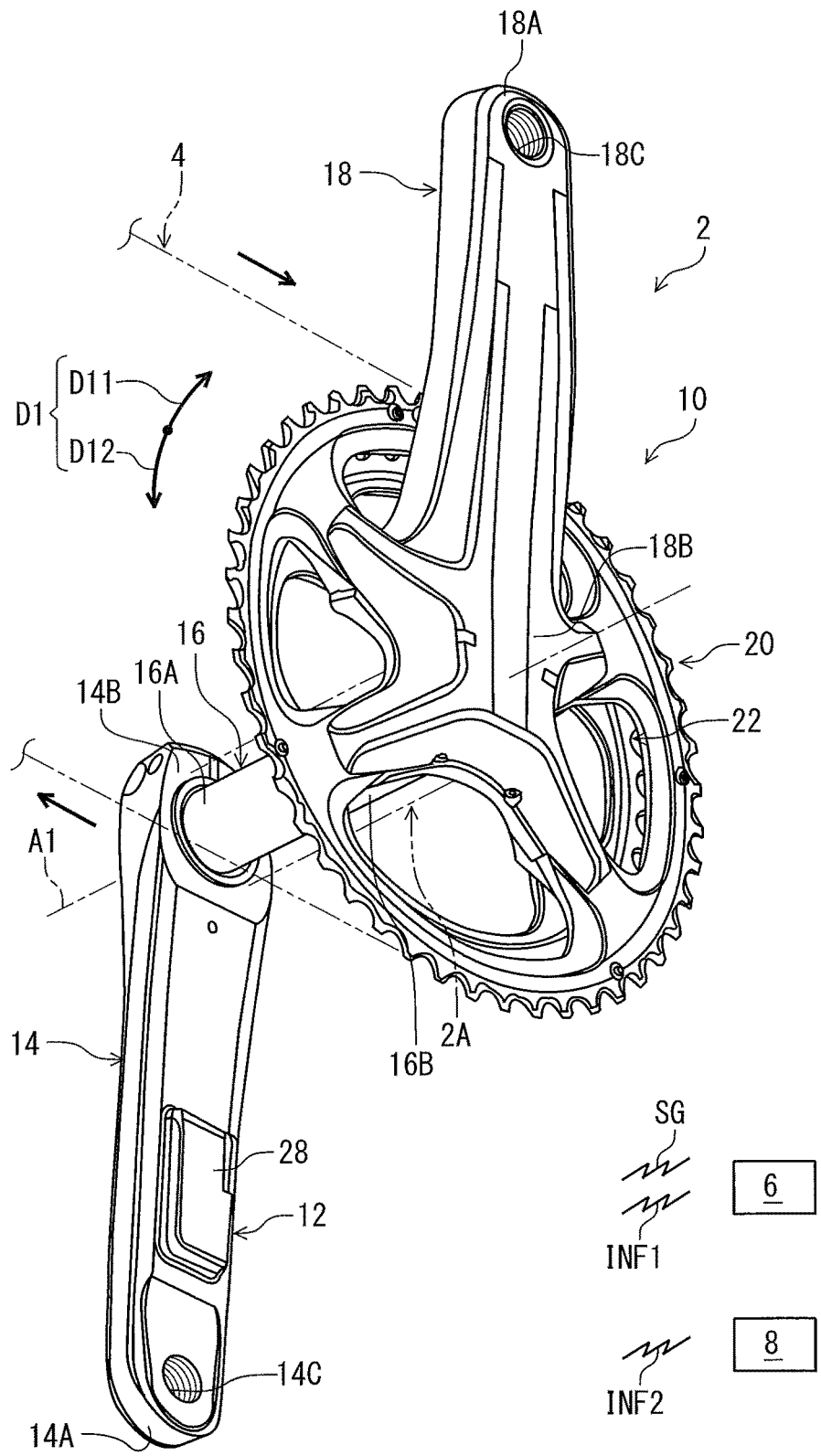
FIG. 1 is a perspective view of a rotational device of a human-powered vehicle in accordance with a first embodiment.

The embodiments will now be described with reference to the accompanying drawings, wherein like reference numerals designate corresponding or identical elements throughout the various drawings.

First Embodiment

As seen in FIG. 1, a human-powered vehicle 2 includes a rotational device 10 in accordance with one of embodiments. The rotational device 10 for the human-powered vehicle 2 comprises an electrical device 12. Examples of the rotational device 10 include a crank assembly, a pedal, and a combination thereof. Examples of the electrical device 12 include a crank power meter and a pedal power meter. In the present embodiment, the rotational device 10 includes a crank assembly 13. The electrical device 12 includes a crank power meter. However, the rotational device 10 can include other devices such as a pedal if needed and/or desired. The electrical device 12 can include other devices such as a pedal power meter if needed and/or desired.

In the present application, the term "human-powered vehicle" includes a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

As seen in FIG. 1, the rotational device 10 is rotatable relative to a vehicle body 2A of the human-powered vehicle 2 about a rotational axis A1. The rotational device 10 is rotatable relative to the vehicle body 2A of the human-powered vehicle 2 about the rotational axis A1 in a rotational direction D1. The rotational device 10 is rotatable relative to the vehicle body 2A of the human-powered vehicle 2 about the rotational axis A1 in a driving rotational direction D11 during pedaling. The rotational direction D1 includes the driving rotational direction D11 and a reverse rotational direction D12. The reverse rotational direction D12 is an opposite direction of the driving rotational direction D11.

The rotational device 10 for the human-powered vehicle 2 comprises a crank arm 14. The rotational device 10 further comprises a crank axle 16. The rotational device 10 further comprises a crank arm 18. The crank assembly 13 includes the crank arm 14, the crank axle 16, and the crank arm 18. The crank arm 18 is secured to the crank axle 16. The crank arm 14, the crank axle 16, and the crank arm 18 are rotatable relative to the vehicle body 2A of the human-powered vehicle 2 in the driving rotational direction D11.

The rotational device 10 further comprises a sprocket 20. The rotational device 10 further comprises a sprocket 22. The sprocket 20 is configured to engage with a chain 4. The sprocket 22 is configured to engage with the chain 4. The sprocket 20 or 22 is configured to transmit a driving force to another sprocket such as a rear sprocket via the chain 4. The sprocket 20 is secured to at least one of the crank axle 16 and the crank arm 18. The sprocket 22 is secured to at least one of the crank axle 16, the crank arm 18, and the sprocket 20. The sprocket 22 can be omitted from the rotational device 10 if needed and/or desired.

The crank axle 16 includes a first axle end 16A and a second axle end 16B. The crank axle 16 extends between the first axle end 16A and the second axle end 16B along the rotational axis A1. The crank arm 14 is secured to the first axle end 16A. The crank arm 18 is secured to the second axle end 16B.

The crank arm 14 includes has a first end 14A and a second end 14B. The crank arm 14 extends between the first end 14A and the second end 14B. The first end 14A includes a pedal securing hole 14C to which a pedal is attachable. The second end 14B is secured to the first axle end 16A of the crank axle 16. Examples of the pedal include a binding pedal, a clipless pedal and a general pedal.

The crank arm 18 includes has a first end 18A and a second end 18B. The crank arm 18 extends between the first end 18A and the second end 18B. The first end 18A includes a pedal securing hole 18C to which a pedal is attachable. The second end 18B is secured to the first axle end 16A of the crank axle 16.

In the present embodiment, the crank arm 14 is a left crank arm while the crank arm 18 is a right crank arm. However, the crank arm 14 can be a right crank arm if needed and/or desired. The crank arm 18 can be a left crank arm if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the rotational device 10, the electrical device 12, or other components, should be interpreted relative to the human-powered vehicle 2 equipped with the rotational device 10, the electrical device 12, or other components as used in an upright riding position on a horizontal surface.

Figure 2:
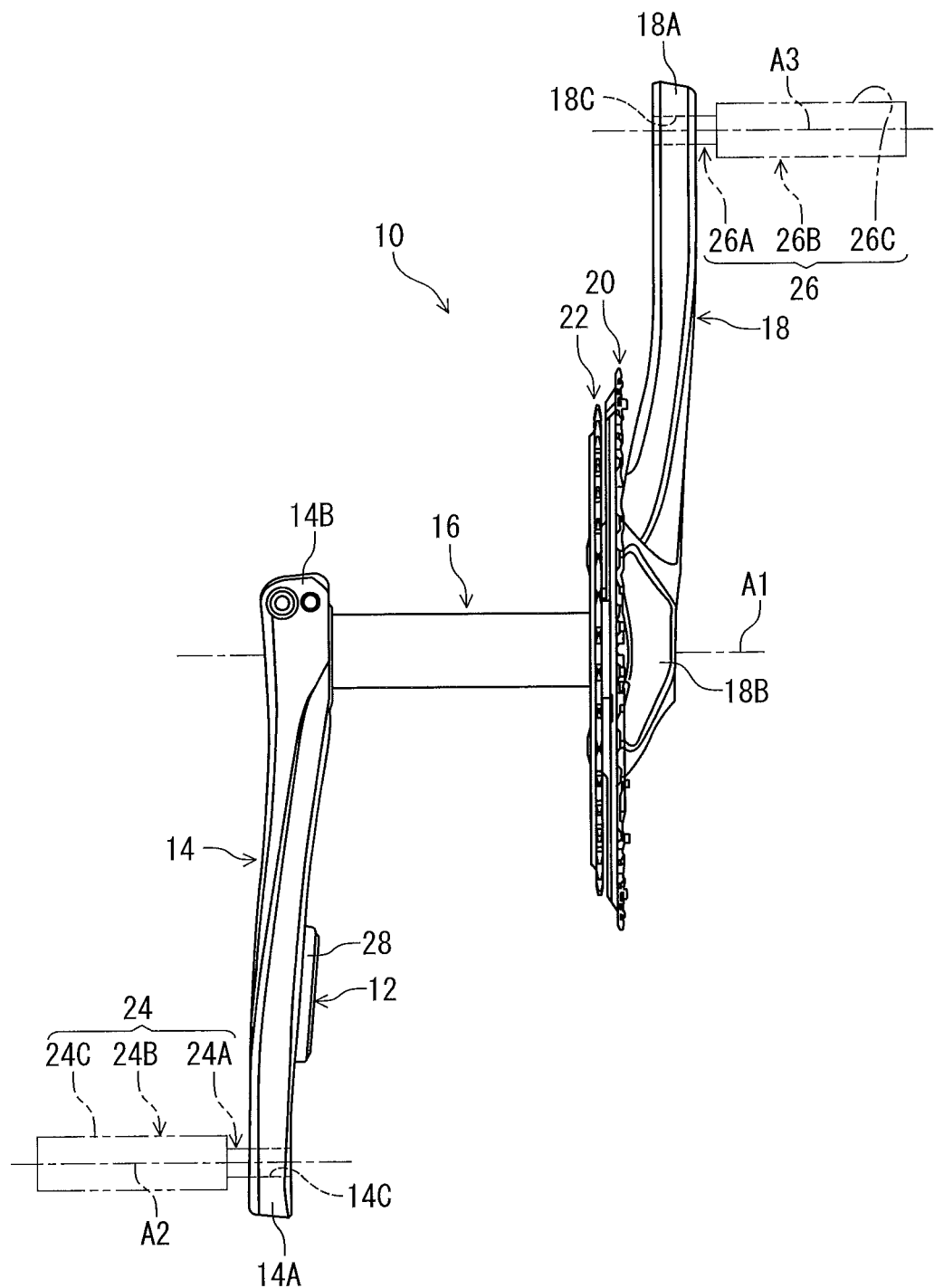
FIG. 2 is a side-elevational view of the rotational device illustrated in FIG. 1.

As seen in FIG. 2, the rotational device 10 for the human-powered vehicle 2 comprises a pedal 24. The pedal 24 includes a pedal axle 24A and a pedal body 24B. Namely, the rotational device 10 for the human-powered vehicle 2 comprises the pedal axle 24A and the pedal body 24B. The pedal body 24B is rotatably coupled to the pedal axle 24A. The pedal axle 24A is configured to be secured to the crank arm 14 of the rotational device 10. The pedal axle 24A is threadedly engaged with the pedal securing hole 14C of the crank arm 14.

The pedal body 24B is rotatably coupled to the pedal axle 24A about a rotational axis A2. The pedal axle 24A extends along the rotational axis A2. The pedal body 24B includes a tread surface 24C on which a shoe of the user is to be put. The pedal body 24B can include a binding structure to which a cleat of the shoe is to be fixedly coupled.

The rotational device 10 for the human-powered vehicle comprises a pedal 26. The pedal 26 includes a pedal axle 26A and a pedal body 26B. Namely, the rotational device 10 for the human-powered vehicle 2 comprises a pedal axle 26A and a pedal body 26B. The pedal body 26B is rotatably coupled to the pedal axle 26A. The pedal axle 26A is configured to be secured to the crank arm 18 of the rotational device 10. The pedal axle 26A is threadedly engaged with the pedal securing hole 18C of the crank arm 18.

The pedal body 26B is rotatably coupled to the pedal axle 26A about a rotational axis A3. The pedal axle 26A extends along the rotational axis A3. The pedal body 26B includes a tread surface 26C on which a shoe of the user is to be put. The pedal body 26B can include a binding structure to which a cleat of the shoe is to be fixedly coupled.

The electrical device 12 is at least partially provided to at least one of the crank axle 16, the crank arm 14, and the sprocket 20 and/or 22. The electrical device 12 is at least partially provided to the crank arm 14. In the present embodiment, the electrical device 12 is entirely provided to the crank arm 14. The electrical device 12 is provided between the first end 14A and the second end 14B. The electrical device 12 is attached to an outer surface of the crank arm 14. However, the electrical device 12 can be at least partially provided inside the crank arm 14 if needed and/or desired. The electrical device 12 can be at least partially provided to at least one of the crank axle 16, the crank arm 18, and the sprocket 20 and/or 22 if needed and/or desired.

As seen in FIG. 3, the electrical device 12 for the rotational device 10 of the human-powered vehicle 2 comprises an electronic controller EC1. The electrical device 12 comprises a wireless communicator WC1. The wireless communicator WC1 is configured to wirelessly communicate with an additional wireless communicator WC2 of an additional electrical device 6. The wireless communicator WC1 is configured to wirelessly transmit force relating to the rotational device 10. The electronic controller EC1 is electrically connected to the wireless communicator WC1. The electrical device 12 includes a housing 28. The wireless communicator WC1 and the electronic controller EC1 are provided in the housing 28. As seen in FIG. 1, the housing 28 is attached to the crank assembly 13. The housing 28 is attached to the crank arm 14.

The electronic controller EC1 includes a processor 30P, a memory 30M, and a circuit board 30C, and a bus 30D. The processor 30P is coupled to the memory 30M. The memory 30M is coupled to the processor 30P. The processor 30P and the memory 30M are electrically mounted on the circuit board 30C. The processor 30P is electrically connected to the memory 30M via the circuit board 30C and the bus 30D. The memory 30M is electrically connected to the processor 30P via the circuit board 30C and the bus 30D. The bus 30D is provided on the circuit board 30C. The electronic controller EC1 includes a semiconductor.

For example, the processor 30P includes at least one of a central processing unit (CPU), a micro processing unit (MPU), and a memory controller. The memory 30M is electrically connected to the processor 30P. For example, the memory 30M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 30M includes storage areas each having an address. The processor 30P is configured to control the memory 30M to store data in the storage areas of the memory 30M and reads data from the storage areas of the memory 30M. The processor 30P can also be referred to as a hardware processor 30P. The memory 30M can also be referred to as a hardware memory 30M. The memory 30M can also be referred to as a computer-readable storage medium 30M.

The electronic controller EC1 is programed to execute at least one control algorithm of the electrical device 12. The memory 30M (e.g., the ROM) stores at least one program including at least one program instruction. The at least one program is read into the processor 30P, and thereby the at least one control algorithm of the electrical device 12 is executed based on the at least one program. The electronic controller EC1 can also be referred to as an electronic controller circuit or circuitry EC1. The electronic controller EC1 can also be referred to as a hardware electronic controller EC1.

The structure of the electronic controller EC1 is not limited to the above structure. The structure of the electronic controller EC1 is not limited to the processor 30P, the memory 30M, and the bus 30D. The electronic controller EC1 can be realized by hardware alone or a combination of hardware and software. The processor 30P and the memory 30M can be integrated as a one chip such as an application specific integrated circuit (ASIC) or a field programmable gate array (FPGA).

As seen in FIG. 3, the wireless communicator WC1 is electrically connected to the processor 30P and the memory 30M with the circuit board 30C and the bus 30D. The wireless communicator WC1 is electrically mounted on the circuit board 30C. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the wireless communicator WC1 is configured to encrypt signals using a cryptographic key to generate encrypted wireless signals. The wireless communicator WC1 is configured to transmit wireless signals via the antenna. The wireless communicator WC1 can be a one-way wireless communication device such as a receiver, or a two-way wireless communication device such as a transceiver.

The wireless communicator WC1 is configured to receive wireless signals via the antenna. In the present embodiment, the wireless communicator WC1 is configured to decode the wireless signals to recognize signals transmitted from other wireless communicators. The wireless communicator WC1 is configured to decrypt the wireless signals using the cryptographic key.

As seen in FIG. 3, the electrical device 12 for the rotational device 10 of the human-powered vehicle 2 comprises a force sensor 32. The force sensor 32 is configured to obtain rotational information INF1. The rotational information INF1 includes a force applied to the rotational device 10 in the rotational direction D1 (see e.g., FIG. 1). Thus, the force sensor 32 is configured to measure the force applied to the rotational device 10. The force sensor 32 is configured to output a measurement value indicating the force applied to the rotational device 10 in the rotational direction D1. In the present embodiment, the force sensor 32 is configured to measure the force applied to the crank arm 14. However, the force sensor 32 can be configured to measure the force applied to another part of the rotational device 10 if needed and/or desired.

The electronic controller EC1 is configured to receive the rotational information INF1 obtained by the force sensor 32. The electronic controller EC1 is electrically connected to the force sensor 32 to receive the rotational information INF1 obtained by the force sensor 32. The electronic controller EC1 is configured to receive the force measured by the force sensor 32. The electronic controller EC1 is electrically connected to the force sensor 32 to receive the force measured by the force sensor 32.

For example, the force sensor 32 includes a strain gauge 34 and a measurement circuit 36. The strain gauge 34 is attached to the crank arm 14. The strain gauge 34 is configured to output a change in electrical resistance depending on the deformation amount of the rotational device 10. The strain gauge 34 is configured to output the change in the electrical resistance depending on the deformation amount of the crank arm 14. The measurement circuit 36 is electrically connected to the strain gauge 34 to convert the output of the strain gauge 34 to a voltage indicating the deformation amount of the rotational device 10 (e.g., the crank arm 14). For example, the measurement circuit 36 constitutes a bridge circuit with the strain gauge 34.

The measurement circuit 36 is electrically connected to the electronic controller EC1. The measurement circuit 36 is electrically mounted on the circuit board 30C of the electronic controller EC1. For example, the measurement circuit 36 is electrically connected to the strain gauge 34 via the circuit board 30C and an additional circuit board such as a flexible printed circuit. The electronic controller EC1 is electrically connected to the measurement circuit 36 to receive the rotational information INF1. The electronic controller EC1 is electrically connected to the measurement circuit 36 to receive the deformation amount of the rotational device 10 (e.g., the crank arm 14).

As seen in FIG. 3, the electrical device 12 for the rotational device 10 of the human-powered vehicle 2 comprises a position detector 38. The position detector 38 is configured to obtain the rotational information INF1. The rotational information INF1 includes a rotational position of the rotational device 10. Thus, the position detector 38 is configured to detect the rotational position of the rotational device 10.

The electronic controller EC1 is configured to receive the rotational information INF1 obtained by the position detector 38. The electronic controller EC1 is electrically connected to the position detector 38 to receive the rotational information INF1 obtained by the position detector 38. The electronic controller EC1 is configured to receive the rotational position detected by the position detector 38. The electronic controller EC1 is electrically connected to the position detector 38 to receive the rotational position detected by the position detector 38.

In the present embodiment, the position detector 38 includes an acceleration sensor. The acceleration sensor is configured to detect an inclination angle of the crank arm 14 about the rotational axis A1 as the rotational position of the rotational device 10. The inclination angle of the crank arm 14 indicates the rotational position of the rotational device 10. Examples of the acceleration sensor include a dual-axis acceleration sensor.

The electronic controller EC1 is electrically connected to the acceleration sensor to receive the inclination angle detected by the acceleration sensor of the position detector 38. The electronic controller EC1 is configured to calculate the rotational position of the rotational device 10 based on the inclination angle detected by the acceleration sensor of the position detector 38. The position detector 38 can include other sensors such as a gyro meter or a magnetic sensor (e.g., a magnetic body and a hall sensor) instead of or in addition to the acceleration sensor if needed and/or desired.

The electronic controller EC1 is configured to count the number of revolutions of the rotational device 10 per unit time based on the rotational position detected by the position detector 38. Namely, the electronic controller EC1 is configured to obtain a rotational speed (e.g., a cadence) of the rotational device 10 based on the rotational position detected by the position detector 38. However, the electrical device 12 can include a cadence sensor which is a separate sensor from the position detector 38 if needed and/or desired. In such embodiments, the cadence sensor includes a detection object and a detector. The detection object is provided to one of the vehicle body 2A (see e.g., FIG. 1) and the rotational device 10. The detector is provided to the other of the vehicle body 2A and the rotational device 10. The detector is configured to detect the detection object.

As seen in FIG. 3, the electrical device 12 includes an electric power source 42 and a power-source holder 44. The electric power source 42 is electrically connected to the wireless communicator WC1, the electronic controller EC1, the force sensor 32, and the position detector 38 to supply electricity to the wireless communicator WC1, the electronic controller EC1, the force sensor 32, and the position detector 38. The power-source holder 44 is electrically connected to the wireless communicator WC1, the electronic controller EC1, the force sensor 32, and the position detector 38 to supply electricity from the electric power source 42 to the wireless communicator WC1, the electronic controller EC1, the force sensor 32, and the position detector 38. The power-source holder 44 is configured to detachably hold the electric power source 42. Examples of the electric power source 42 include a battery (e.g., a primary battery, a secondary battery).

The electronic controller EC1 is configured to calculate the force based on the deformation amount of the rotational device 10 (e.g., the crank arm 14) obtained by the force sensor 32. The electronic controller EC1 is configured to calculate the force (e.g., torque) applied to the rotational device 10 based on the deformation amount of the rotational device 10 (e.g., the crank arm 14) obtained by the force sensor 32. The rotational information INF1 includes power INF11 applied to the rotational device 10 and a rotational speed INF12 of the rotational device 10. For example, the electronic controller EC1 is configured to calculate the power INF11 applied to the rotational device 10 based on the torque applied to the rotational device 10 (e.g., the crank arm 14) and the rotational speed INF12 of the rotational device 10. However, the electronic controller EC1 can be configured to calculate the power INF11 applied to the rotational device 10 based on other data if needed and/or desired. For example, the electronic controller EC1 can be configured to calculate an average of the power INF11 during one revolution of the crank arm 14. For example, the electronic controller EC1 can be configured to calculate total power during one revolution of the crank assembly 13 by doubling the power INF11 on the only one crank arm.

The electronic controller EC1 is configured to control the wireless communicator WC1 to wirelessly transmit the rotational information INF1. The electronic controller EC1 is configured to control the wireless communicator WC1 to wirelessly transmit the power INF11 calculated by the electronic controller EC1 based on the force detected by the force sensor 32. The electronic controller EC1 is configured to control the wireless communicator WC1 to wirelessly transmit the rotational speed INF12 calculated by the electronic controller EC1.

The electrical device 12 includes an electric connector port 45 to which a cable connector of an electric cable is detachably connectable. The electric connector port 45 is electrically connected to the electronic controller EC1. In a case where the electric power source 42 includes a secondary battery, the electric power source 42 can be charged via the electric connector port 45. In such embodiments, the electrical device 12 includes a voltage controller configured to control electricity supplied from an electric power supply via the electric connector port 45. The electronic controller EC1 can be configured to communicate with another electrical device 12 via the electric connector port 45 and an electric cable for maintenance such as updating software if needed and/or desired.

The electrical device 12 is configured to communicate with the additional electrical device 6. The additional electrical device 6 is configured to wirelessly receive the rotational information INF1 from the electrical device 12. The additional electrical device 6 is configured to wirelessly transmit a signal SG to the electrical device 12 at predetermined intervals. The electrical device 12 is configured to recognize that the wireless communication is normal between the electrical device 12 and the additional electrical device 6 based on the signal SG. Examples of the additional electrical device 6 include a cyclocomputer, a smartphone, and a tablet computer.

The additional electrical device 6 includes the additional wireless communicator WC2, an additional electronic controller EC2, a display 46, and a user interface 48. The additional electronic controller EC2 is electrically connected to the additional wireless communicator WC2, the display 46, and the user interface 48 to control the additional wireless communicator WC2, the display 46, and the user interface 48.

The additional wireless communicator WC2 is configured to wirelessly receive the rotational information INF1 from the wireless communicator WC1. The additional electronic controller EC2 is electrically connected to the additional wireless communicator WC2 to receive the rotational information INF1 (e.g., the power INF11, the rotational speed INF12) wirelessly received by the additional wireless communicator WC2.

As seen in FIG. 3, the additional electronic controller EC2 includes a processor 50P, a memory 50M, and a circuit board 50C, and a bus 50D. The processor 50P is coupled to the memory 50M. The memory 50M is coupled to the processor 50P. The processor 50P and the memory 50M are electrically mounted on the circuit board 50C. The processor 50P is electrically connected to the memory 50M via the circuit board 50C and the bus 50D. The memory 50M is electrically connected to the processor 50P via the circuit board 50C and the bus 50D. The bus 50D is provided on the circuit board 50C. The additional electronic controller EC2 includes a semiconductor.

For example, the processor 50P includes at least one of a CPU, a MPU, and a memory controller. The memory 50M is electrically connected to the processor 50P. For example, the memory 50M includes at least one of a volatile memory and a non-volatile memory. Examples of the volatile memory include a RAM and a DRAM. Examples of the non-volatile memory include a ROM, an EEPROM, and an HDD. The memory 50M includes storage areas each having an address. The processor 50P is configured to control the memory 50M to store data in the storage areas of the memory 50M and reads data from the storage areas of the memory 50M. The processor 50P can also be referred to as a hardware processor 50P. The memory 50M can also be referred to as a hardware memory 50M. The memory 50M can also be referred to as a computer-readable storage medium 50M.

The additional electronic controller EC2 is programed to execute at least one control algorithm of the additional electrical device 6. The memory 50M (e.g., the ROM) stores at least one program including at least one program instruction. The at least one program is read into the processor 50P, and thereby the at least one control algorithm of the additional electrical device 6 is executed based on the at least one program. The additional electronic controller EC2 can also be referred to as an electronic controller circuit or circuitry EC2. The additional electronic controller EC2 can also be referred to as a hardware additional electronic controller EC2.

The structure of the additional electronic controller EC2 is not limited to the above structure. The structure of the additional electronic controller EC2 is not limited to the processor 50P, the memory 50M, and the bus 50D. The additional electronic controller EC2 can be realized by hardware alone or a combination of hardware and software. The processor 50P and the memory 50M can be integrated as a one chip such as an ASIC or a FPGA.

As seen in FIG. 3, the additional wireless communicator WC2 is electrically connected to the processor 50P and the memory 50M with the circuit board 50C and the bus 50D. The additional wireless communicator WC2 is electrically mounted on the circuit board. The additional wireless communicator WC2 includes a signal transmitting circuit or circuitry, a signal receiving circuit or circuitry, and an antenna. Thus, the additional wireless communicator WC2 can also be referred to as an additional wireless communicator circuit or circuitry WC2.

The additional wireless communicator WC2 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the additional wireless communicator WC2 is configured to encrypt signals using a cryptographic key to generate encrypted wireless signals. The additional wireless communicator WC2 is configured to transmit wireless signals via the antenna. The additional wireless communicator WC2 can be a one-way wireless communication device such as a receiver, or a two-way wireless communication device such as a transceiver.

The additional wireless communicator WC2 is configured to receive wireless signals via the antenna. In the present embodiment, the additional wireless communicator WC2 is configured to decode the wireless signals to recognize signals transmitted from other additional wireless communicators. The additional wireless communicator WC2 is configured to decrypt the wireless signals using the cryptographic key.

The display 46 is configured to display the force (e.g., the power INF11, the rotational speed INF12) wirelessly transmitted from the wireless communicator WC1 of the electrical device 12. The additional electronic controller EC2 is configured to control the display 46 to display the force (e.g., the power INF11, the rotational speed INF12).

The user interface 48 is configured to receive a user input. Examples of the user interface 48 include a mouse, a keyboard, and a touch panel. The additional electronic controller EC2 is configured to receive the user input via the user interface 48.

The additional electrical device 6 includes an electric power source 52 and a power-source holder 54. The electric power source 52 is electrically connected to the additional wireless communicator WC2, the additional electronic controller EC2, the display 46, and the user interface 48 to supply electricity to the additional wireless communicator WC2, the additional electronic controller EC2, the display 46, and the user interface 48. The power-source holder 54 is electrically connected to the additional wireless communicator WC2, the additional electronic controller EC2, the display 46, and the user interface 48 to supply electricity from the electric power source 52 to the additional wireless communicator WC2, the additional electronic controller EC2, the display 46, and the user interface 48. The power-source holder 54 is configured to detachably hold the electric power source 52. Examples of the electric power source 52 include a battery (e.g., a primary battery, a secondary battery).

As seen in FIG. 3, the electrical device 12 is configured to communicate with an external electrical device 8. The external electrical device 8 is configured to receive a user input INF2 from the user. The external electrical device 8 is configured transmit the user input INF2 to the electrical device 12. The electronic controller EC1 is configured to receive the user input INF2 from the external electrical device 8. Examples of the external electrical device 8 include a cyclocomputer, a smartphone, a tablet computer, and a personal computer. For example, the user input INF2 includes identification information INF21 of the rotational device 10 and identification information INF22 of the human-powered vehicle 2. The identification information INF21 of the rotational device 10 includes at least one of a name of a manufacturer, a model name, and a model number of the rotational device 10. The identification information INF22 of the human-powered vehicle 2 includes at least one of a name of a manufacturer, a model name, and a model number of the human-powered vehicle 2.

The external electrical device 8 includes an external wireless communicator WC3, an external electronic controller EC3, a display 56, and a user interface 58. The external electronic controller EC3 is electrically connected to the external wireless communicator WC3, the display 56, and the user interface 58 to control the external wireless communicator WC3, the display 56, and the user interface 58.

As seen in FIG. 3, the external electronic controller EC3 includes a processor 60P, a memory 60M, and a circuit board 60C, and a bus 60D. The processor 60P is coupled to the memory 60M. The memory 60M is coupled to the processor 60P. The processor 60P and the memory 60M are electrically mounted on the circuit board 60C. The processor 60P is electrically connected to the memory 60M via the circuit board 60C and the bus 60D. The memory 60M is electrically connected to the processor 60P via the circuit board 60C and the bus 60D. The bus 60D is provided on the circuit board 60C. The external electronic controller EC3 includes a semiconductor.

For example, the processor 60P includes at least one of a CPU, a MPU, and a memory controller. The memory 60M is electrically connected to the processor 60P. For example, the memory 60M includes at least one of a volatile memory and a non-volatile memory. Examples of the volatile memory include a RAM and a DRAM. Examples of the non-volatile memory include a ROM, an EEPROM, and an HDD. The memory 60M includes storage areas each having an address. The processor 60P is configured to control the memory 60M to store data in the storage areas of the memory 60M and reads data from the storage areas of the memory 60M. The processor 60P can also be referred to as a hardware processor 60P. The memory 60M can also be referred to as a hardware memory 60M. The memory 60M can also be referred to as a computer-readable storage medium 60M.

The external electronic controller EC3 is programed to execute at least one control algorithm of the additional electrical device 6. The memory 60M (e.g., the ROM) stores at least one program including at least one program instruction. The at least one program is read into the processor 60P, and thereby the at least one control algorithm of the additional electrical device 6 is executed based on the at least one program. The external electronic controller EC3 can also be referred to as an electronic controller circuit or circuitry EC3. The external electronic controller EC3 can also be referred to as a hardware external electronic controller EC3.

The structure of the external electronic controller EC3 is not limited to the above structure. The structure of the external electronic controller EC3 is not limited to the processor 60P, the memory 60M, and the bus 60D. The external electronic controller EC3 can be realized by hardware alone or a combination of hardware and software. The processor 60P and the memory 60M can be integrated as a one chip such as an ASIC or a FPGA.

The external wireless communicator WC3 is configured to wirelessly communicate with another wireless communicator such as the wireless communicator WC1 and the additional wireless communicator WC2. However, the external electrical device 8 can include an external wired communicator if needed and/or desired. The external wired communicator is configured to communicate with the electrical device 12 via an electric cable using power line communication (PLC) technology.

As seen in FIG. 3, the external wireless communicator WC3 is electrically connected to the processor 60P and the memory 60M with the circuit board 60C and the bus 60D. The external wireless communicator WC3 is electrically mounted on the circuit board. The external wireless communicator WC3 includes a signal transmitting circuit or circuitry, a signal receiving circuit or circuitry, and an antenna. Thus, the external wireless communicator WC3 can also be referred to as an external wireless communicator WC3 circuit or circuitry WC3.

The external wireless communicator WC3 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the external wireless communicator WC3 is configured to encrypt signals using a cryptographic key to generate encrypted wireless signals. The external wireless communicator WC3 is configured to transmit wireless signals via the antenna. The external wireless communicator WC3 can be a one-way wireless communication device such as a receiver, or a two-way wireless communication device such as a transceiver.

The external wireless communicator WC3 is configured to receive wireless signals via the antenna. In the present embodiment, the external wireless communicator WC3 is configured to decode the wireless signals to recognize signals transmitted from other external wireless communicators. The external wireless communicator WC3 is configured to decrypt the wireless signals using the cryptographic key.

The display 56 is configured to display information relating to the human-powered vehicle 2. The external electronic controller EC3 is configured to control the display 56 to display the information relating to the human-powered vehicle 2. For example, the information relating to the human-powered vehicle 2 includes the force and the settings of the rotational device 10.

The user interface 58 is configured to receive the user input INF2. Examples of the user interface 58 include a mouse, a keyboard, and a touch panel. The external electronic controller EC3 is configured to receive the user input via the user interface 58. The external electronic controller EC3 is configured to receive the user input INF2 via the user interface 58.

The electronic controller EC1 is configured to receive the user input INF2 from the external electrical device 8. The electronic controller EC1 is configured to receive the user input INF2 via the wireless communicator WC1 and the external wireless communicator WC3. For example, the electronic controller EC1 is configured to change settings based on the user input INF2.

The external electrical device 8 includes an electric power source 62 and a power-source holder 64. The electric power source 62 is electrically connected to the external wireless communicator WC3, the external electronic controller EC3, the display 56, and the user interface 58 to supply electricity to the external wireless communicator WC3, the external electronic controller EC3, the display 56, and the user interface 58. The power-source holder 64 is electrically connected to the external wireless communicator WC3, the external electronic controller EC3, the display 56, and the user interface 58 to supply electricity from the electric power source 62 to the external wireless communicator WC3, the external electronic controller EC3, the display 56, and the user interface 58. The power-source holder 64 is configured to detachably hold the electric power source 62. Examples of the electric power source 62 include a battery (e.g., a primary battery, a secondary battery).

As seen in FIG. 3, the electronic controller EC1 is configured to control the wireless communicator WC1 to wirelessly transmit the rotational information INF1 at predetermined intervals. The electronic controller EC1 is configured to control the wireless communicator WC1 to wirelessly transmit the rotational information INF1 using wireless signals at the predetermined intervals. The electronic controller EC1 is configured to control the wireless communicator WC1 to wirelessly transmit the power INF11 and the rotational speed INF12 using the wireless signals at the predetermined intervals. In FIG. 3, the rotational speed INF12 of the rotational device 10 is illustrated to be constant for sake of brevity. However, the rotational speed INF12 of the rotational device 10 can vary depending on pedaling.

The additional wireless communicator WC2 of the additional electrical device 6 is configured to wirelessly receive the rotational information INF1 transmitted from the wireless communicator WC1 of the electrical device 12 at the predetermined intervals. The additional wireless communicator WC2 of the additional electrical device 6 is configured to wirelessly receive the power INF11 and the rotational speed INF12 transmitted from the wireless communicator WC1 of the electrical device 12 at the predetermined intervals.

The additional electronic controller EC2 of the additional electrical device 6 is configured to control the display 46 to display the force wirelessly received by the additional wireless communicator WC2 at the predetermined intervals. The additional electronic controller EC2 is configured to control the display 46 to display the power INF11 and the rotational speed INF12 wirelessly received by the additional wireless communicator WC2 at the predetermined intervals. The additional electronic controller EC2 is configured to control the display 46 to display the latest values of the power INF11 and the rotational speed INF12. Thus, the user can recognize the power INF11 and the rotational speed INF12 of the rotational device 10 via the display 46 of the additional electrical device 6 during pedaling.

Figure 4:
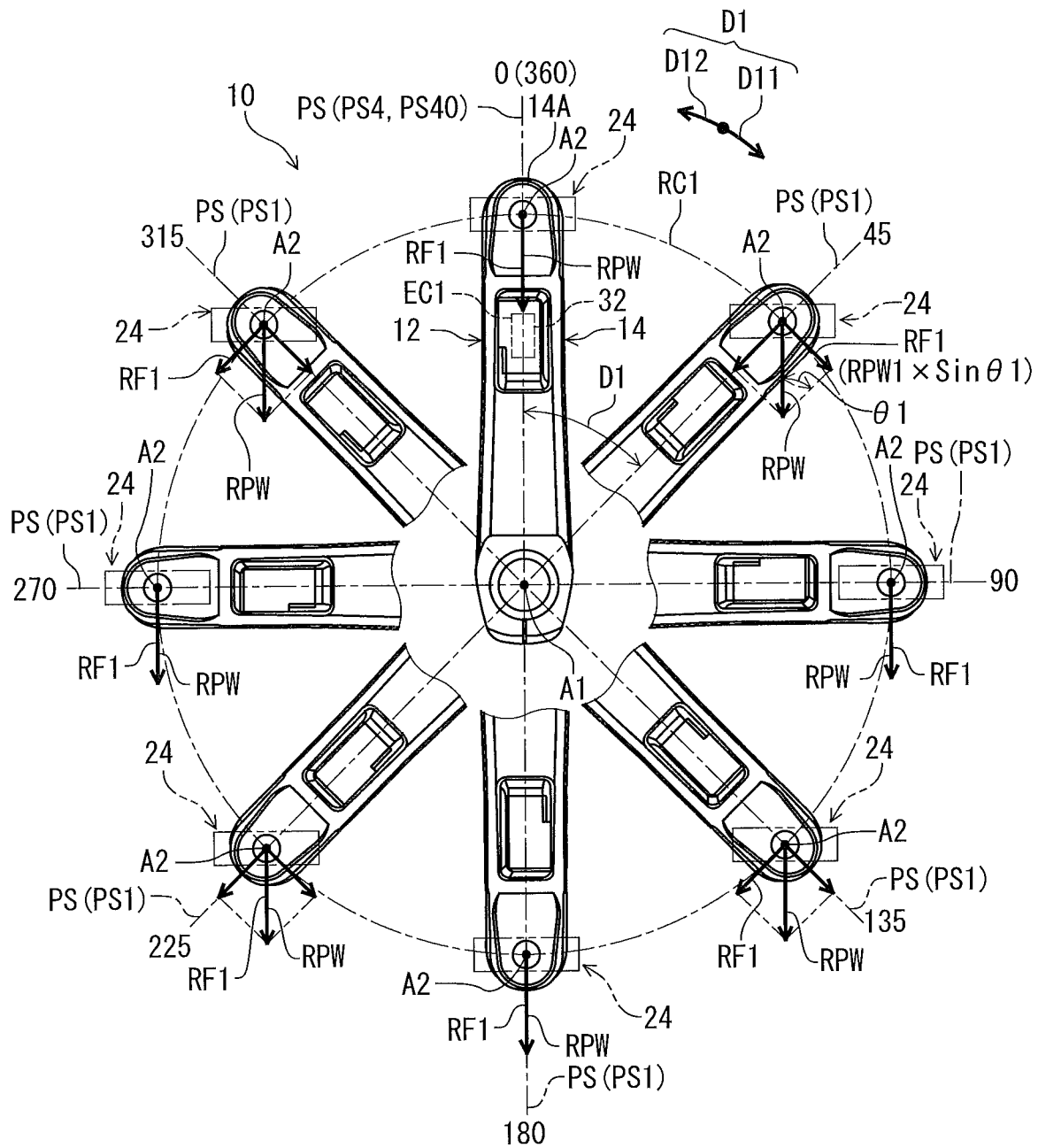
FIG. 4 shows a crank arm of the rotational device illustrated in FIG. 1, a reference pedal weight, and a reference force at each angle about a rotational axis of the rotational device.

As seen in FIG. 4, the electronic controller EC1 is configured to adjust the measurement value of the force sensor 32 based on the rotational position PS detected by the position detector 38. The rotational position PS includes a rotational position PS1 of the crank arm 14. The position detector 38 is configured to detect the rotational position PS1 of the crank arm 14. The rotational position PS1 of the crank arm 14 is defined based on the rotational axis A2 of the pedal body 24B. The rotational position PS1 is an original position PS10 in a state where the rotational axis A2 of the pedal body 24B is provided just above the rotational axis A1. The rotational position PS1 has an angle $\theta 1$ defined from the original position PS10 about the rotational axis A1 in the driving rotational direction D11. The electronic controller EC1 is configured to adjust the measurement value of the force sensor 32 based on the angle $\theta 1$ detected by the position detector 38.

The electronic controller EC1 is configured to adjust the measurement value of the force sensor 32 based on the rotational position PS detected by the position detector 38 without a user input indicating adjustment of the measurement value of the force sensor 32. The electronic controller EC1 is configured to adjust the measurement value of the force sensor 32 based on the rotational position PS1 detected by the position detector 38 without a user input indicating adjustment of the measurement value of the force sensor 32. The electronic controller EC1 is configured to automatically adjust the measurement value of the force sensor 32 based on the rotational position PS1 detected by the position detector 38 without a user input indicating a start of the adjustment of the measurement value.

The electronic controller EC1 is configured to adjust the measurement value of the force sensor 32 based on a reference pedal weight RPW of the pedal 24 and the rotational position PS detected by the position detector 38. The electronic controller EC1 is configured to adjust the measurement value of the force sensor 32 based on the reference pedal weight RPW of the pedal 24 and the rotational position PS1 detected by the position detector 38. The electronic controller EC1 is configured to store the reference pedal weight RPW. The electronic controller EC1 is configured to store the reference pedal weight RPW in the memory 30M. The electronic controller EC1 is configured to store the reference pedal weight RPW as default settings in the memory 30M.

The electronic controller EC1 is configured to calculate a reference rotational force RF1 directing in the rotational direction D1 of the rotational device 10 based on the reference pedal weight RPW and the rotational position PS detected by the position detector 38 in a reference state where the force F1 measured by the force sensor 32 is lower than a force threshold FT1 and the rotational position PS detected by the position detector 38 does not change. The electronic controller EC1 is configured to calculate the reference rotational force RF1 directing in the rotational direction D1 of the rotational device 10 based on the reference pedal weight RPW and the rotational position PS1 detected by the position detector 38 in the reference state where the force F1 measured by the force sensor 32 is lower than the force threshold FT1 and the rotational position PS1 detected by the position detector 38 does not change. The reference rotational force RF1 is defined in a tangential direction of a reference circle RC1. The reference circle RC1 is defined as a locus of the rotational axis A2 of the pedal 24 and has the rotational axis A1 as a center.

The electronic controller EC1 is configured to calculate the reference rotational force RF1 directing in the driving rotational direction D11 based on the reference pedal weight RPW and the rotational position PS1 (e.g., the angle θ1) detected by the position detector 38 in the reference state. The electronic controller EC1 is configured to store the reference rotational force RF1 in the memory 30M. For example, the electronic controller EC1 is configured to calculate the reference rotational force RF1 based on the following equation (1).

$$RF1=RPW \times \sin \theta 1 \tag{1}$$

In the reference state, the user does not apply any force to the pedal 24 and the rotational device 10 is stationary relative to the vehicle body 2A. The force threshold FT1 is set to be higher than a force which is caused by a pedal weigh of the pedal 24 and directs in the rotational direction D1. The electronic controller EC1 is configured to store the force threshold FT1 in the memory 30M.

Figure 5:
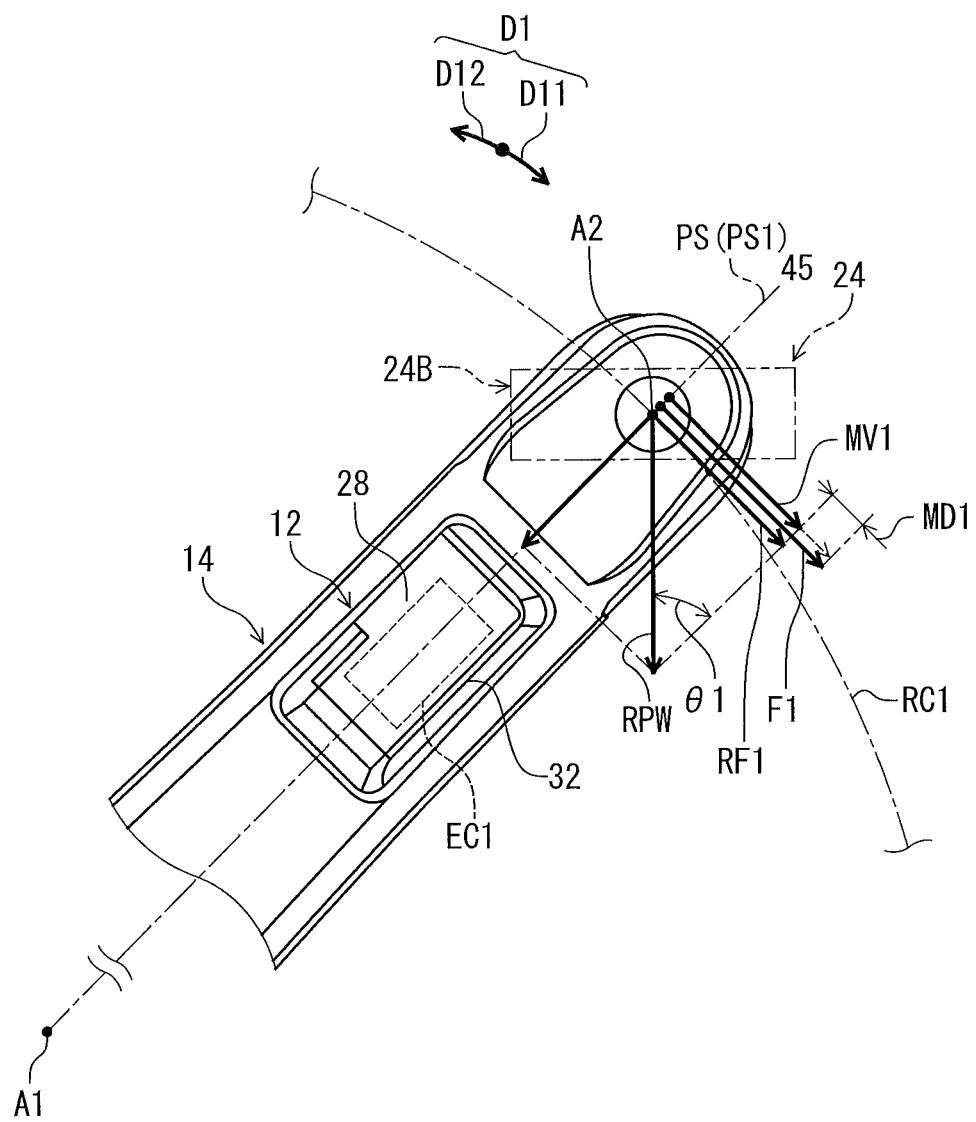
FIG. 5 shows the crank arm, the reference pedal weight, the reference force, a force measured by a force sensor of an electrical device of the rotational device, and a measurement difference between the reference force and the force for explaining adjustment of a measurement value of the force sensor.

As seen in FIG. 5, the electronic controller EC1 is configured to calculate, as a measurement difference MD1, a difference between the reference rotational force RF1 and the force F1 measured by the force sensor 32 in the reference state. The electronic controller EC1 is configured to subtract the reference rotational force RF1 from the force F1 measured by the force sensor 32 in the reference state. The electronic controller EC1 is configured to store the measurement difference MD1 calculated based on the reference rotational force RF1. The measurement difference MD1 can also be referred to as a measurement error MD1 of the force sensor 32. The electronic controller EC1 is configured to store the measurement difference MD1 in the memory 30M.

The measurement difference MD1 is greater than zero in a case where the force F1 measured by the force sensor 32 is greater than the reference rotational force RF1. The measurement difference MD1 is less than zero in a case where the force F1 measured by the force sensor 32 is less than the reference rotational force RF1. The electronic controller EC1 is configured to store the measurement difference MD1 with a positive or negative sign in the memory 30M.

The electronic controller EC1 is configured to subtract the measurement difference MD1 from the force F1 measured by the force sensor 32 to adjust the measurement value MV1 in a rotation state where the rotational position PS detected by the position detector 38 changes. Specifically, the electronic controller EC1 is configured to obtain the force F1 measured by the force sensor 32 at the predetermined intervals in the rotation state. The electronic controller EC1 is configured to subtract the measurement difference MD1 from the force F1 measured by the force sensor 32 to adjust the measurement value in the rotation state at the predetermined intervals. Thus, it is possible to improve accuracy of the power INF11 calculated based on the force F1 measured by the force sensor 32.

Figure 6:
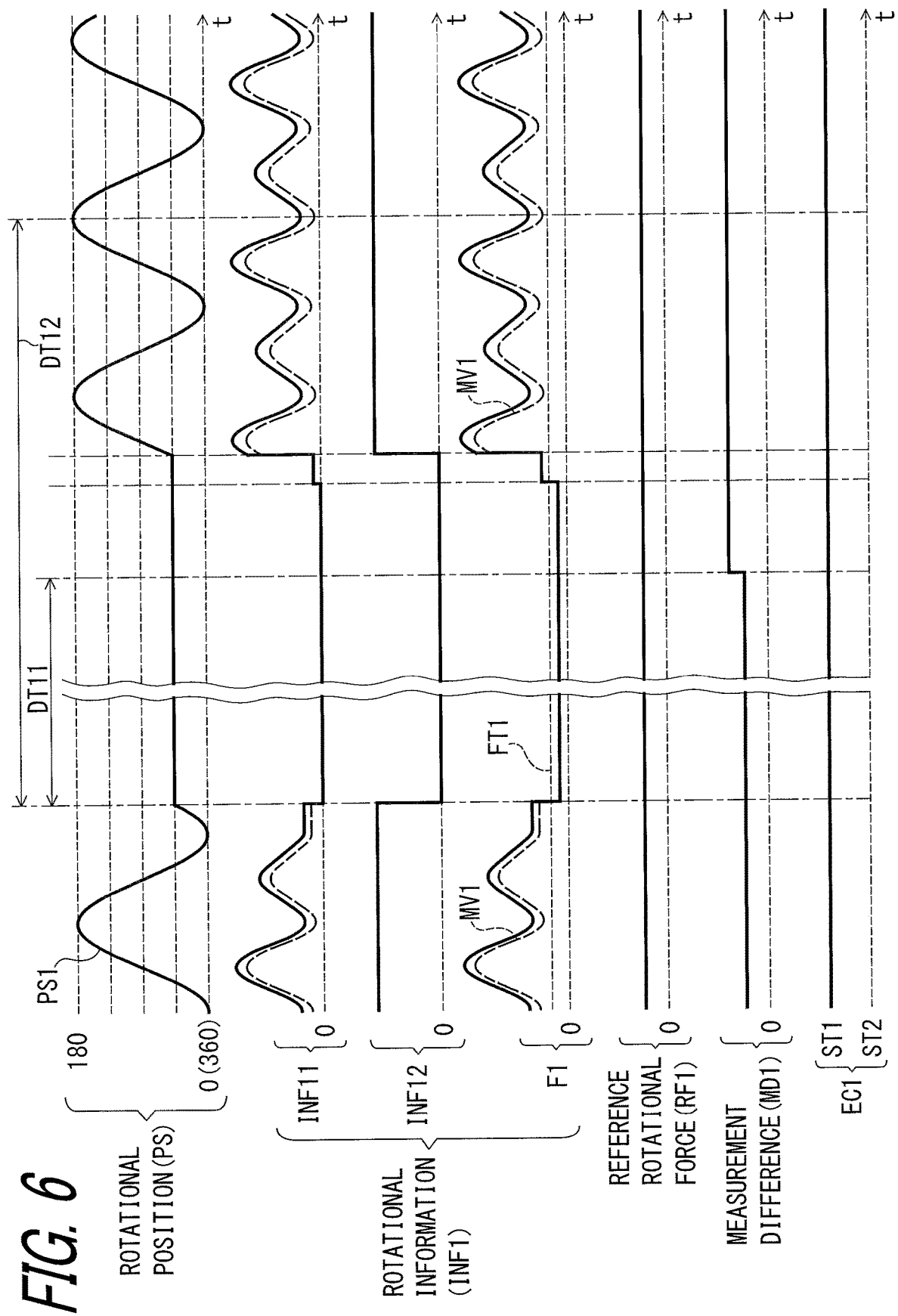
FIGS. 6 and 7 are timing charts showing control of the electrical device of the rotational device illustrated in FIG. 1.

As seen in FIG. 6, the electronic controller EC1 is configured to calculate the measurement difference MD1 in a case where the reference state continues for a determination time DT11. The electronic controller EC1 is configured to calculate the measurement difference MD1 in a case where the force F1 measured by the force sensor 32 is lower than the force threshold FT1 and the rotational position PS detected by the position detector 38 does not change for the determination time DT11.

The electronic controller EC1 has a first state ST1 where the electronic controller EC1 operates with first power consumption, and a second state ST2 where the electronic controller EC1 operates with second power consumption lower than the first power consumption. The first state ST1 can also be referred to as a wake mode. The second state ST2 can also be referred to as a sleep mode. For example, when the acceleration sensor detects the rotational position of the rotational device 10 is changed while the electronic controller EC1 is operating in the second state, the electronic controller EC1 switches from the second state to the first state. When the acceleration sensor detects an acceleration equal to or greater than a predetermined value while the electronic controller EC1 is in the second state, the electronic controller EC1 can switch from the second state to the first state.

The electronic controller EC1 includes a power control circuit configured to control electricity supplied to the wireless communicator WC1. The electronic controller EC1 is configured to obtain the rotational position PS of the rotational device 10 in each of the first state and the second state. The electronic controller EC1 is configured to supply electricity from the electric power source 42 to the wireless communicator WC1 in the first state ST1. The electronic controller EC1 is configured to stop electricity supplied to the wireless communicator WC1 in the second state ST2. Thus, the wireless communicator WC1 does not transmit wireless signals in the second state ST2. The wireless communicator WC1 does not receive wireless signals from the additional electrical device 6 and the external electrical device 8 in the second state ST2.

However, the wireless communicator WC1 can be configured to receive wireless signals from other devices in the second state if needed and/or desired. In such embodiments, the electronic controller EC1 can be configured to supply electricity to the signal transmitting circuit of the wireless communicator WC1 in response to the wireless signal transmitted from at least one of the additional electrical device 6 and the external electrical device 8 if needed and/or desired.

Furthermore, the electronic controller EC1 can be configured to stop electricity to the electronic controller EC1 and the wireless communicator WC1 in the second state ST2. In such embodiments, the electronic controller EC1 and the wireless communicator WC1 can be configured to be turned on in response to an operation of a switch provided to the electrical device 12, changing the state from the second state ST2 to the first state ST1.

In FIG. 6, the rotational speed INF12 of the rotational device 10 is illustrated to be constant for sake of brevity. However, the rotational speed INF12 of the rotational device 10 can vary depending on pedaling. Furthermore, FIG. 3 shows an example of the rotational information INF1 in a case where the binding pedals are used. However, the rotational information INF1 can have other waveforms if needed and/or desired.

Figure 7:
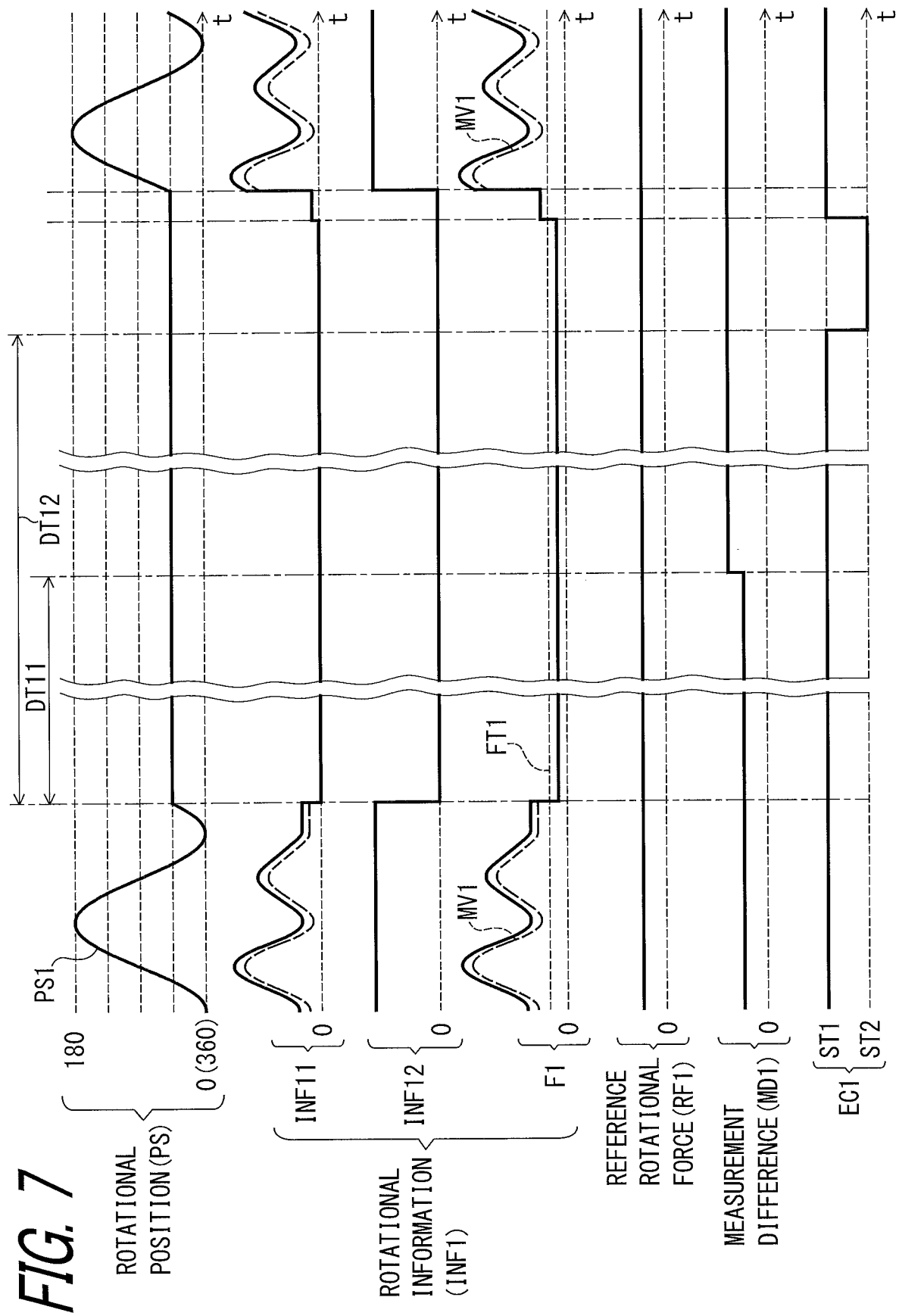

As seen in FIG. 7, the electronic controller EC1 is configured to change a state of the electronic controller EC1 from the first state ST1 to the second state ST2 in a case where, for a sleep determination time DT12, the force F1 measured by the force sensor 32 is lower than the force threshold FT1 and the rotational position PS (e.g., the rotational position PS1) detected by the position detector 38 does not change. The electronic controller EC1 is configured to change a state of the electronic controller EC1 from the first state ST1 to the second state ST2 in a case where the reference state continues for the sleep determination time DT12. The wireless communicator WC1 is configured not to wirelessly transmit signals after the reference state continues for the sleep determination time DT12.

The electronic controller EC1 is configured to change the state of the electronic controller EC1 from the second state ST2 to the first state ST1 in a case where the force F1 measured by the force sensor 32 is higher than the force threshold FT1 in the second state ST2 or if the rotational position PS (e.g., the rotational position PS1) detected by the position detector 38 changes in the second state ST2. For example, when the user's shoe is coupled to the biding structure of the pedal 24, the force F1 measured by the force sensor 32 is higher than the force threshold FT1 or the rotational position PS (e.g., the rotational position PS1) detected by the position detector 38 changes. The wireless communicator WC1 is configured to start to wirelessly transmit signals after the electronic controller EC1 concludes that the force F1 measured by the force sensor 32 is higher than the force threshold FT1 in the second state ST2 or that the rotational position PS (e.g., the rotational position PS1) detected by the position detector 38 changes in the second state ST2.

In the present embodiment, the sleep determination time DT12 is longer than the determination time DT11. Thus, the electronic controller EC1 is configured to calculate the measurement difference MD1 before the electronic controller EC1 changes the state of the electronic controller EC1 from the first state ST1 to the second state ST2. However, the sleep determination time DT12 can be equal to or shorter than the determination time DT11 if needed and/or desired.

Figure 8:
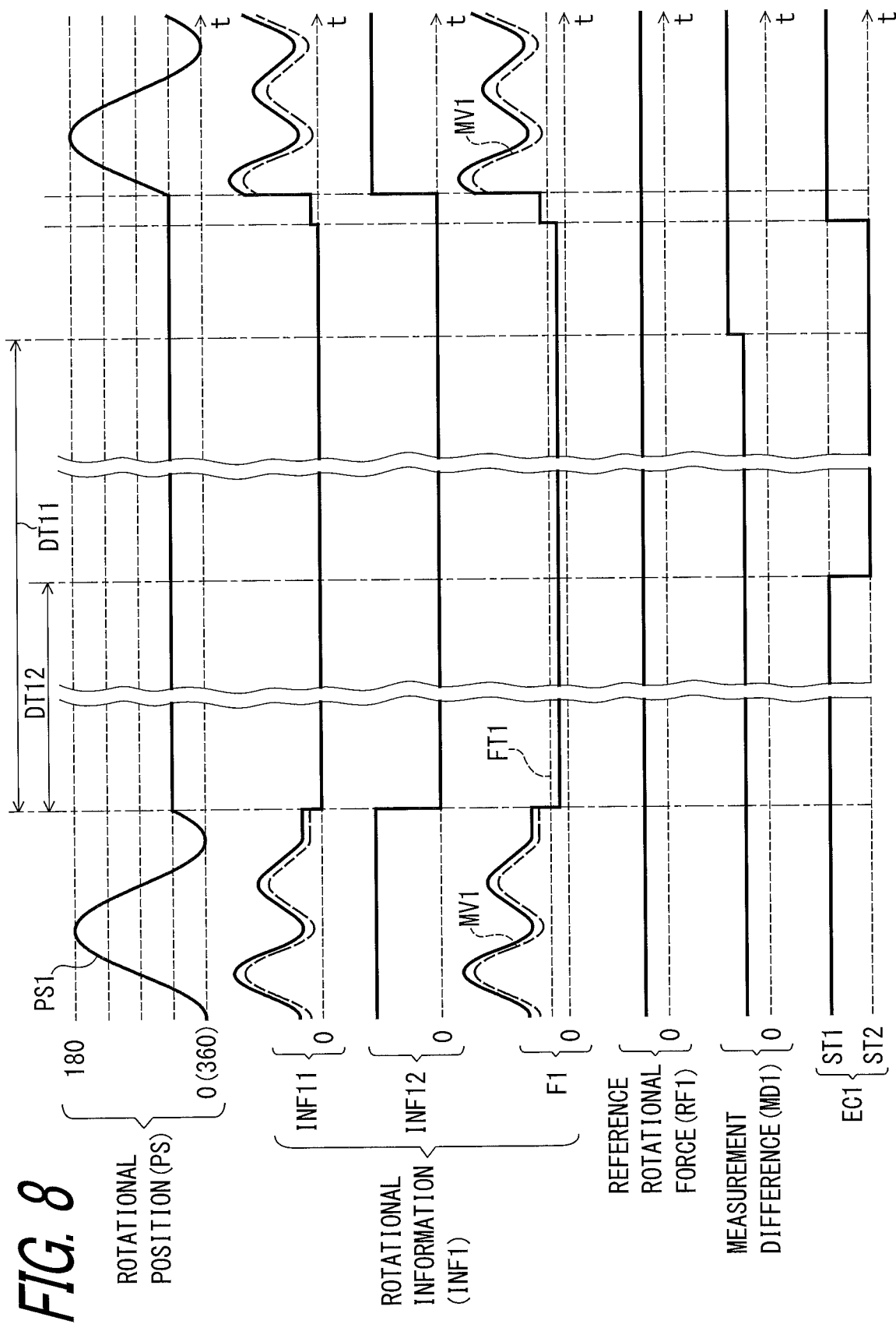
FIG. 8 is a timing chart showing control of an electrical device of a rotational device in accordance with a modification.

As seen in FIG. 8, for example, the electronic controller EC1 can be configured to calculate the measurement difference MD1 after the electronic controller EC1 changes the state of the electronic controller EC1 from the second state ST2 to the first state ST1. In such embodiments, the sleep determination time DT12 is shorter than the determination time DT11.

Figure 9:
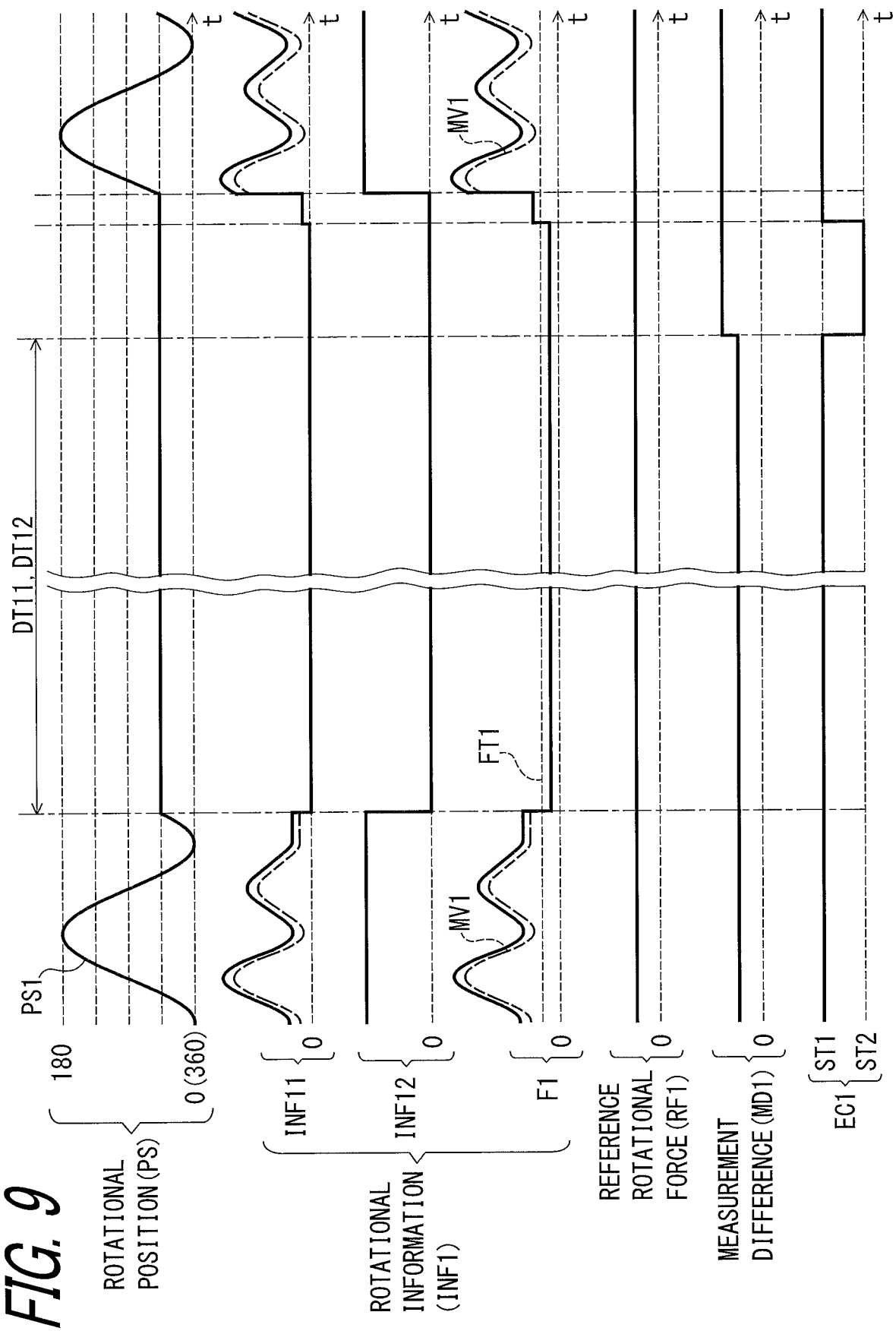
FIG. 9 is a timing chart showing control of an electrical device of a rotational device in accordance with a modification.

As seen in FIG. 9, for example, the electronic controller EC1 can be configured to calculate the measurement difference MD1 when the electronic controller EC1 changes the state of the electronic controller EC1 from the second state ST2 to the first state ST1. In such embodiments, the sleep determination time DT12 is equal to the determination time DT11.

As seen in FIG. 3, the electronic controller EC1 is configured to set the reference pedal weight RPW based on input information INF23 relating to the pedal 24. The user input INF2 includes the input information INF23. The electronic controller EC1 is configured to receive the input information INF23 from the external electrical device 8. The input information INF23 includes at least one of the reference pedal weight RPW of the pedal 24 and the identification information INF21 of the pedal 24. The identification information INF21 includes at least one of a name of a manufacturer of the pedal 24, a model name of the pedal 24, and a model number of the pedal 24.

As seen in FIG. 10, the electronic controller EC1 is configured to store at least two pedal weights PW. The electronic controller EC1 is configured to store at least two pedal weights PW in the memory 30M. The electronic controller EC1 is configured to set, as the reference pedal weight RPW, one of the at least two pedal weights PW corresponding to the input information INF23.

The electronic controller EC1 is configured to store at least two pedal weights PW (e.g., PW1 to PW9) and at least two model numbers NR (e.g., NR1 to NR9) of at least two rotational devices in the memory 30M. The at least two pedal weights PW correspond to the at least two model numbers NR of at least two rotational devices. The electronic controller EC1 is configured to select one of the at least two pedal weights PW which corresponds to a model number included in the identification information INF21 of the input information INF23.

The electronic controller EC1 is configured to update the reference pedal weight RPW stored in the memory 30M based on the pedal weight PW selected by the electronic controller EC1. For example, in a case where a pedal is attached to the crank arm 14 of the rotational device 10 by user or another manufacturing company after shipment of the rotational device 10 or in a case where a pedal of the rotational device 10 is replaced with another pedal by the user or another manufacturing company, the electronic controller EC1 is configured to select one of the at least two pedal weights PW which correspond to the input information INF23 transmitted from the external electrical device 8. The electronic controller EC1 is configured to use at least one of the reference pedal weight RPW stored in the memory 30M as the default settings in a case where the electronic controller EC1 does not receive the input information INF23 from the external electrical device 8.

Figure 11:
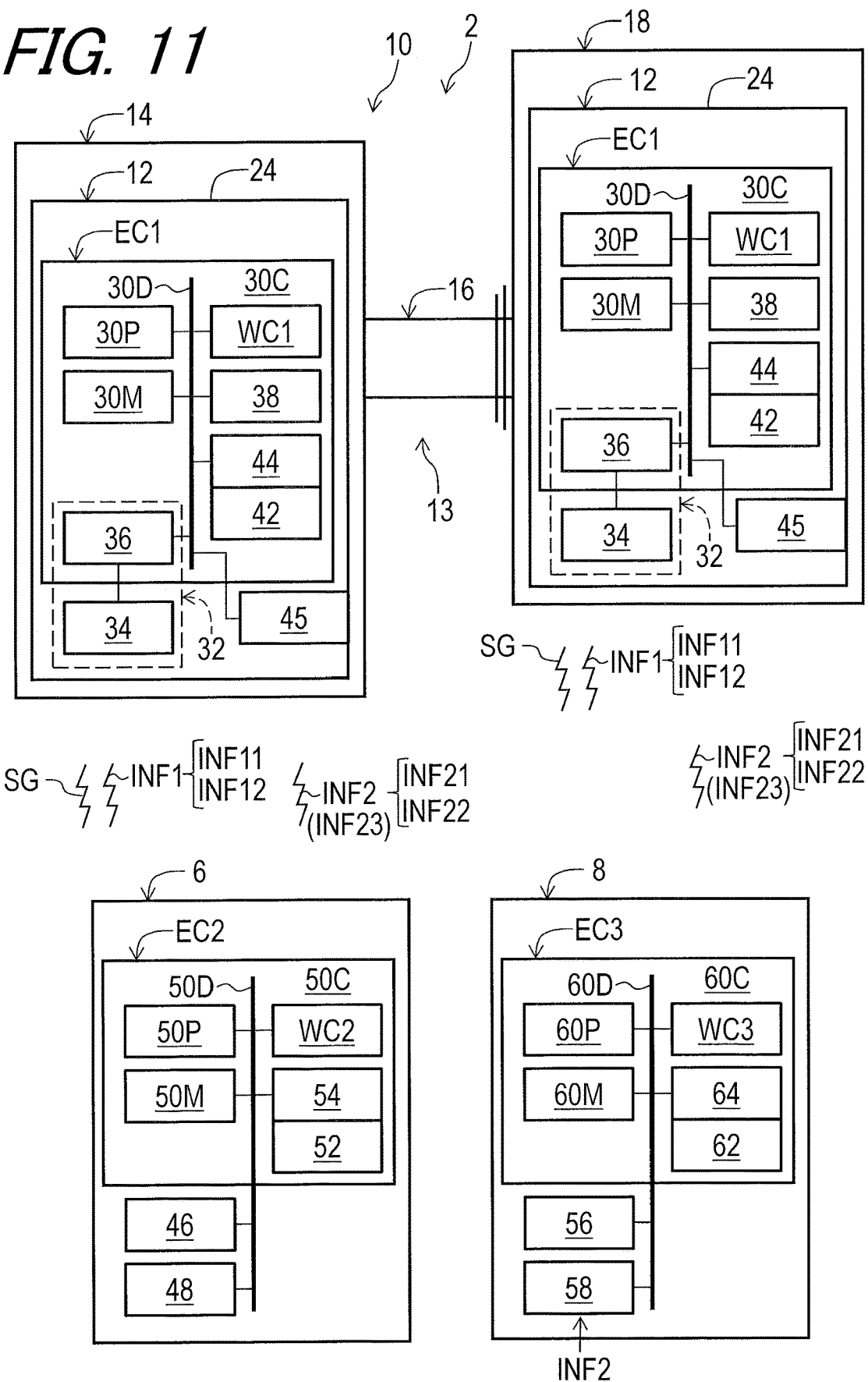
FIG. 11 is a schematic block diagram of a rotational device in accordance with a modification.

As seen in FIG. 11, the electrical device 12 can be provided to the crank arm 18 if needed and/or desired. In such embodiments, the rotational device 10 includes at least one of the electrical device 12 provided to the crank arm 14 and the electrical device 12 provided to the crank arm 18. The electrical device 12 provided to the crank arm 18 is configured to wirelessly transmit the rotational information INF1 of the crank arm 18 while the electrical device 12 provided to the crank arm 14 is configured to wirelessly transmit the rotational information INF1 of the crank arm 14. The additional electrical device 6 is configured to separately display the power INF11 applied to the crank arm 14 and the power INF11 applied to the crank arm 18. The additional electrical device 6 is configured to display one of the rotational speed INF12 of the crank arm 14 and the rotational speed INF12 of the crank arm 18. The additional electrical device 6 can be configured to display an average value of the rotational speed INF12 of the crank arm 14 and the rotational speed INF12 of the crank arm 18.

Second Embodiment

A rotational device 210 in accordance with a second embodiment will be described below referring to FIGS. 12 and 13. The rotational device 210 has the same structure and/or configuration as those of the rotational device 10 except for the arrangement of the electrical device 12. Thus, elements having substantially the same function as those in the first embodiment will be numbered the same here and will not be described and/or illustrated again in detail here for the sake of brevity.

Figure 12:
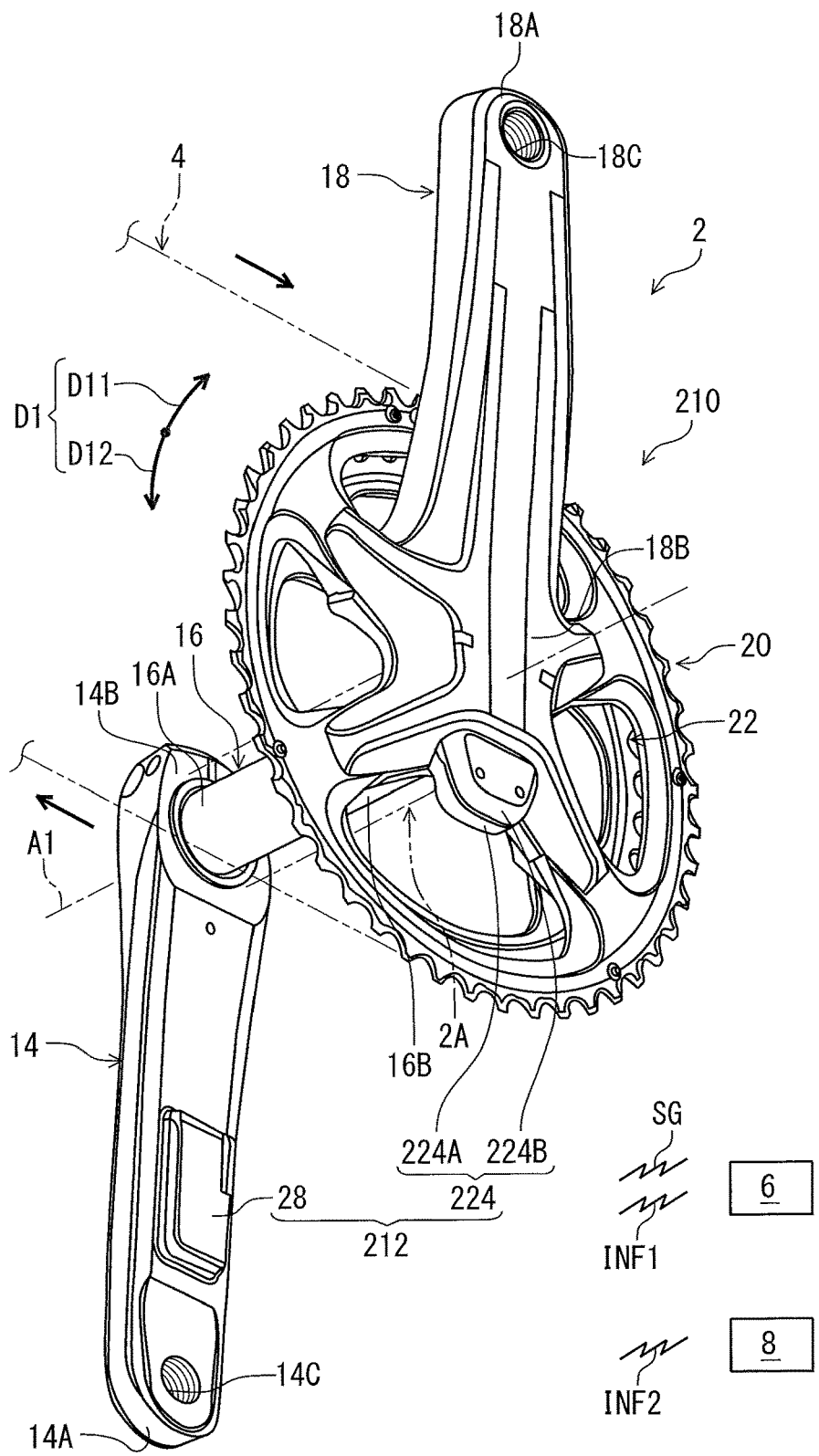
FIG. 12 is a perspective view of a rotational device in accordance with a second embodiment.

As seen in FIGS. 12 and 13, the rotational device 210 comprises the crank arm 14, the crank arm 18, and the crank axle 16. The rotational device 210 for the human-powered vehicle 2 comprises an electrical device 212. The electrical device 212 has substantially the same structure as the structure of the electrical device 12 of the first embodiment. The electrical device 212 is at least partially provided to at least one of the crank axle 16, the crank arm 14, and the sprocket 20 and/or 22. The electrical device 212 is at least partially provided to the crank arm 14.

As seen in FIG. 13, the electrical device 212 is partially provided to the crank arm 14, partially provided to the crank axle 16, and partially provided to the crank arm 18. The wireless communicator WC1, the electronic controller EC1, the force sensor 32, and the position detector 38 are provided to the crank arm 14. The electric power source 42 and the power-source holder 44 are provided to the crank axle 16. The electric connector port 45 is provided to the crank arm 18. The power-source holder 44 is electrically connected to the electronic controller EC1 and the electric connector port 45 via an electric cable.

As seen in FIG. 12, the electrical device 212 includes the housing 28 and an additional housing 224. The additional housing 224 is attached to the crank arm 18. The electric connector port 45 is coupled to the additional housing 224. For example, the additional housing 224 includes a housing body 224A and a lid 224B. The housing body 224A is secured to the crank arm 18. The lid 224B is detachably attached to the housing body 224A to cover the electric connector port 45 at least partially. The electric connector port 45 is connectable to an electric cable to charge the electric power source 42 via the electric connector port 45 and the power-source holder 44.

Figure 14:
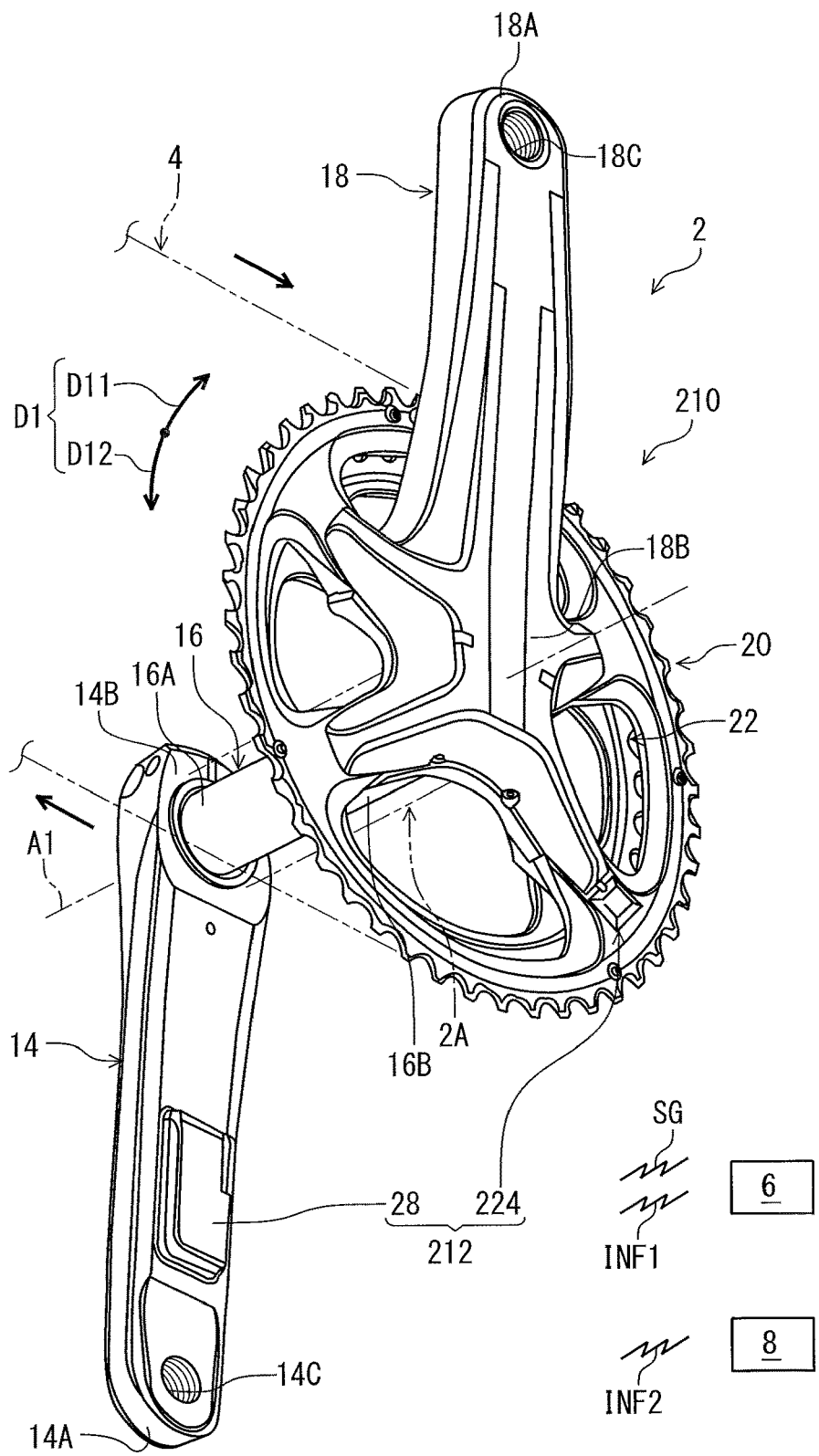
FIG. 14 is a perspective view of a rotational device in accordance with a modification.

As seen in the modification depicted in FIG. 14, the electrical device 212 can be at least partially provided to the sprocket 20 if needed and/or desired. The additional housing 224 can be attached to the sprocket 20 if needed and/or desired.

Third Embodiment

A rotational device 310 in accordance with a third embodiment will be described below referring to FIGS. 15 to 17. The rotational device 310 has the same structure and/or configuration as those of the rotational device 210 except for an additional force sensor. Thus, elements having substantially the same function as those in the first and second embodiments will be numbered the same here and will not be described and/or illustrated again in detail here for the sake of brevity.

Figure 15:
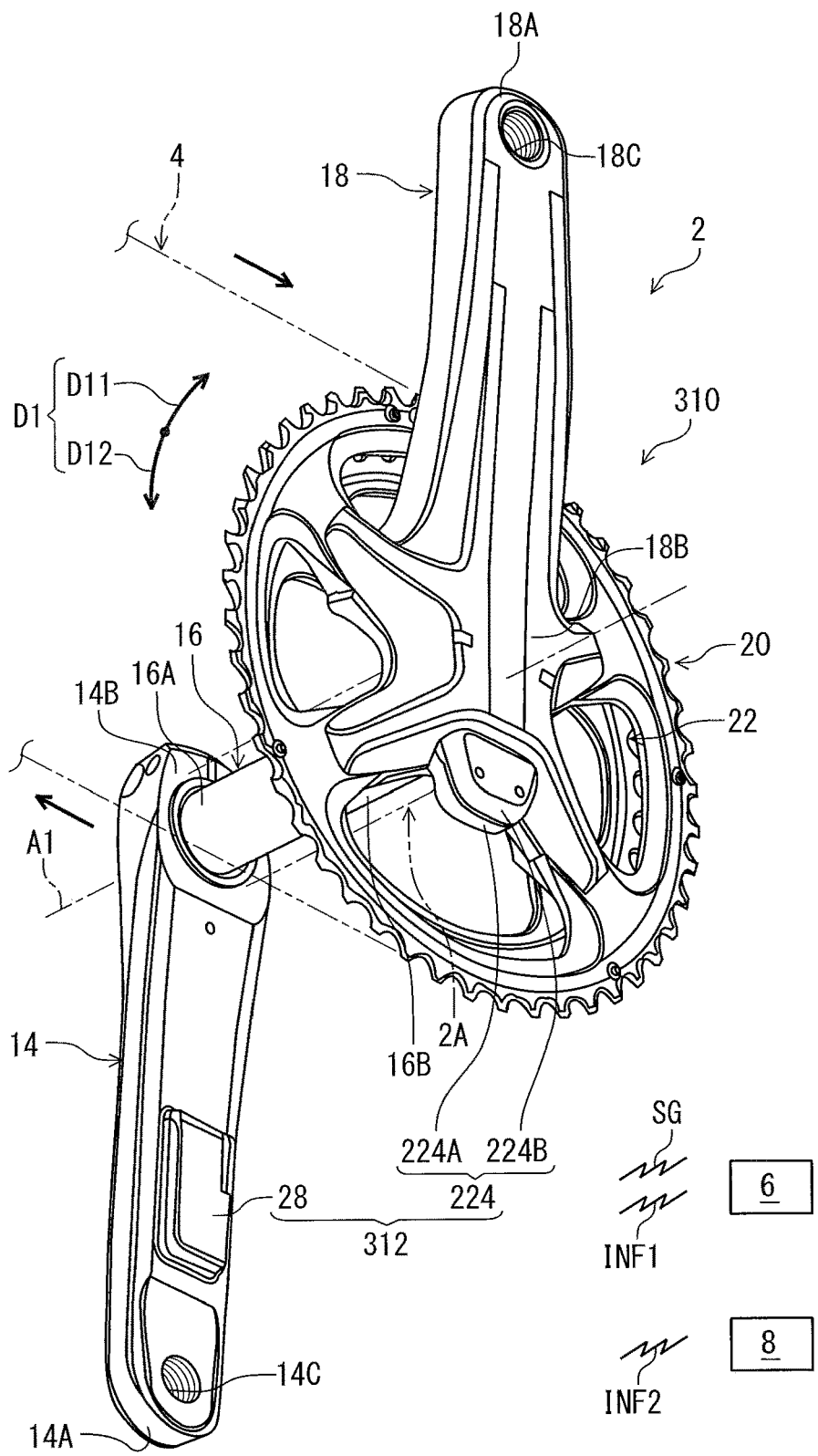
FIG. 15 is a perspective view of a rotational device in accordance with a third embodiment.

As seen in FIGS. 15 and 16, the rotational device 310 comprises the crank arm 14, the crank arm 18, and the crank axle 16. The rotational device 310 for the human-powered vehicle 2 comprises an electrical device 312. The electrical device 312 has substantially the same structure as the structure of the electrical device 212 of the second embodiment. The electrical device 312 is at least partially provided to at least one of the crank axle 16, the crank arm 14, and the sprocket 20 and/or 22. The electrical device 312 is at least partially provided to the crank arm 14.

As seen in FIG. 16, the electrical device 312 is partially provided to the crank arm 14, partially provided to the crank axle 16, and partially provided to the crank arm 18. The wireless communicator WC1, the electronic controller EC1, the force sensor 32, and the position detector 38 are provided to the crank arm 14. The electric power source 42 and the power-source holder 44 are provided to the crank axle 16. The electric connector port 45 is provided to the crank arm 18. The power-source holder 44 is electrically connected to the electronic controller EC1 via an electric cable. The power-source holder 44 is electrically connected to the electric connector port 45 via an electric cable.

The wireless communicator WC1 is configured to wirelessly transmit the rotational information INF1 relating to the rotational device 310. The rotational information INF1 includes the power INF11 and the rotational speed INF12 of the rotational device 310 (e.g., the crank arm 14). Furthermore, the wireless communicator WC1 is configured to wirelessly transmit rotational information INF3 relating to the rotational device 310 (e.g., the crank arm 18).

The electrical device 312 for the rotational device 310 of the human-powered vehicle 2 comprises a force sensor 332. The force sensor 332 is configured to obtain the rotational information INF3. The rotational information INF3 includes a force applied to the rotational device 310 (e.g., the crank arm 18) in the rotational direction D1 (see e.g., FIG. 15). Thus, the force sensor 332 is configured to measure the force applied to the rotational device 310. The force sensor 332 is configured to output a measurement value indicating the force applied to the rotational device 310 in the rotational direction D1. In the present embodiment, the force sensor 332 is configured to measure the force applied to the crank arm 18. However, the force sensor 332 can be configured to measure the force applied to another part of the rotational device 10 if needed and/or desired.

The electronic controller EC1 is configured to receive the rotational information INF3 obtained by the force sensor 332. The electronic controller EC1 is electrically connected to the force sensor 332 to receive the rotational information INF3 obtained by the force sensor 332. The electronic controller EC1 is configured to receive the force measured by the force sensor 332. The electronic controller EC1 is electrically connected to the force sensor 332 to receive the force measured by the force sensor 332.

For example, the force sensor 332 includes a strain gauge 334 and a measurement circuit 336. The strain gauge 334 is attached to the crank arm 18. The strain gauge 334 is configured to output a change in electrical resistance depending on the deformation amount of the rotational device 310. The strain gauge 334 is configured to output the change in the electrical resistance depending on the deformation amount of the crank arm 18. The measurement circuit 336 is electrically connected to the strain gauge 334 to convert the output of the strain gauge 334 to a voltage indicating the deformation amount of the rotational device 310 (e.g., the crank arm 18). For example, the measurement circuit 336 constitutes a bridge circuit with the strain gauge 334.

The measurement circuit 336 is electrically connected to the electronic controller EC1. The measurement circuit 336 is electrically mounted on the circuit board 30C of the electronic controller EC1. For example, the measurement circuit 336 is electrically connected to the strain gauge 334 via the circuit board 30C and an additional circuit board such as a flexible printed circuit. The electronic controller EC1 is electrically connected to the measurement circuit 336 to receive the rotational information INF1 from the measurement circuit 336. The electronic controller EC1 is electrically connected to the measurement circuit 336 to receive the deformation amount of the rotational device 310 (e.g., the crank arm 18) from the measurement circuit 336.

Figure 17:
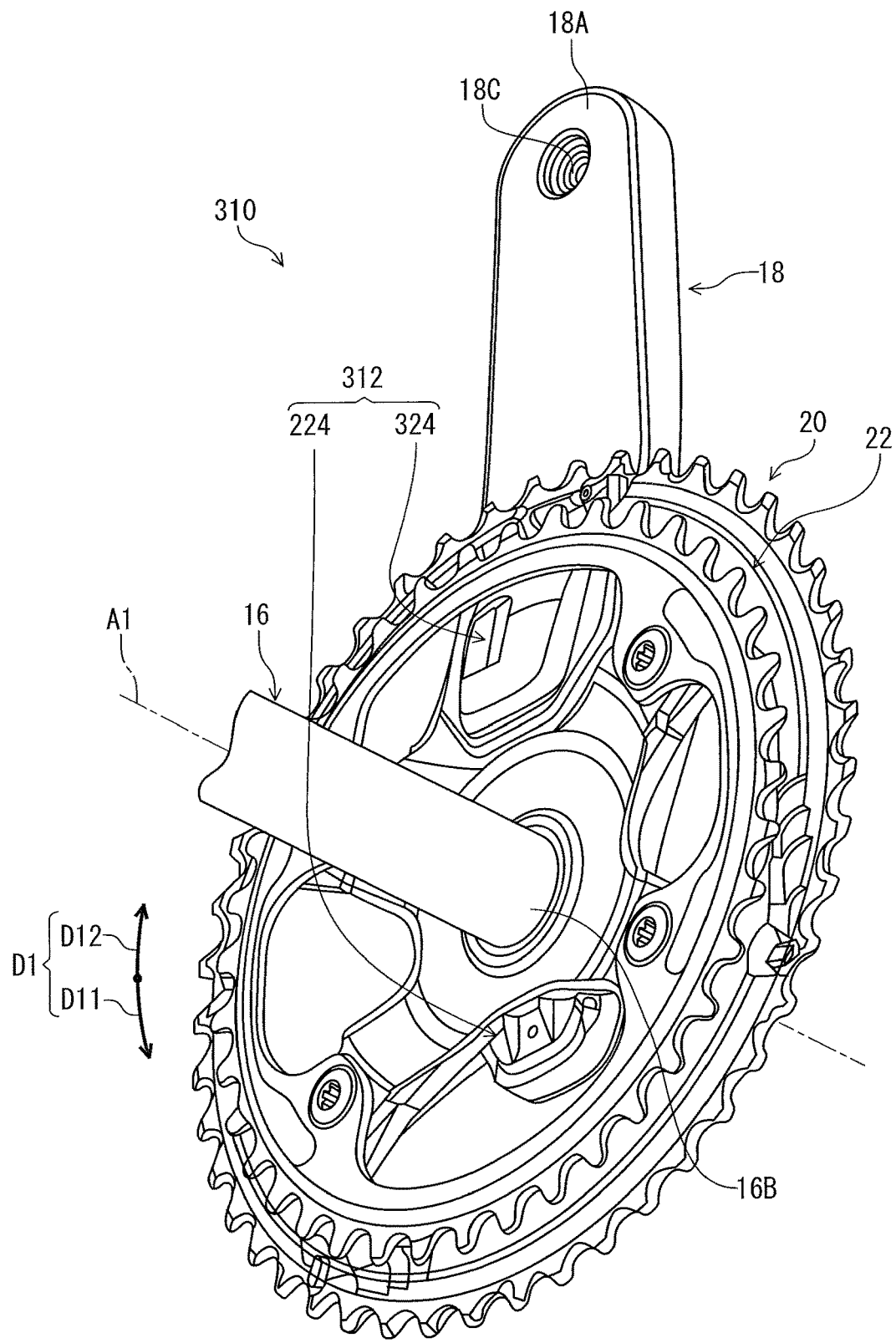
FIG. 17 is another perspective view of the rotational device illustrated in FIG. 15.

As seen in FIGS. 15 and 17, the electrical device 312 includes the housing 28, the additional housing 224, and an additional housing 324. The additional housing 324 is attached to the crank arm 18. As seen in FIG. 16, the force sensor 332 is provided in the additional housing 324. The electric connector port 45 can be coupled to the additional housing 324 if needed and/or desired. In such embodiments, the additional housing 224 can be omitted from the electrical device 312.

As seen in FIG. 16, as with the first embodiment, the electronic controller EC1 is configured to calculate the rotational information INF1 (e.g., the power INF11, the rotational speed INF12). In addition, the electronic controller EC1 is configured to calculate the rotational information INF3 based on the deformation amount of the rotational device 310 (e.g., the crank arm 18) obtained by the force sensor 332. The electronic controller EC1 is configured to calculate the force (e.g., torque) applied to the rotational device 310 based on the deformation amount of the rotational device 310 (e.g., the crank arm 18) obtained by the force sensor 332. The rotational information INF3 includes power INF31 applied to the rotational device 310 and the rotational speed INF12. For example, the electronic controller EC1 is configured to calculate the power INF31 applied to the rotational device 310 based on the torque applied to the rotational device 310 (e.g., the crank arm 18) and the rotational speed INF12 of the rotational device 310. However, the electronic controller EC1 can be configured to calculate the power INF31 applied to the rotational device 310 based on other data if needed and/or desired. For example, the electronic controller EC1 can be configured to calculate an average of the power INF31 during one revolution of the crank arm 18.

The electronic controller EC1 is configured to control the wireless communicator WC1 to wirelessly transmit the rotational information INF3 obtained by the force sensor 332. The electronic controller EC1 is configured to control the wireless communicator WC1 to wirelessly transmit, as the rotational information INF3, the power INF31 calculated by the electronic controller EC1 based on the force detected by the force sensor 332.

Figure 18:
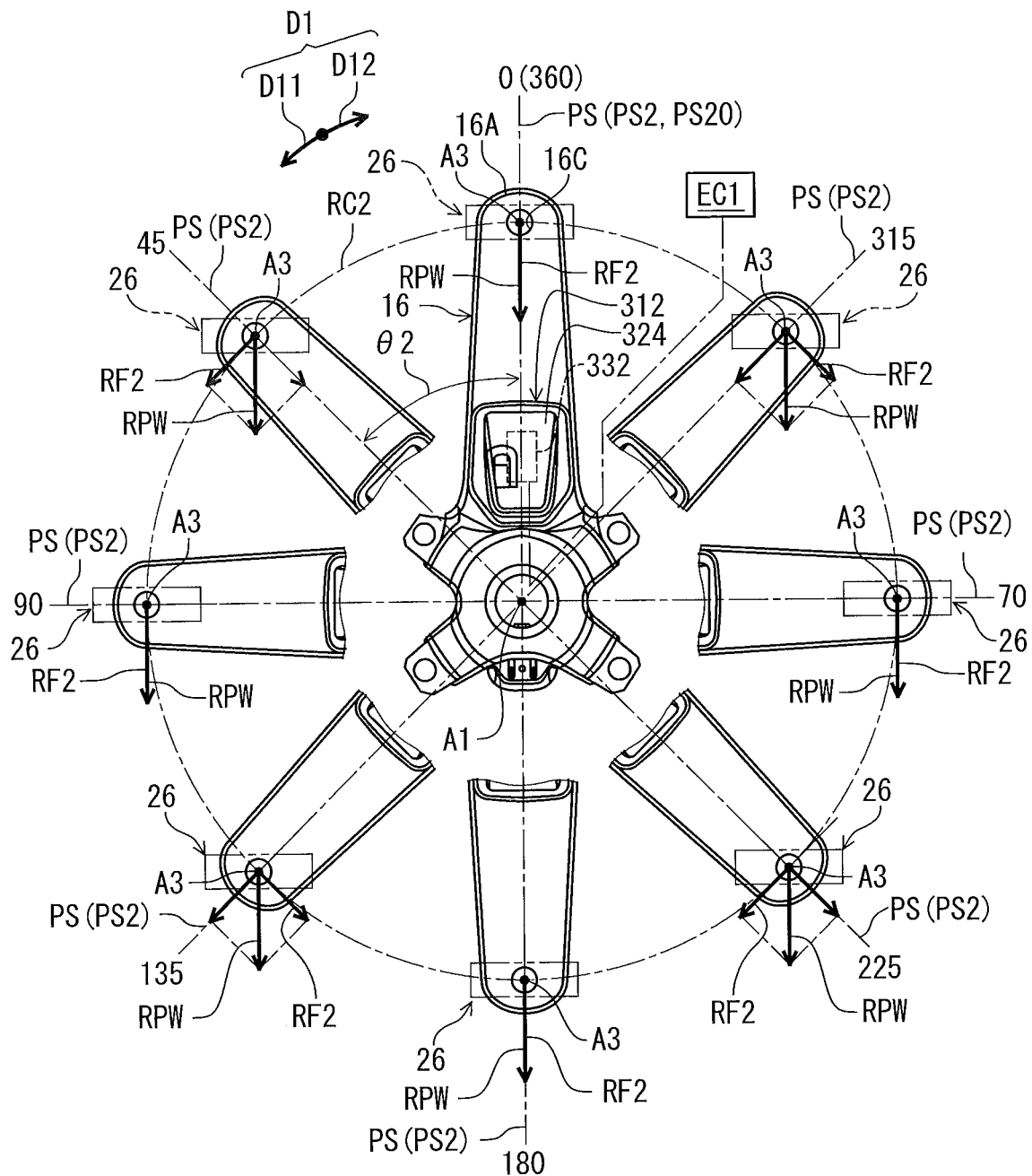
FIG. 18 shows a crank arm of the rotational device illustrated in FIG. 15, a reference pedal weight, and a reference force at each angle about a rotational axis of the rotational device.

As with the first embodiment, as seen in FIGS. 4 to 9, the electronic controller EC1 is configured to adjust the measurement value of the force sensor 32 based on the rotational position PS detected by the position detector 38. As seen in FIG. 18, the electronic controller EC1 is configured to adjust the measurement value of the force sensor 332 based on the rotational position PS detected by the position detector 38. The rotational position PS includes a rotational position PS2 of the crank arm 18. The position detector 38 is configured to detect the rotational position PS2 of the crank arm 18. The rotational position PS2 of the crank arm 18 is defined based on the rotational axis A3 of the pedal body 26B. The rotational position PS2 is an original position PS20 in a state where the rotational axis A3 of the pedal body 26B is provided just above the rotational axis A1. The rotational position PS2 has an angle θ2 defined from the original position PS20 about the rotational axis A1 in the driving rotational direction D11. The electronic controller EC1 is configured to adjust the measurement value of the force sensor 32 based on the angle θ2 detected by the position detector 38.

The electronic controller EC1 is configured to calculate the rotational position PS2 of the crank arm 18 based on the rotational position PS1 of the crank arm 14. The electronic controller EC1 is configured to calculate the angle θ2 of the crank arm 18 based on the angle θ1 of the crank arm 14 (see e.g., FIG. 4). The electronic controller EC1 is configured to add 180 degrees to the angle θ1 of the crank arm 14 to calculate the angle θ2 of the crank arm 18.

The electronic controller EC1 is configured to adjust the measurement value of the force sensor 332 based on the rotational position PS detected by the position detector 38 without a user input indicating adjustment of the measurement value of the force sensor 332. The electronic controller EC1 is configured to adjust the measurement value of the force sensor 332 based on the rotational position PS2 detected by the position detector 38 without a user input indicating adjustment of the measurement value of the force sensor 332. The electronic controller EC1 is configured to automatically adjust the measurement value of the force sensor 332 based on the rotational position PS2 detected by the position detector 38 without a user input indicating a start of the adjustment of the measurement value.

The electronic controller EC1 is configured to adjust the measurement value of the force sensor 332 based on the reference pedal weight RPW of the pedal 26 and the rotational position PS detected by the position detector 38. The electronic controller EC1 is configured to adjust the measurement value of the force sensor 332 based on the reference pedal weight RPW of the pedal 26 and the rotational position PS2 detected by the position detector 38.

The electronic controller EC1 is configured to calculate a reference rotational force RF2 directing in the rotational direction D1 of the rotational device 310 based on the reference pedal weight RPW and the rotational position PS detected by the position detector 38 in a reference state where the force F2 measured by the force sensor 332 is lower than a force threshold FT2 and the rotational position PS detected by the position detector 38 does not change. The electronic controller EC1 is configured to calculate a reference rotational force RF2 directing in the rotational direction D1 of the rotational device 310 based on the reference pedal weight RPW and the rotational position PS2 detected by the position detector 38 in the reference state where the force F2 measured by the force sensor 332 is lower than the force threshold FT2 and the rotational position PS2 detected by the position detector 38 does not change. The reference rotational force RF2 is defined in a tangential direction of a reference circle RC2. The reference circle RC2 is defined as a locus of the rotational axis A3 of the pedal 26 and has the rotational axis A1 as a center.

The electronic controller EC1 is configured to calculate the reference rotational force RF2 directing in the driving rotational direction D11 based on the reference pedal weight RPW and the rotational position PS2 (e.g., the angle θ2) detected by the position detector 38 in the reference state. The electronic controller EC1 is configured to store the reference rotational force RF2 in the memory 30M. For example, the electronic controller EC1 is configured to calculate the reference rotational force RF2 based on the following equation (2).

$$RF2 = RPW2 \times \sin \theta 2 \qquad (2)$$

In the reference state, the user does not apply any force to the pedal 26 and the rotational device 310 is stationary relative to the vehicle body 2A. The force threshold FT2 is set to be higher than a force which is caused by a pedal weigh of the pedal 26 and directs in the rotational direction D1. The electronic controller EC1 is configured to store the force threshold FT2 in the memory 30M. The force threshold FT2 can be equal to or different from the force threshold FT1.

Figure 19:
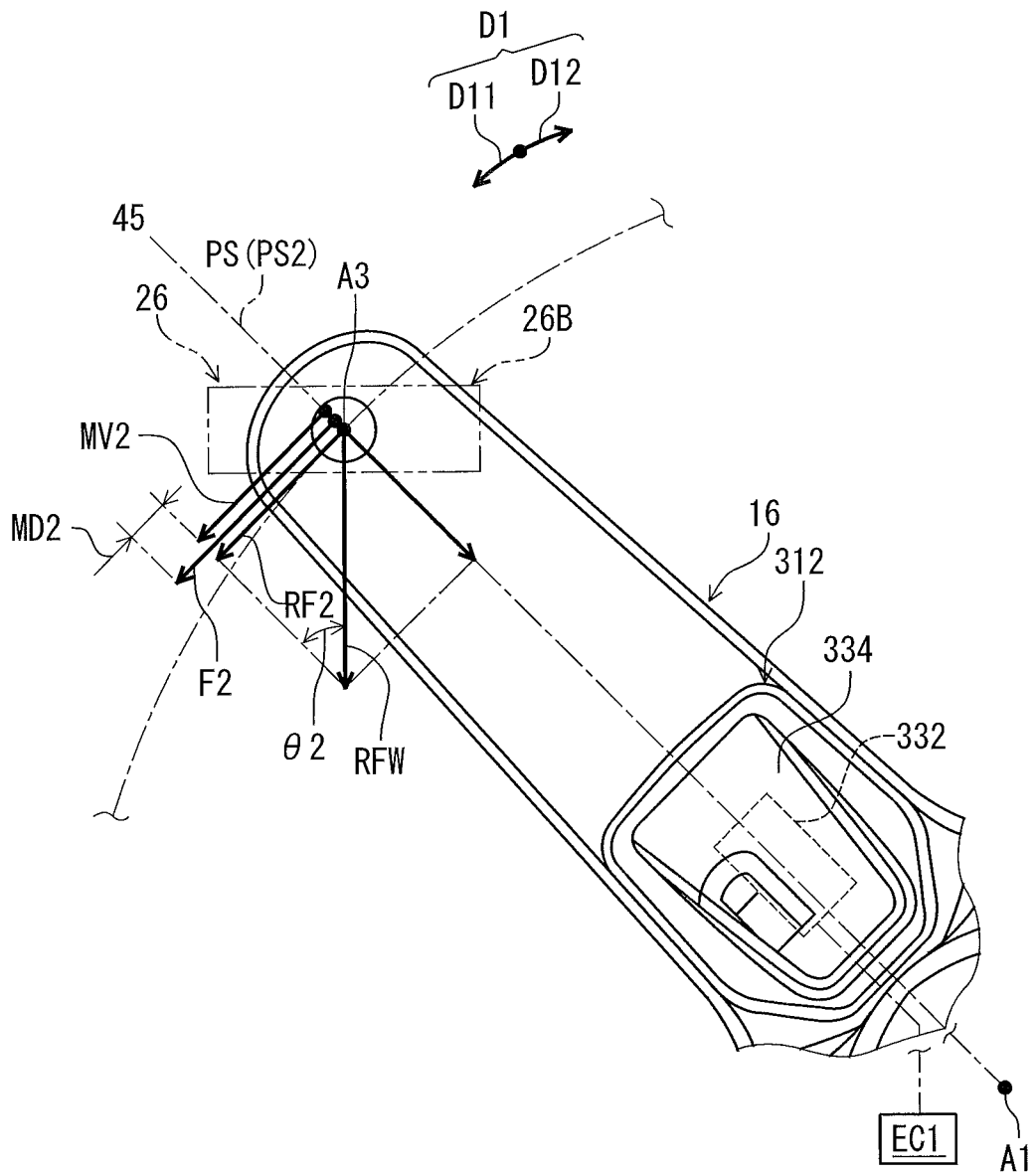
FIG. 19 shows the crank arm, the reference pedal weight, the reference force, a force measured by a force sensor of an electrical device of the rotational device, and a measurement difference between the reference force and the force for explaining adjustment of a measurement value of the force sensor.

As seen in FIG. 19, the electronic controller EC1 is configured to calculate, as a measurement difference MD2, a difference between the reference rotational force RF2 and the force F2 measured by the force sensor 332 in the reference state. The electronic controller EC1 is configured to subtract the reference rotational force RF2 from the force F2 measured by the force sensor 332 in the reference state. The electronic controller EC1 is configured to store the measurement difference MD2 calculated based on the reference rotational force RF2. The measurement difference MD2 can also be referred to as a measurement error MD2 of the force sensor 332. The electronic controller EC1 is configured to store the measurement difference MD2 in the memory 30M.

The measurement difference MD2 is greater than zero in a case where the force F2 measured by the force sensor 332 is greater than the reference rotational force RF2. The measurement difference MD2 is less than zero in a case where the force F2 measured by the force sensor 332 is less than the reference rotational force RF2. The electronic controller EC1 is configured to store the measurement difference MD2 with a positive or negative sign in the memory 30M.

The electronic controller EC1 is configured to subtract the measurement difference MD2 from the force F2 measured by the force sensor 332 to adjust the measurement value MV2 in a rotation state where the rotational position PS detected by the position detector 38 changes. Specifically, the electronic controller EC1 is configured to obtain the force F2 measured by the force sensor 332 at the predetermined intervals in the rotation state. The electronic controller EC1 is configured to subtract the measurement difference MD2 from the force F2 measured by the force sensor 332 to adjust the measurement value in the rotation state at the predetermined intervals. Thus, it is possible to improve accuracy of the power INF31 calculated based on the force F2 measured by the force sensor 332.

Figure 20:
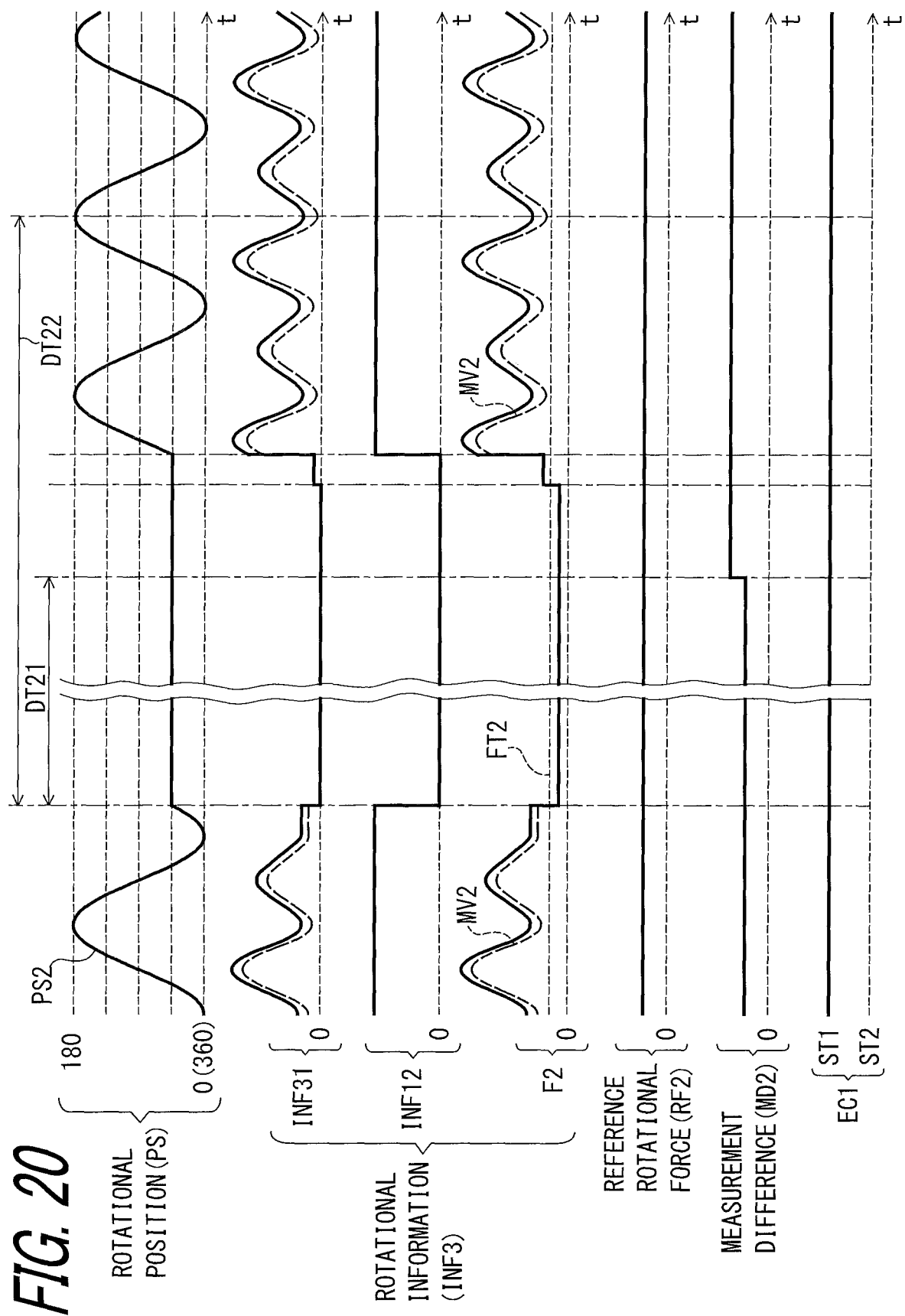
FIGS. 20 and 21 are timing charts showing control of the electrical device of the rotational device illustrated in FIG. 15.

As seen in FIG. 20, the electronic controller EC1 is configured to calculate the measurement difference MD2 in a case where the reference state continues for a determination time DT21. The electronic controller EC1 is configured to calculate the measurement difference MD2 in a case where the force F2 measured by the force sensor 332 is lower than the force threshold FT2 and the rotational position PS detected by the position detector 38 does not change for the determination time DT21.

Figure 21:
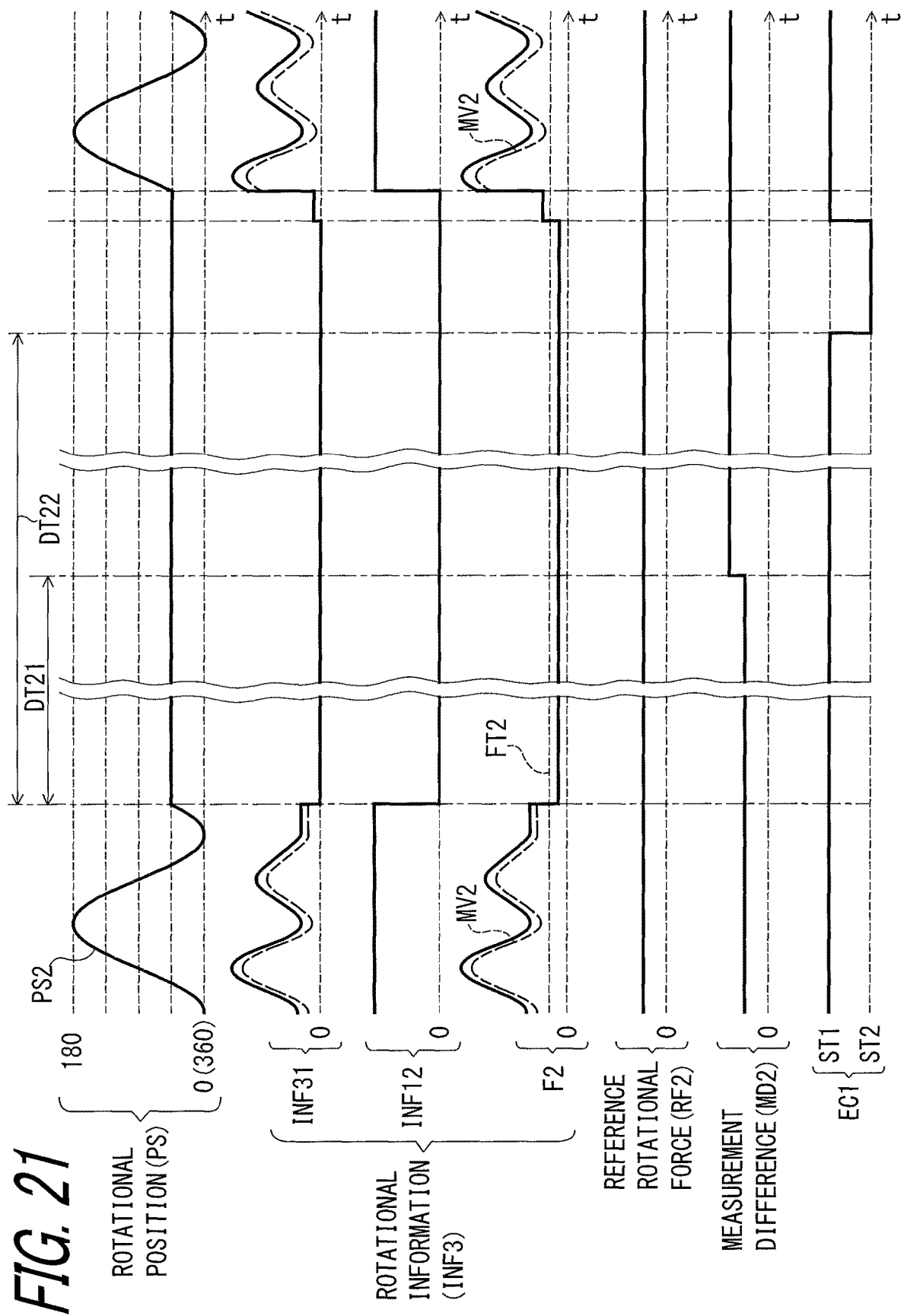
Figure 22:
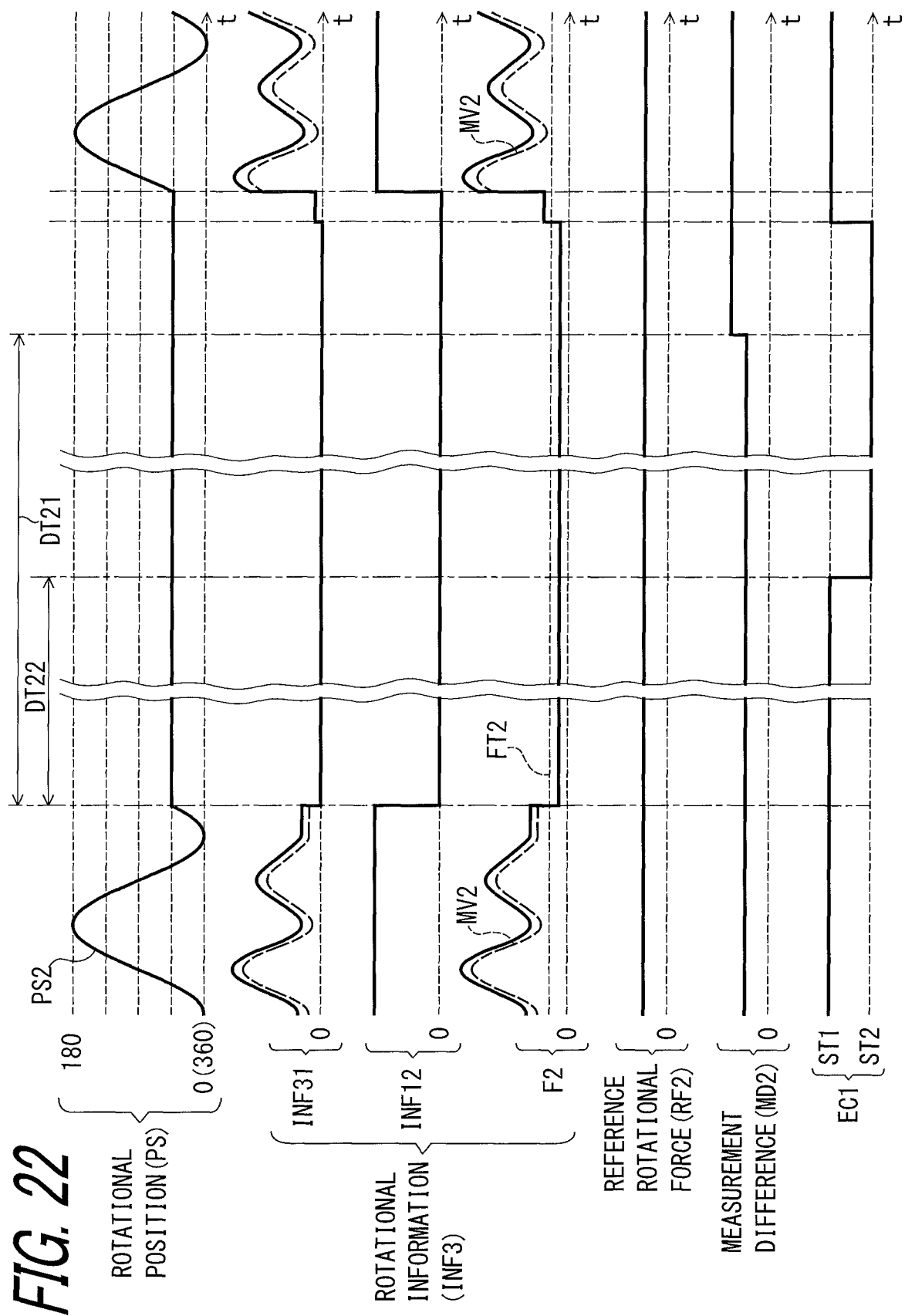
FIG. 22 is a timing chart showing control of an electrical device of a rotational device in accordance with a modification.

As seen in FIG. 21, the electronic controller EC1 is configured to change a state of the electronic controller EC1 from the first state ST1 to the second state ST2 in a case where, for a sleep determination time DT22, the force F2 measured by the force sensor 332 is lower than the force threshold FT2 and the rotational position PS detected by the position detector 38 does not change. The electronic controller EC1 is configured to change a state of the electronic controller EC1 from the first state ST1 to the second state ST2 in a case where the reference state continues for the sleep determination time DT22. The wireless communicator WC1 is configured not to wirelessly transmit signals after the reference state continues for the sleep determination time DT22.

The electronic controller EC1 is configured to change the state of the electronic controller EC1 from the second state ST2 to the first state ST1 in a case where the force F2 measured by the force sensor 332 is higher than the force threshold FT2 in the second state ST2 or if the rotational position PS detected by the position detector 38 changes in the second state ST2. The wireless communicator WC1 is configured to start to wirelessly transmit signals after the electronic controller EC1 concludes that the force F2 measured by the force sensor 332 is higher than the force threshold FT2 in the second state ST2 or that the rotational position PS detected by the position detector 38 changes in the second state ST2.

In the present embodiment, the sleep determination time DT22 is longer than the determination time DT21. Thus, the electronic controller EC1 is configured to calculate the measurement difference MD2 before the electronic controller EC1 changes the state of the electronic controller EC1 from the first state ST1 to the second state ST2. However, the sleep determination time DT22 can be equal to or shorter than the determination time DT21 if needed and/or desired.

Figure 23:
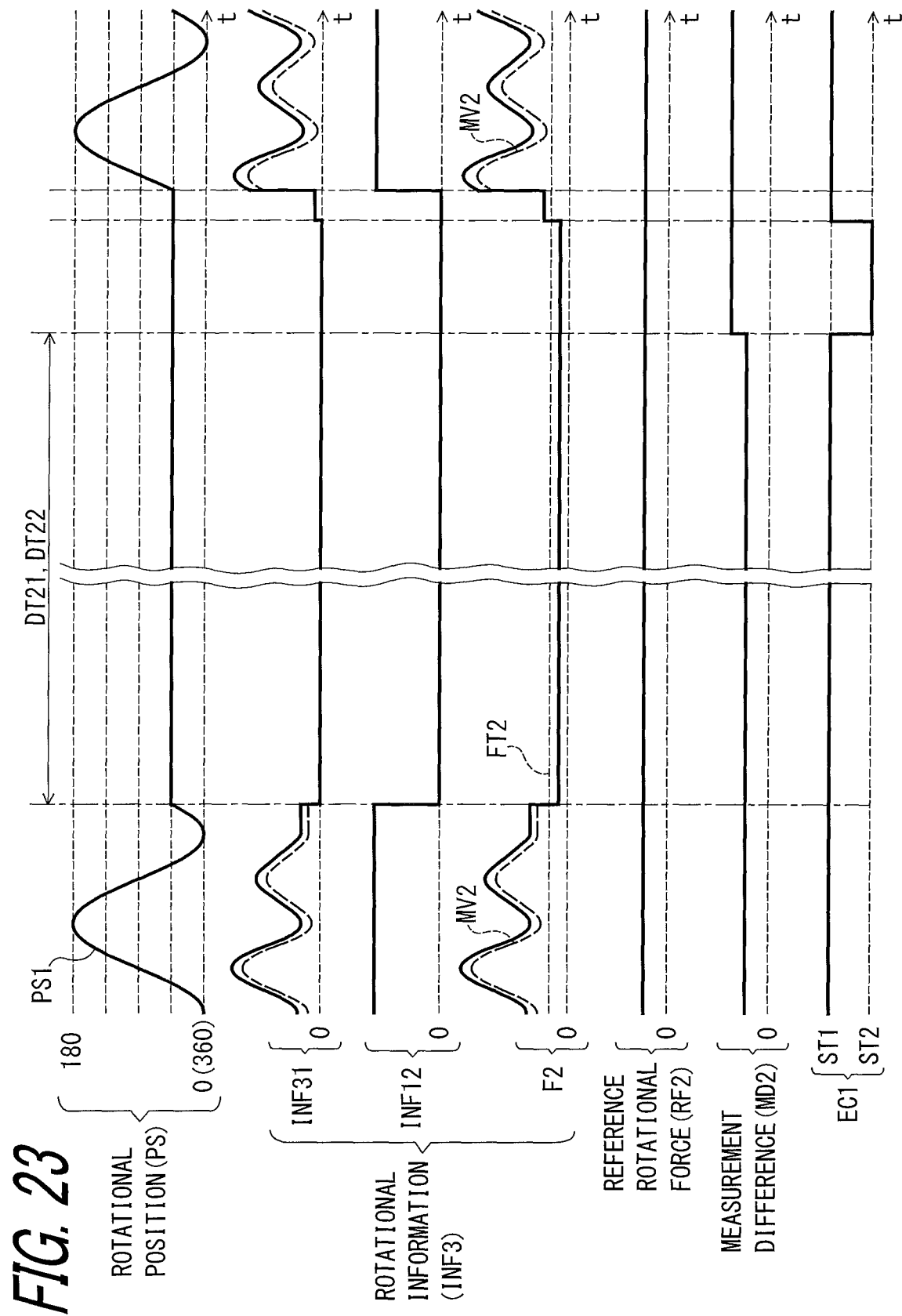
FIG. 23 is a timing chart showing control of an electrical device of a rotational

As seen in FIG. 23, for example, the electronic controller EC1 can be configured to calculate the measurement difference MD2 after the electronic controller EC1 changes the state of the electronic controller EC1 from the second state ST2 to the first state ST1. In such embodiments, the sleep determination time DT22 is shorter than the determination time DT21.

Figure 24:
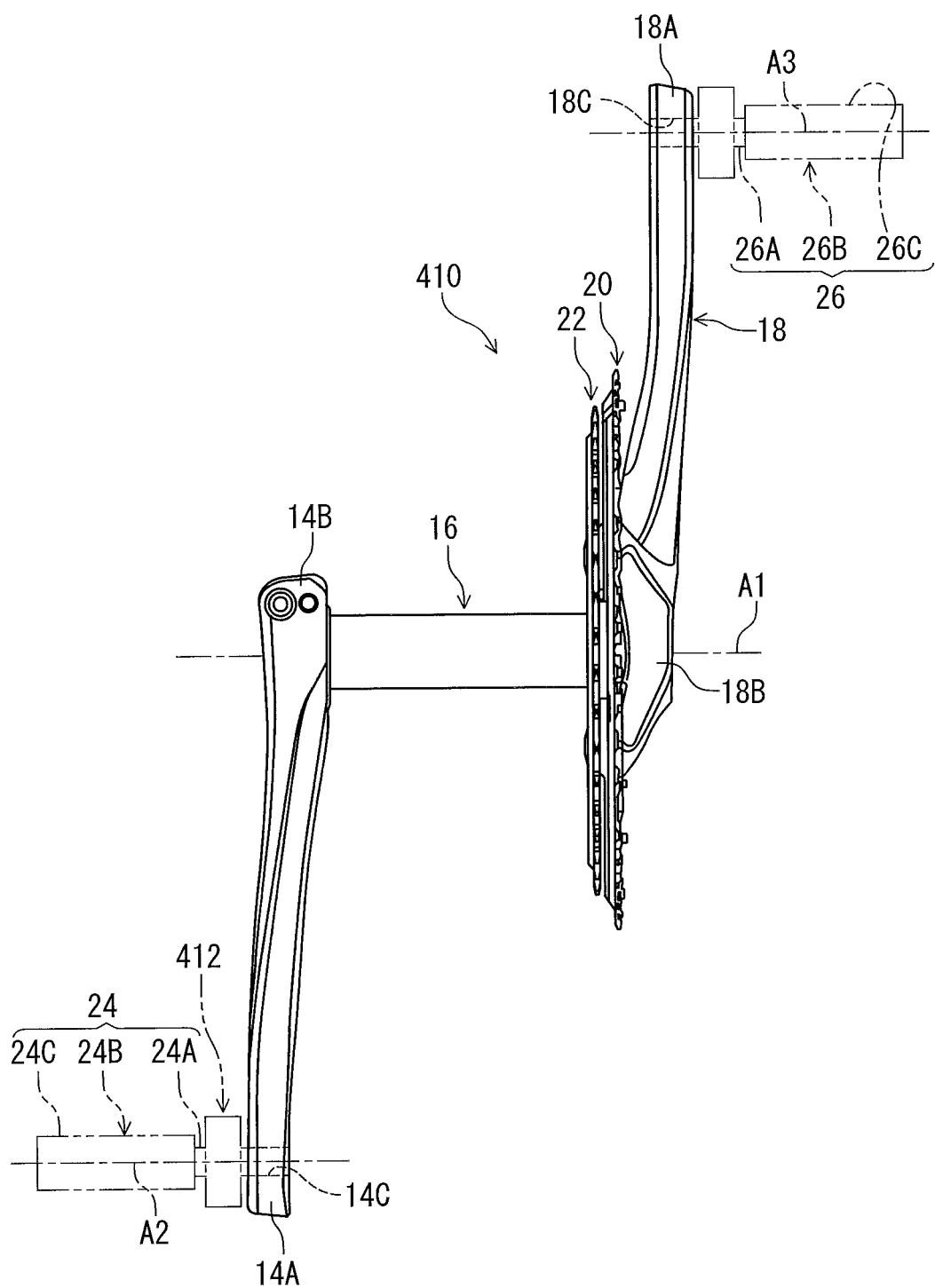
FIG. 24 is a side-elevational view of a rotational device in accordance with a fourth embodiment.

As seen in FIG. 24, for example, the electronic controller EC1 can be configured to calculate the measurement difference MD2 when the electronic controller EC1 changes the state of the electronic controller EC1 from the second state ST2 to the first state ST1. In such embodiments, the sleep determination time DT22 is equal to the determination time DT21.

As seen in FIG. 16, the electronic controller EC1 is configured to control the wireless communicator WC1 to wirelessly transmit the rotational information INF1 and the rotational information INF3 at the predetermined intervals. The additional electrical device 6 is configured to separately display the force and the rotational information INF3 wirelessly transmitted from the electrical device 312. The additional electrical device 6 is configured to separately display the power INF11, the rotational speed INF12, and the power INF31 wirelessly transmitted from the electrical device 312. Thus, the user can recognize the power INF11, the rotational speed INF12, and the power INF31 of the rotational device 310 via the display 46 of the additional electrical device 6 during pedaling.

Fourth Embodiment

A rotational device 410 in accordance with a fourth embodiment will be described below referring to FIGS. 24 to 27. The rotational device 410 has the same structure and/or configuration as those of the rotational device 10 except that an electrical device is provided to the pedal 24. Thus, elements having substantially the same function as those in the first to third embodiments will be numbered the same here and will not be described and/or illustrated again in detail here for the sake of brevity.

Figure 25:
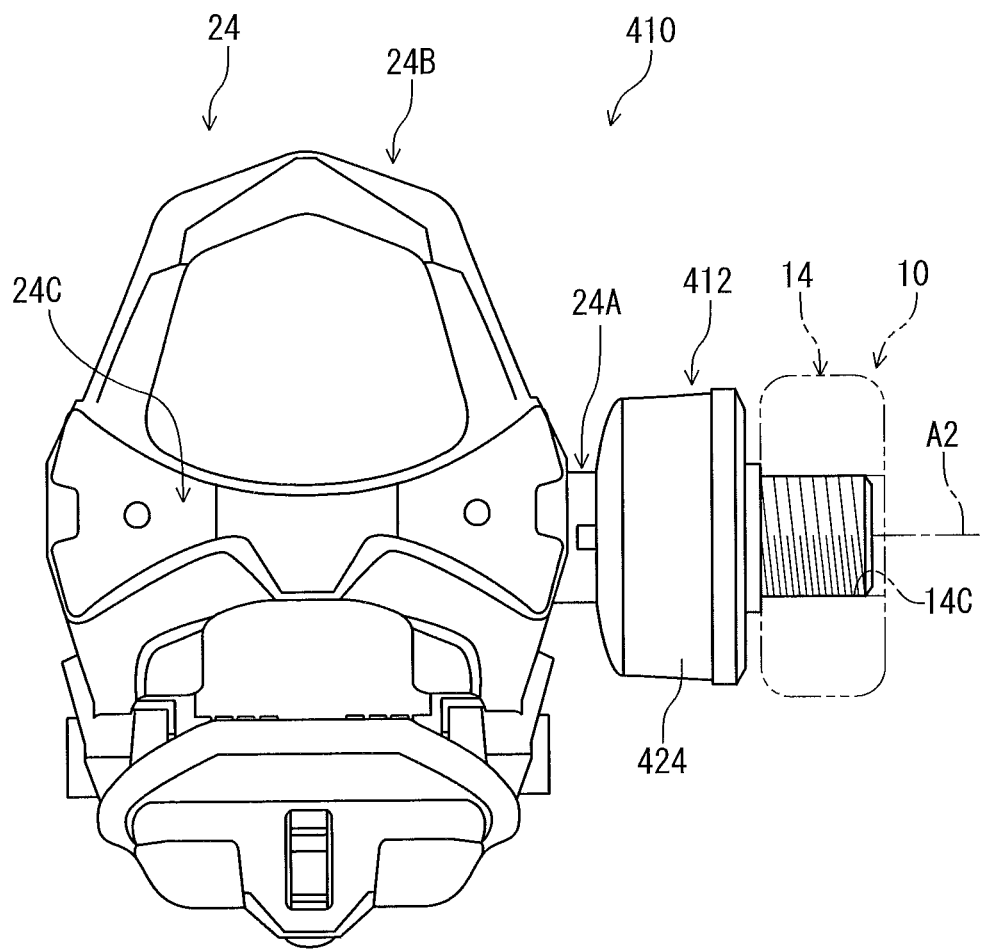
FIG. 25 is a top view of the rotational device illustrated in FIG. 24.

As seen in FIGS. 24 and 25, the rotational device 410 comprises the crank arm 14, the crank axle 16, the crank arm 18, the pedal 24, and the pedal 26. The rotational device 410 for the human-powered vehicle 2 comprises an electrical device 412. The electrical device 412 has substantially the same structure as the structure of the electrical device 12 of the first embodiment. The electrical device 412 is at least partially provided to at least one of the pedal axle 24A and the pedal body 24B.

As seen in FIG. 25, the electrical device 412 is at least partially provided to at least one of the pedal axle 24A and the pedal body 24B. In the present embodiment, the electrical device 412 is entirely provided to the pedal axle 24A. However, the electrical device 412 can be at least partially provided to at least one of the pedal axle 24A and the pedal body 24B if needed and/or desired. The electrical device 412 can be at least partially provided to the pedal 26 if needed and/or desired.

As seen in FIG. 26, the electrical device 412 comprises the wireless communicator WC1, the electronic controller EC1, the force sensor 32, the position detector 38, the electric power source 42, the power-source holder 44, and the electric connector port 45. The electrical device 412 includes a housing 424. The housing 424 is coupled to the pedal axle 24A (see e.g., FIG. 24). The wireless communicator WC1, the electronic controller EC1, the force sensor 32, the position detector 38, the electric power source 42, and the power-source holder 44 are provided in the housing 424.

The wireless communicator WC1 is configured to wirelessly communicate with the additional wireless communicator WC2 of the additional electrical device 6. The wireless communicator WC1 is configured to wirelessly transmit rotational information INF4 relating to the rotational device 410 (e.g., the pedal 24).

The force sensor 32 is configured to obtain the rotational information INF4. The rotational information INF4 includes a force applied to the rotational device 410 (e.g., the pedal 24) in the rotational direction D1. Thus, the force sensor 32 is configured to measure the force applied to the rotational device 410. The force sensor 32 is configured to output a measurement value indicating the force applied to the rotational device 410 in the rotational direction D1.

The electronic controller EC1 is configured to receive the rotational information INF4 obtained by the force sensor 32. The electronic controller EC1 is electrically connected to the force sensor 32 to receive the rotational information INF4 obtained by the force sensor 32.

In the present embodiment, the rotational information INF4 includes the deformation amount of the rotational device 410. The force sensor 32 is configured to obtain the deformation amount of the rotational device 410. The rotational information INF4 includes a deformation amount of the pedal 24 as the deformation amount of the rotational device 410. The rotational information INF4 includes a deformation amount of the pedal axle 24A as the deformation amount of the rotational device 410. The force sensor 32 is configured to obtain the deformation amount of the pedal 24. The force sensor 32 is configured to obtain the deformation amount of the pedal axle 24A. However, the rotational information INF4 can include a deformation amount of another part of the rotational device 410 (e.g., the pedal 24) if needed and/or desired. The rotational information INF4 can include a force applied to the rotational device 410 instead of or in addition to the deformation amount of the rotational device 410 if needed and/or desired. The force sensor 32 can be configured to obtain at least one of: the deformation amount of the rotational device 410; and the force applied to the rotational device 410 if needed and/or desired.

For example, the strain gauge 34 is attached to the pedal axle 24A. The strain gauge 34 is configured to output a change in electrical resistance depending on the deformation amount of the rotational device 410. The strain gauge 34 is configured to output the change in the electrical resistance depending on the deformation amount of the pedal axle 24A.

The measurement circuit 36 is electrically connected to the strain gauge 34 to convert the output of the strain gauge 34 to a voltage indicating the deformation amount of the rotational device 410 (e.g., the pedal axle 24A).

The measurement circuit 36 is electrically connected to the electronic controller EC1. The measurement circuit 36 is electrically mounted on the circuit board 30C of the electronic controller EC1. For example, the measurement circuit 36 is electrically connected to the strain gauge 34 via the circuit board 30C and an additional circuit board such as a flexible printed circuit. The electronic controller EC1 is electrically connected to the measurement circuit 36 to receive the rotational information INF4. The electronic controller EC1 is electrically connected to the measurement circuit 36 to receive the rotational information INF4. The electronic controller EC1 is electrically connected to the measurement circuit 36 to receive the deformation amount of the rotational device 410 (e.g., the pedal axle 24A).

Figure 27:
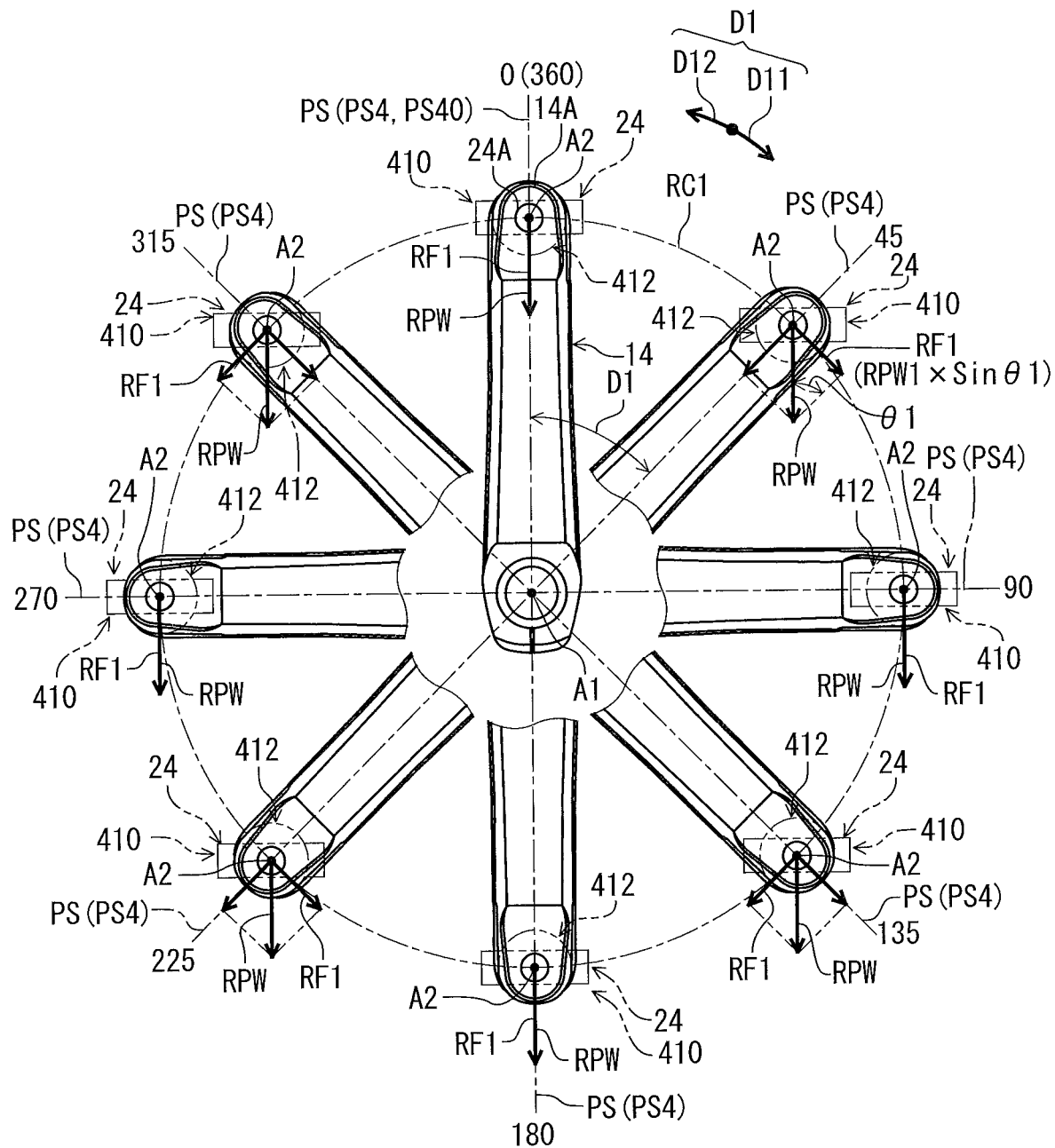
FIG. 27 shows a crank arm with the rotational device illustrated in FIG. 24, a reference pedal weight, and a reference force at each angle about a rotational axis of the rotational device.

As seen in FIG. 27, the pedal axle 24A is secured to the crank arm 14. The position detector 38 is attached to the pedal axle 24A. Thus, the position detector 38 is configured to detect the rotational position PS of the rotational device 410 (e.g., the pedal axle 24A and the crank arm 14). The position detector 38 is configured to detect the rotational position PS of the rotational device 410 (e.g., the pedal axle 24A and the crank arm 14) about the rotational axis A1. The position detector 38 is configured to detect the inclination angle of the pedal axle 24A and the crank arm 14 about the rotational axis A1.

The electronic controller EC1 is configured to calculate the force based on the deformation amount of the rotational device 410 (e.g., the pedal 24) obtained by the force sensor 32. The electronic controller EC1 is configured to calculate the force (e.g., torque) applied to the rotational device 410 based on the deformation amount of the rotational device 410 (e.g., the pedal 24) obtained by the force sensor 32. The rotational information INF4 includes power INF41 applied to the rotational device 410 and a rotational speed INF42 of the rotational device 410. For example, the electronic controller EC1 is configured to calculate the power INF41 applied to the rotational device 410 based on the torque applied to the rotational device 410 (e.g., the pedal 24) and the rotational speed INF42 of the rotational device 410. However, the electronic controller EC1 can be configured to calculate the power INF41 applied to the rotational device 410 based on other data if needed and/or desired. For example, the electronic controller EC1 can be configured to calculate an average of the power INF41 during one revolution of the crank arm 14. For example, the electronic controller EC1 can be configured to calculate total power during one revolution of the crank assembly 13 by doubling the power INF41 on the only one crank arm.

As with the first embodiment, the electronic controller EC1 is configured to adjust the measurement value of the force sensor 32 based on the rotational position PS detected by the position detector 38. The rotational position PS includes a rotational position PS4 of the pedal 24. The position detector 38 is configured to detect the rotational position PS4 of the pedal 24. The rotational position PS4 of the pedal 24 is the same as the rotational position PS1 of the crank arm 14. The rotational position PS4 has the angle θ1 defined from the original position PS10 about the rotational axis A1 in the driving rotational direction D11. The electronic controller EC1 is configured to adjust the measurement value of the force sensor 32 based on the angle θ1 detected by the position detector 38.

The description regarding the adjustment of the measurement value of the force sensor 32 in the electrical device 12 can be utilized as the description regarding the adjustment of the measurement value of the force sensor 32 in the electrical device 412 by replacing the reference numerals "INF1," "INF11," "INF12," "PS1," "PS10," "10," and "12" with "INF4," "INF41," "INF42," "PS4," "PS40," "410," and "412." Thus, the description regarding the stopping of the wireless transmission of the rotational information INF4 will not be described in detail here for the sake of brevity.

As seen in FIGS. 28 to 35, the electronic controller EC1 can be configured to adjust the measurement value based on the temperature TP measured by the temperature sensor 70. As seen in FIG. 28, in a modification of the first embodiment, the electrical device 12 for the rotational device 10 of the human-powered vehicle 2 comprises a temperature sensor 70. The temperature sensor 70 is configured to measure a temperature TP. The temperature sensor 70 is configured to measure the temperature TP of the rotational device 10. The temperature sensor 70 is configured to measure the temperature TP of at least one of the electrical device 12 and the crank arm 14. The electronic controller EC1 is electrically connected to the temperature sensor 70 to receive the temperature TP measured by the temperature sensor 70. The temperature sensor 70 includes a sensor body. For example, the sensor body is attached to the crank arm 14, the housing 28, the circuit board 30C, or another portion of the rotational device 10.

Figure 29:
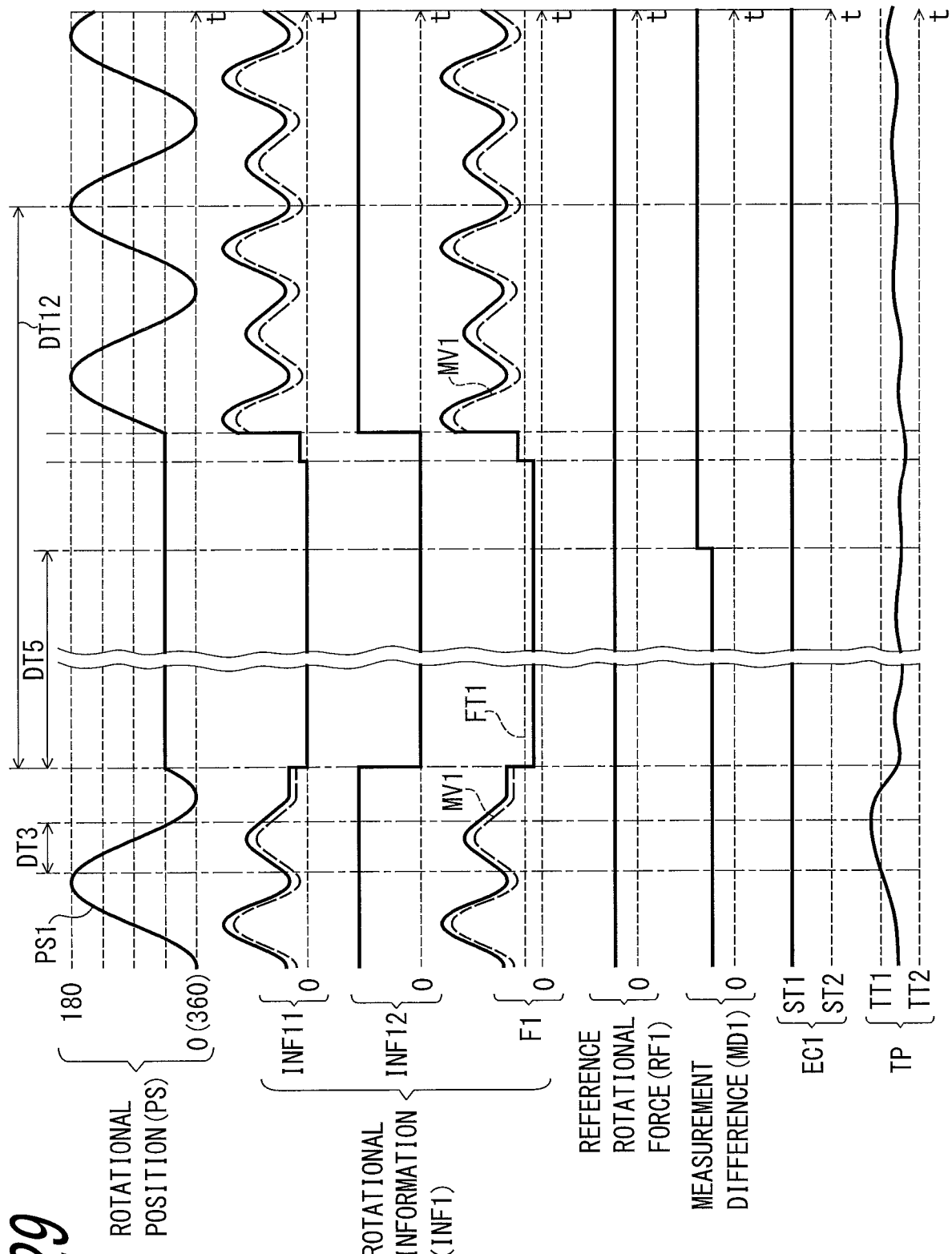
FIGS. 29 to 33 are timing charts showing control of the electrical device of the rotational device illustrated in FIG. 28.

As seen in FIG. 29, the electronic controller EC1 is configured to adjust the measurement value of the force sensor 32 in a case where the temperature TP measured by the temperature sensor 70 is higher than a temperature threshold TT1. The electronic controller EC1 is configured to adjust the measurement value in a case where the temperature TP is higher than the temperature threshold TT1 for a temperature determination time DT3. The electronic controller EC1 is configured to calculate the measurement difference MD1 in the case where the temperature TP is higher than the temperature threshold TT1 for the temperature determination time DT3. The temperature determination time DT3 can be 0 seconds.

Figure 30:
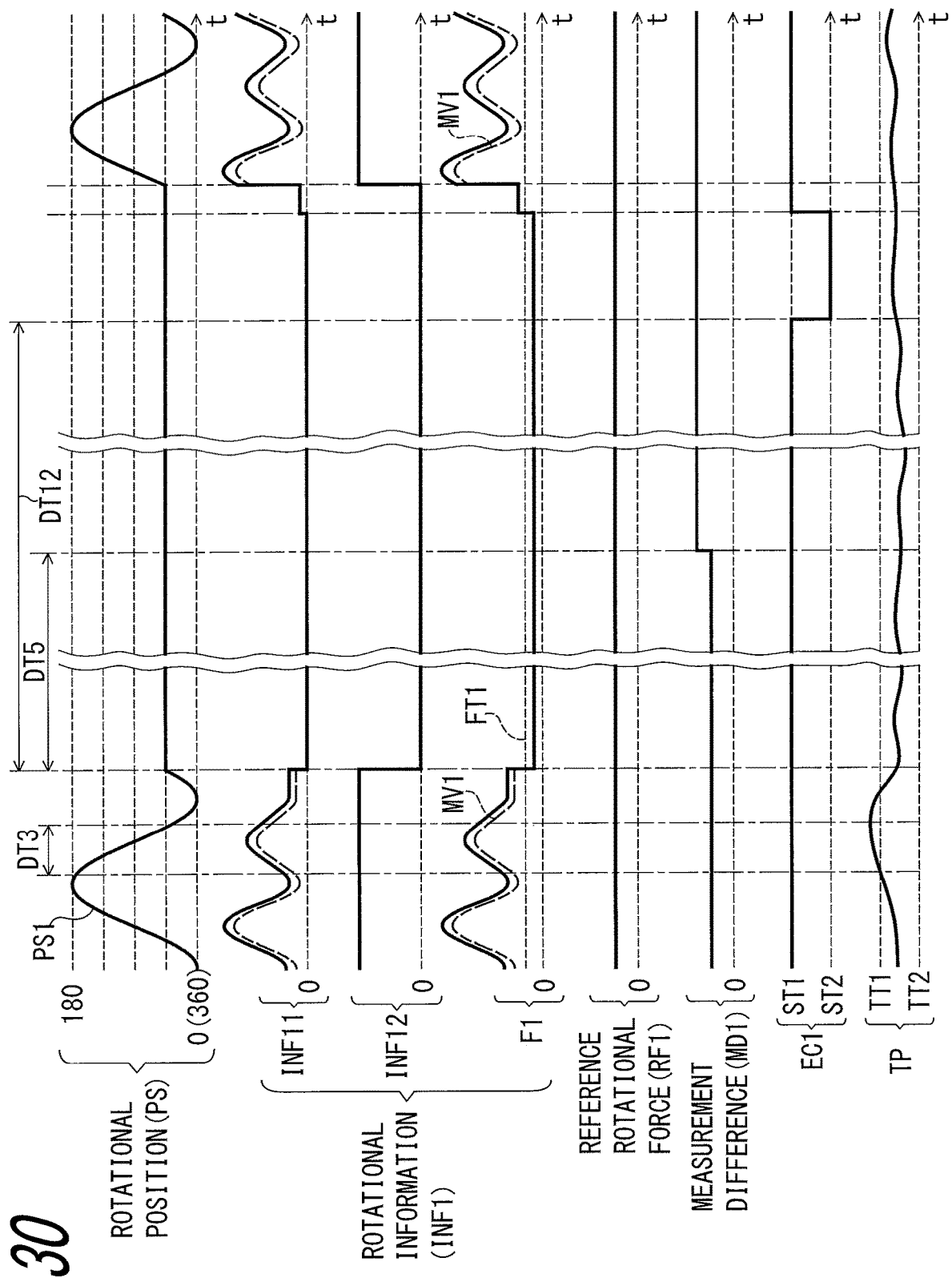

As seen in FIG. 30, the electronic controller EC1 is configured to adjust the measurement value before the electronic controller EC1 changes the state of the electronic controller EC1 from the first state ST1 to the second state ST2 in the case where the temperature TP measured by the temperature sensor 70 is higher than the temperature threshold TT1. The electronic controller EC1 is configured to adjust the measurement value before the electronic controller EC1 changes the state of the electronic controller EC1 from the first state ST1 to the second state ST2 in the case where the temperature TP is higher than the temperature threshold TT1 for the temperature determination time DT3. The electronic controller EC1 is configured to calculate the measurement difference MD1 before the electronic controller EC1 changes the state of the electronic controller EC1 from the first state ST1 to the second state ST2 in the case where the temperature TP is higher than the temperature threshold TT1 for the temperature determination time DT3.

As seen in FIGS. 29 and 30, the electronic controller EC1 is configured to adjust the measurement value after the reference state maintains for a determination time DT5 in the case where the temperature TP is higher than the temperature threshold TT1 prior to the reference state. The electronic controller EC1 is configured to adjust the measurement value after the reference state maintains for the determination time DT5 in the case where the temperature TP is higher than the temperature threshold TT1 for the temperature determination time DT3 prior to the reference state. The electronic controller EC1 is configured to calculate the measurement difference MD1 after the reference state maintains for the determination time DT5 in the case where the temperature TP is higher than the temperature threshold TT1 for the temperature determination time DT3 prior to the reference state. The determination time DT5 is shorter than the sleep determination time DT12.

Figure 31:
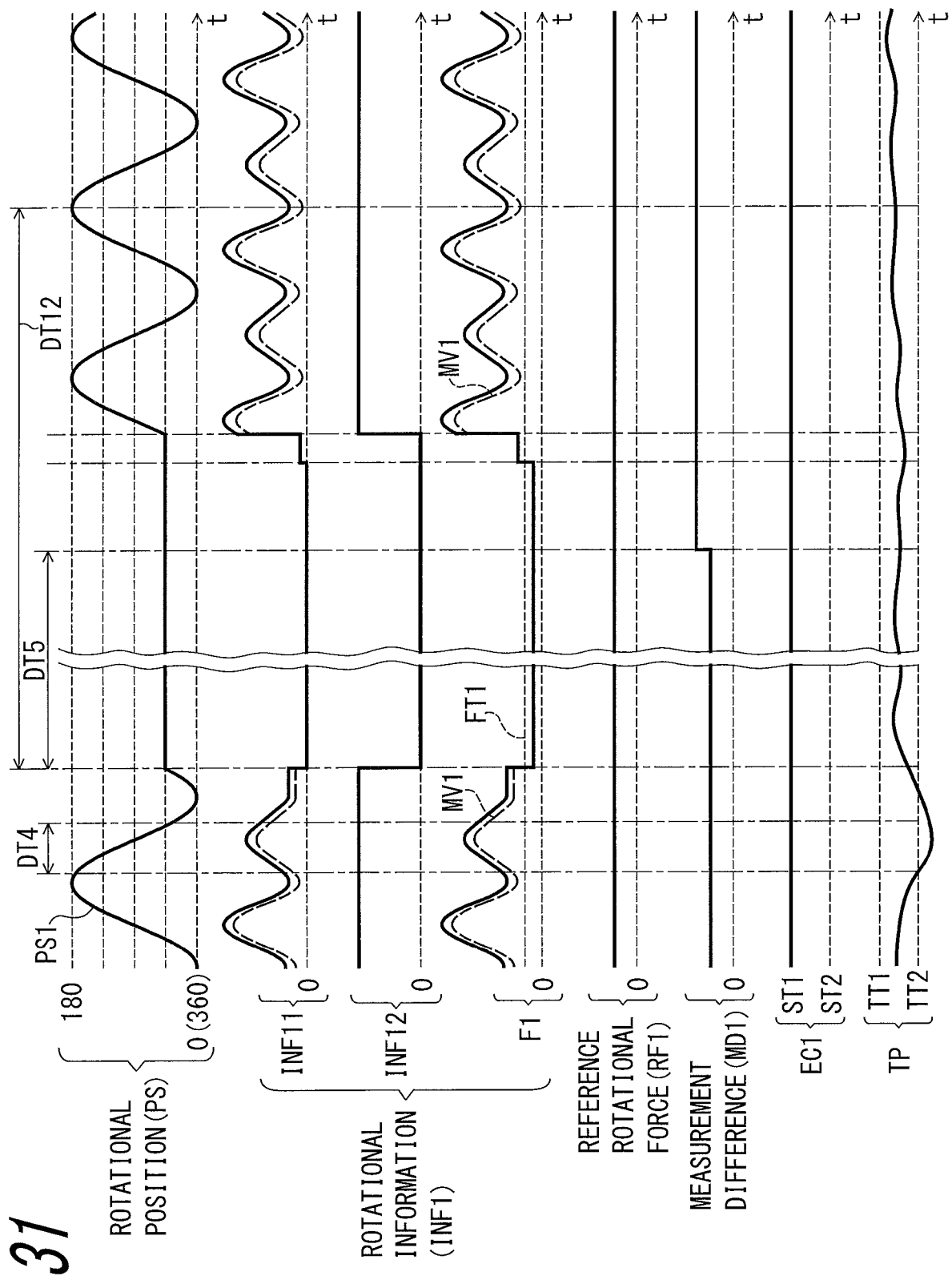

As seen in FIG. 31, the electronic controller EC1 is configured to adjust the measurement value in a case where the temperature TP is lower than an additional temperature threshold TT2. The electronic controller EC1 is configured to adjust the measurement value in a case where the temperature TP is lower than the additional temperature threshold TT2 for a temperature determination time DT4. The additional temperature threshold TT2 is less than the temperature threshold TT1. The temperature determination time DT4 is equal to the temperature determination time DT3. The electronic controller EC1 is configured to calculate the measurement difference MD1 in the case where the temperature TP is lower than the additional temperature threshold TT2 for the temperature determination time DT4. The temperature determination time DT4 can be different from the temperature determination time DT3 if needed and/or desired. The temperature determination time DT4 can be 0 seconds.

Figure 32:
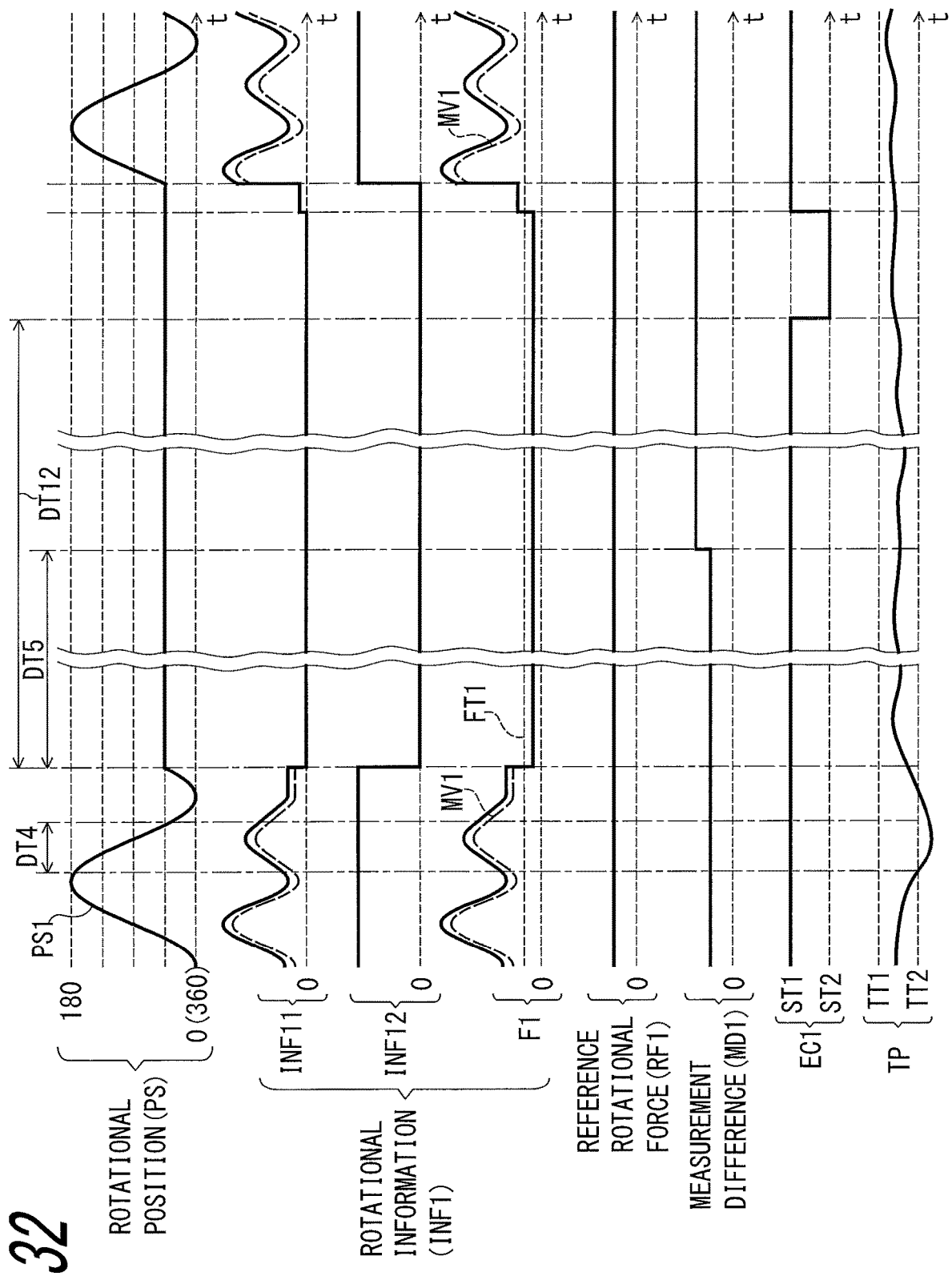

As seen in FIG. 32, the electronic controller EC1 is configured to adjust the measurement value before the electronic controller EC1 changes the state of the electronic controller EC1 from the first state ST1 to the second state ST2 in the case where the temperature TP is lower than the additional temperature threshold TT2. The electronic controller EC1 is configured to adjust the measurement value before the electronic controller EC1 changes the state of the electronic controller EC1 from the first state ST1 to the second state ST2 in the case where the temperature TP is lower than the additional temperature threshold TT2 for the temperature determination time DT4. The electronic controller EC1 is configured to calculate the measurement difference MD1 before the electronic controller EC1 changes the state of the electronic controller EC1 from the first state ST1 to the second state ST2 in the case where the temperature TP is lower than the additional temperature threshold TT2 for the temperature determination time DT4.

As seen in FIGS. 31 and 32, the electronic controller EC1 is configured to adjust the measurement value after the reference state maintains for a determination time DT5 in the case where the temperature TP is lower than the temperature threshold TT2 prior to the reference state. The electronic controller EC1 is configured to adjust the measurement value after the reference state maintains for the determination time DT5 in the case where the temperature TP is lower than the temperature threshold TT2 for the temperature determination time DT4 prior to the reference state. The electronic controller EC1 is configured to calculate the measurement difference MD1 after the reference state maintains for the determination time DT5 in the case where the temperature TP is lower than the temperature threshold TT2 for the temperature determination time DT4 prior to the reference state.

The temperature threshold TT1 and the additional temperature threshold TT2 define a temperature range TR. However, one of the temperature threshold TT1 and the additional temperature threshold TT2 can be omitted from the adjustment of the measurement value if needed and/or desired. The temperature range TR can be defined by only one of the temperature threshold TT1 and the additional temperature threshold TT2 if needed and/or desired.

As seen in FIGS. 29 and 31, the electronic controller EC1 is configured to adjust the measurement value in a case where the temperature TP is out of the temperature range TR. The electronic controller EC1 is configured to adjust the measurement value in a case where the temperature TP is out of the temperature range TR for the temperature determination time DT3 or DT4. The electronic controller EC1 is configured to calculate the measurement difference MD1 in the case where the temperature TP is out of the temperature range TR for the temperature determination time DT3 or DT4.

As seen in FIGS. 30 and 32, the electronic controller EC1 is configured to adjust the measurement value before the electronic controller EC1 changes the state of the electronic controller EC1 from the first state ST1 to the second state ST2 in a case where the temperature TP is out of the temperature range TR. The electronic controller EC1 is configured to adjust the measurement value before the electronic controller EC1 changes the state of the electronic controller EC1 from the first state ST1 to the second state ST2 in a case where the temperature TP is out of the temperature range TR for the temperature determination time DT3 or DT4. The electronic controller EC1 is configured to calculate the measurement difference MD1 before the electronic controller EC1 changes the state of the electronic controller EC1 from the first state ST1 to the second state ST2 in a case where the temperature TP is out of the temperature range TR for the temperature determination time DT3 or DT4.

As seen in FIGS. 29 to 32, the electronic controller EC1 is configured to adjust the measurement value after the reference state maintains for a determination time DT5 in the case where the temperature TP is out of the temperature range TR prior to the reference state. The electronic controller EC1 is configured to adjust the measurement value after the reference state maintains for the determination time DT5 in the case where the temperature TP is out of the temperature range TR for the temperature determination time DT3 or DT4 prior to the reference state. The electronic controller EC1 is configured to calculate the measurement difference MD1 after the reference state maintains for the determination time DT5 in the case where the temperature TP is out of the temperature range TR for the temperature determination time DT3 or DT4 prior to the reference state.

Figure 33:
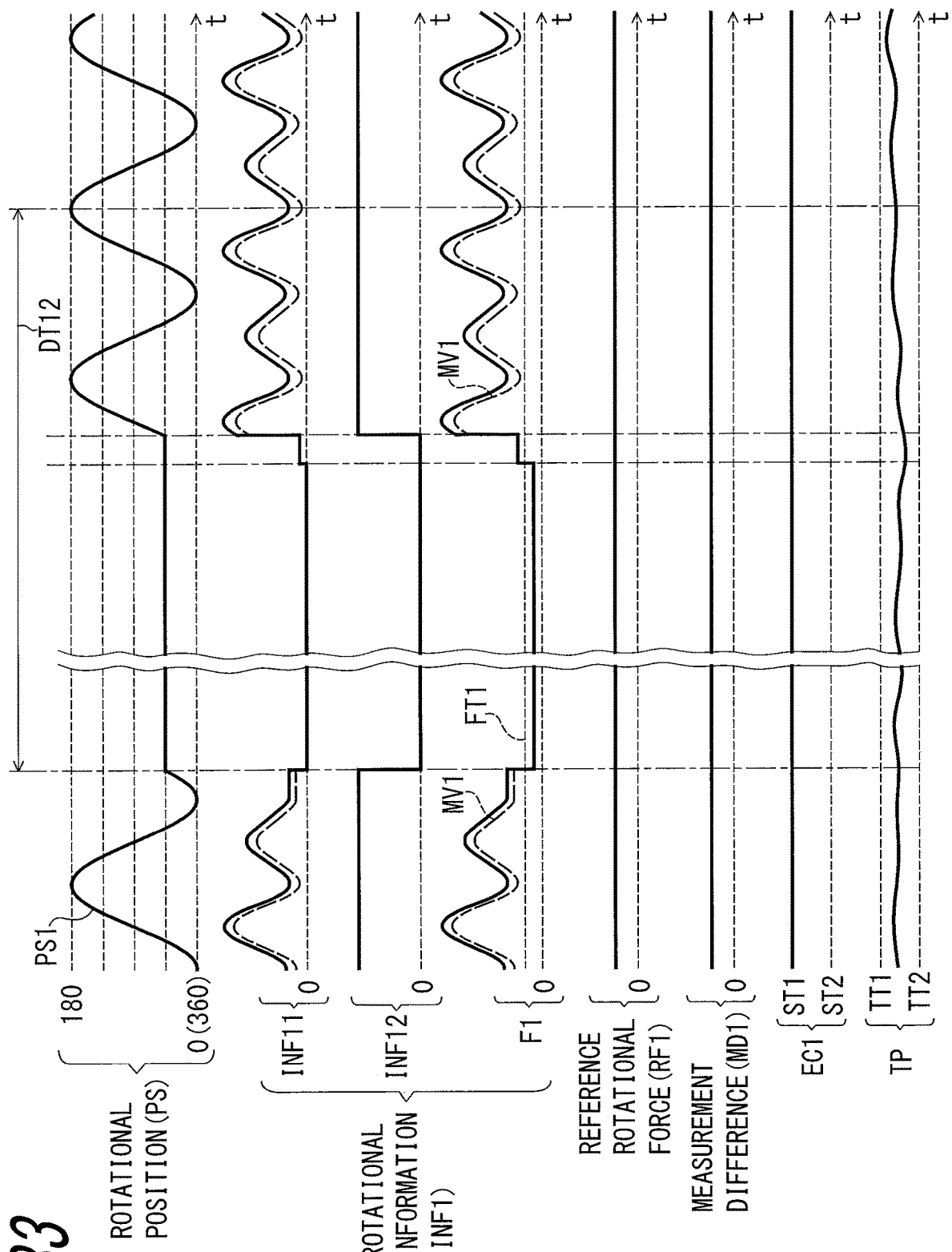

As seen in FIG. 33, the electronic controller EC1 is configured to maintain the current value of the measurement difference MD1 in the case where a temperature TP is lower than or equal to the temperature threshold TT1. The electronic controller EC1 is configured to maintain the current value of the measurement difference MD1 in a case where the temperature TP is lower than or equal to the temperature threshold TT1 for the temperature determination time DT3. The electronic controller EC1 is configured to maintain the current value of the measurement difference MD1 before the electronic controller EC1 changes the state of the electronic controller EC1 from the first state ST1 to the second state ST2 in the case where the temperature TP is lower than or equal to the temperature threshold TT1 for the temperature determination time DT3.

The electronic controller EC1 is configured to maintain the current value of the measurement difference MD1 in the case where the temperature TP is higher than or equal to the additional temperature threshold TT2. The electronic controller EC1 is configured to maintain the current value of the measurement difference MD1 in a case where the temperature TP is higher than or equal to the additional temperature threshold TT2 for the temperature determination time DT3.

The electronic controller EC1 is configured to maintain the current value of the measurement difference MD1 before the electronic controller EC1 changes the state of the electronic controller EC1 from the first state ST1 to the second state ST2 in a case where the temperature TP is higher than or equal to the additional temperature threshold TT2. The electronic controller EC1 is configured to maintain the current value of the measurement difference MD1 before the electronic controller EC1 changes the state of the electronic controller EC1 from the first state ST1 to the second state ST2 in the case where the temperature TP is higher than or equal to the additional temperature threshold TT2 for the temperature determination time DT3.

The electronic controller EC1 is configured to maintain the current value of the measurement difference MD1 in the case where the temperature TP is within the temperature range TR. The electronic controller EC1 is configured to maintain the current value of the measurement difference MD1 in the case where the temperature TP is within the temperature range TR for the temperature determination time DT3.

The electronic controller EC1 is configured to maintain the current value of the measurement difference MD1 before the electronic controller EC1 changes the state of the electronic controller EC1 from the first state ST1 to the second state ST2 in a case where the temperature TP is within the temperature range TR. The electronic controller EC1 is configured to maintain the current value of the measurement difference MD1 before the electronic controller EC1 changes the state of the electronic controller EC1 from the first state ST1 to the second state ST2 in a case where the temperature TP is within the temperature range TR for the temperature determination time DT3.

Figure 34:
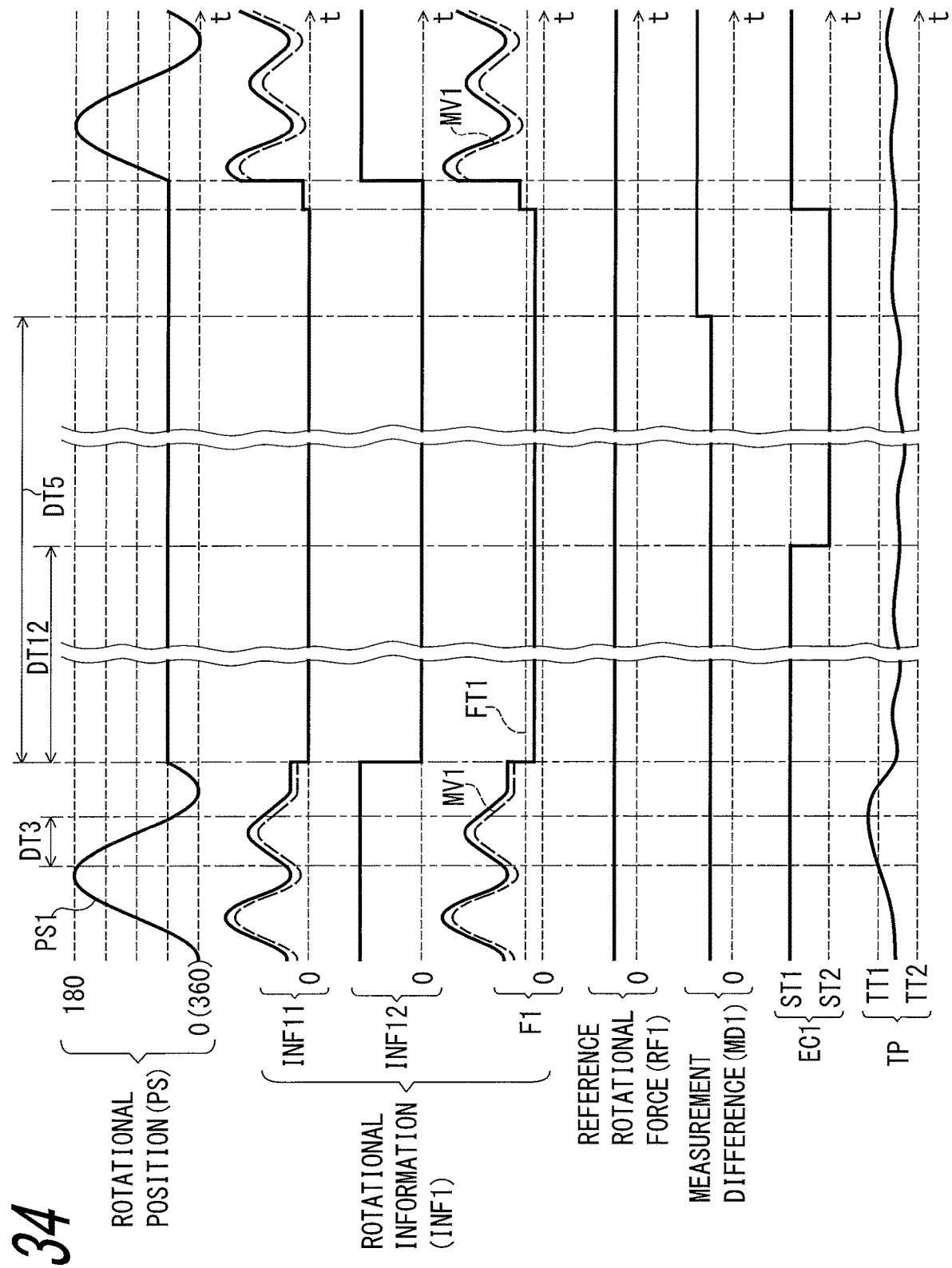
FIG. 34 is a timing chart showing control of an electrical device of a rotational device in accordance with a modification.
Figure 35:
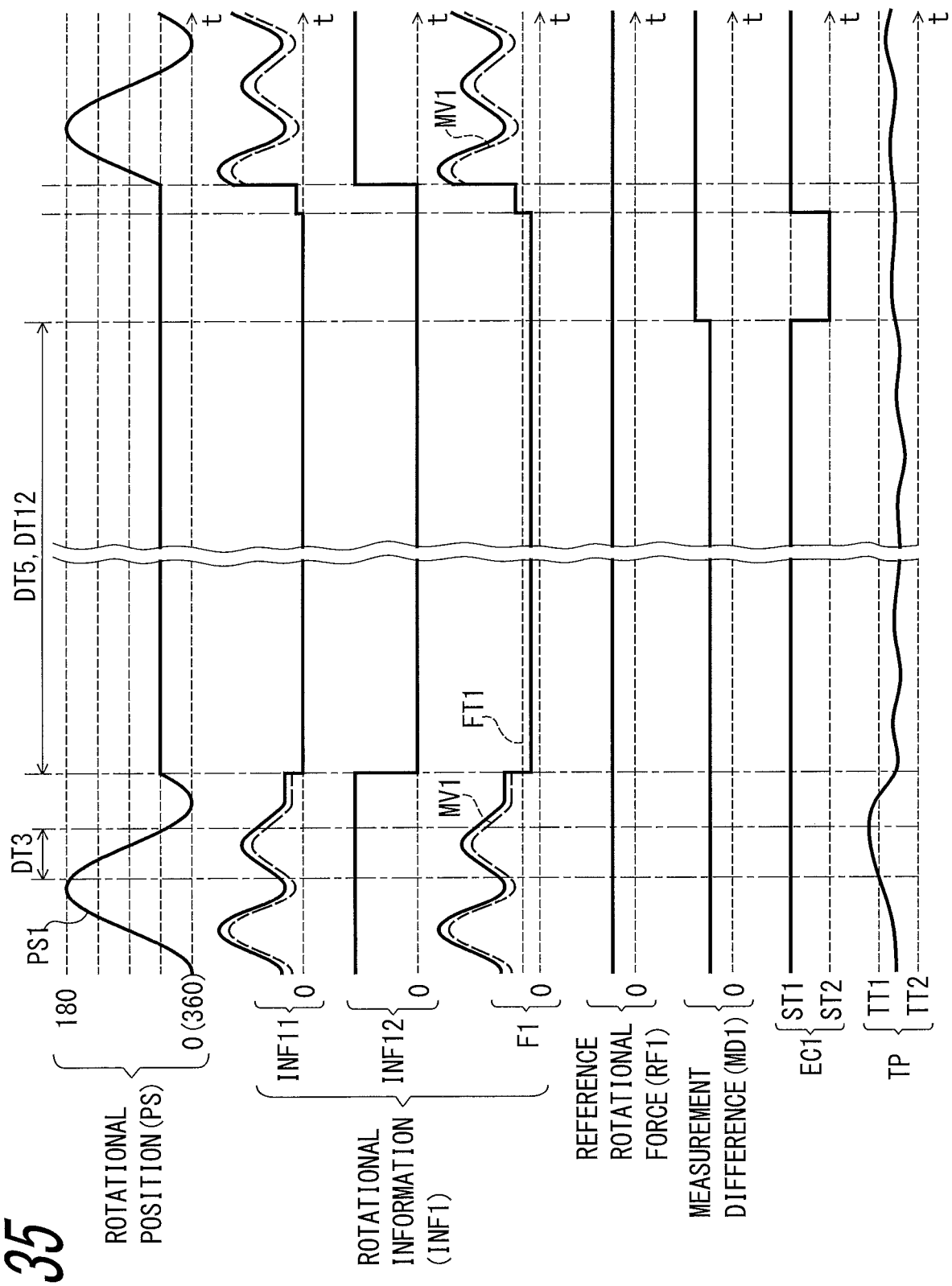
FIG. 35 is a timing chart showing control of an electrical device of a rotational device in accordance with a modification.

As seen in FIG. 30 or 32, the electronic controller EC1 is configured to adjust the measurement value before the electronic controller EC1 changes the state of the electronic controller EC1 from the first state ST1 to the second state ST2 in the case where the temperature TP is higher than the temperature threshold TT1 or lower than the additional temperature threshold TT2. As seen in FIG. 34 or 35, however, the electronic controller EC1 is configured to adjust the measurement value after the electronic controller EC1 changes the state of the electronic controller EC1 from the first state ST1 to the second state ST2 or when the electronic controller EC1 changes the state of the electronic controller EC1 from the first state ST1 to the second state ST2 in the case where the temperature TP is higher than the temperature threshold TT1 if needed and/or desired. Each of the same modifications can be applied to each of the modifications depicted in FIGS. 31 and 32 if needed and/or desired.

In FIGS. 29 to 35, the electronic controller EC1 determines to adjust the measurement value based on the temperature TP which is measured by the temperature sensor 70 in the first state ST2. However, the electronic controller EC1 can be configured to inform the user that it is preferable to adjust the measurement value (e.g., calculate the measurement difference MD1) in a case where the temperature TP which is measured by the temperature sensor 70 is higher than the temperature threshold TT1 or lower than the additional temperature threshold TT2 in the second state ST2. In such modifications, for example, the user adjusts the measurement value manually.

Each of the modifications depicted in FIGS. 29 to 35 can be applied to each of the second to fourth embodiments and the modifications thereof.

Figure 36:
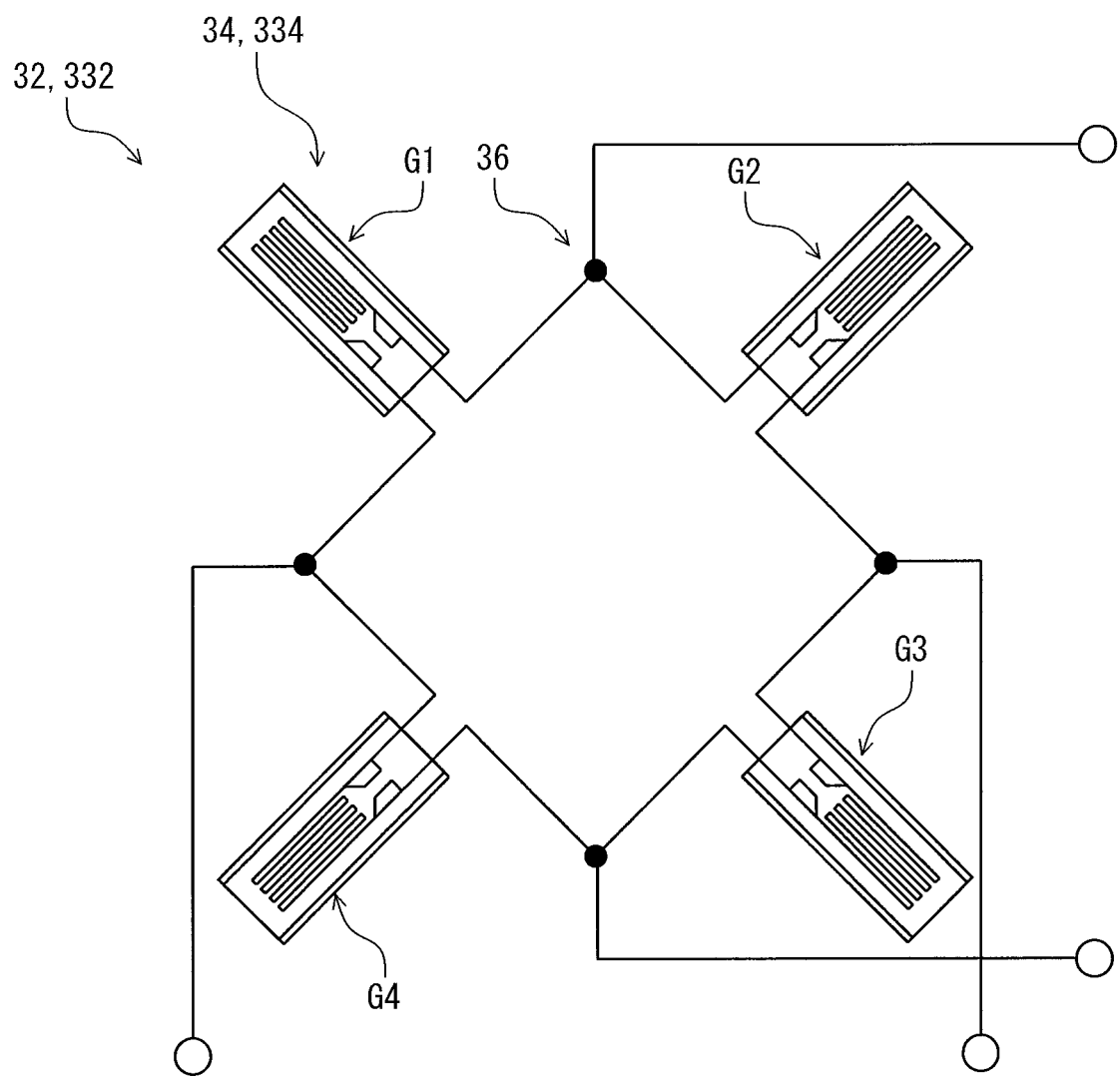
FIG. 36 shows a structure of the force sensor of an electrical device in accordance with a modification.

As seen in FIG. 36, each of the strain gauges 34 and 334 can include a first strain gauge G1, a second strain gauge G2, a third strain gauge G3, and a fourth strain gauge G4. The first strain gauge G1, the second strain gauge G2, the third strain gauge G3, the fourth strain gauge G4, and the measurement circuit 36 constitute the bridge circuit. In the present embodiment, the first strain gauge G1 has first resistance. The second strain gauge G2 has second resistance. The third strain gauge G3 has third resistance. The fourth strain gauge G4 has fourth resistance. The first resistance is equal to the third resistance. The second resistance is equal to the fourth resistance. The first resistance is lower than the second resistance and the fourth resistance. The third resistance is lower than the second resistance and the fourth resistance. This arrangement of the strain gauge 34 enables initial unbalanced value to become only one of positive and negative. Thus, it is possible to omit one of a first compensation circuit configured to compensate the positive initial unbalanced value and a second compensation circuit configured to compensate the negative initial unbalanced value. The arrangement of the first strain gauge G1, the second strain gauge G2, the third strain gauge G3, and the fourth strain gauge G4 depicted in FIG. 36 can be applied to each of the first to fourth embodiments and the modifications thereof.

In the first to fourth embodiments and the modifications thereof, the external electrical device 8 is a separate device from the additional electrical device 6. However, the external electrical device 8 can be integrally provided with the additional electrical device 6 as a single device if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical device for a rotational device of a human-powered vehicle, comprising:
   a force sensor configured to measure a force applied to the rotational device;
   a position detector configured to detect a rotational position of the rotational device; and
   an electronic controller configured to adjust a measurement value of the force sensor based on the rotational position detected by the position detector.

2. The electrical device according to claim 1, wherein the electronic controller is configured to adjust the measurement value of the force sensor based on the rotational position detected by the position detector without a user input indicating adjustment of the measurement value of the force sensor.

3. The electrical device according to claim 1, wherein the electronic controller is configured to adjust the measurement value of the force sensor based on a reference pedal weight of a pedal and the rotational position detected by the position detector.

4. The electrical device according to claim 3, wherein the electronic controller is configured to store the reference pedal weight.

5. The electrical device according to claim 3, wherein the electronic controller is configured to set the reference pedal weight based on input information relating to the pedal.

6. The electrical device according to claim 5, wherein the electronic controller is configured to receive the input information from an external electrical device.

7. The electrical device according to claim 5, wherein the electronic controller is configured to store at least two pedal weights, and
   the electronic controller is configured to set, as the reference pedal weight, one of the at least two pedal weights corresponding to the input information.

8. The electrical device according to claim 3, wherein the electronic controller is configured to calculate a reference rotational force directing in a rotational direction of the rotational device based on the reference pedal weight and the rotational position detected by the position detector in a reference state where the force measured by the force sensor is lower than a force threshold and the rotational position detected by the position detector does not change.

9. The electrical device according to claim 8, wherein the electronic controller is configured to calculate, as a measurement difference, a difference between the reference rotational force and the force measured by the force sensor in the reference state.

10. The electrical device according to claim 9, wherein the electronic controller is configured to store the measurement difference calculated based on the reference rotational force.

11. The electrical device according to claim 9, wherein the electronic controller is configured to subtract the measurement difference from the force measured by the force sensor to adjust the measurement value in a rotation state where the rotational position detected by the position detector changes.

12. The electrical device according to claim 9, wherein the electronic controller is configured to calculate the measurement difference in a case where the reference state continues for a determination time.

13. The electrical device according to claim 9, wherein the electronic controller has
a first state where the electronic controller operates with first power consumption, and
a second state where the electronic controller operates with second power consumption lower than the first power consumption, and
the electronic controller is configured to change a state of the electronic controller from the first state to the second state in a case where, for a sleep determination time, the force measured by the force sensor is lower than the force threshold and the rotational position detected by the position detector does not change.

14. The electrical device according to claim 13, wherein the electronic controller is configured to calculate the measurement difference before the electronic controller changes the state of the electronic controller from the first state to the second state.

15. The electrical device according to claim 13, wherein the electronic controller is configured to change the state of the electronic controller from the second state to the first state in a case where the force measured by the force sensor is higher than the force threshold in the second state or if the rotational position detected by the position detector changes in the second state, and
the electronic controller is configured to calculate the measurement difference after the electronic controller changes the state of the electronic controller from the second state to the first state.

16. A rotational device for a human-powered vehicle, comprising:
a crank arm; and
the electrical device according to claim 1.

17. The rotational device according to claim 16, wherein the electrical device is at least partially provided to the crank arm.

18. The rotational device according to claim 16, further comprising:
a crank axle; and
a sprocket, wherein
the crank arm is secured to the crank axle.

19. The rotational device according to claim 18, wherein the electrical device is at least partially provided to at least one of the crank axle, the crank arm, and the sprocket.

20. A rotational device for a human-powered vehicle, comprising:
a pedal axle;
a pedal body rotatably coupled to the pedal axle; and
the electrical device according to claim 1.

21. The rotational device according to claim 20, wherein the electrical device is at least partially provided to at least one of the pedal axle and the pedal body.

22. An electrical device for a rotational device of a human-powered vehicle, comprising:
a force sensor configured to measure a force applied to the rotational device;
a temperature sensor configured to measure a temperature; and
an electronic controller configured to adjust a measurement value of the force sensor in at least one case where the temperature measured by the temperature sensor is higher than a first temperature threshold or where the temperature measured by the temperature sensor is lower than a second temperature threshold.

23. The electrical device according to claim 22, further comprising
a position detector configured to detect a rotational position of the rotational device, wherein
the electronic controller has
a first state where the electronic controller operates with first power consumption, and
a second state where the electronic controller operates with second power consumption lower than the first power consumption, and
the electronic controller is configured to change a state of the electronic controller from the first state to the second state in a case where, for a sleep determination time, the force measured by the force sensor is lower than the force threshold and the rotational position detected by the position detector does not change.

24. The electrical device according to claim 23, wherein the electronic controller is configured to adjust the measurement value before the electronic controller changes the state of the electronic controller from the first state to the second state in the at least one case where the temperature measured by the temperature sensor is higher than the first temperature threshold or where the temperature measured by the temperature sensor is lower than a second temperature threshold.

25. The electrical device according to claim 23, wherein the electronic controller is configured to adjust the measurement value of the force sensor based on the rotational position detected by the position detector without a user input indicating adjustment of the measurement value of the force sensor.

26. The electrical device according to claim 22, wherein the temperature sensor is configured to measure the temperature of the rotational device.

27. The electrical device according to claim 22, wherein the temperature sensor includes a sensor body.

* * * * *